(12) United States Patent
Koo et al.

(10) Patent No.: US 11,290,748 B2
(45) Date of Patent: Mar. 29, 2022

(54) METHOD AND DEVICE FOR DESIGNING LOW COMPLEXITY DST7

(71) Applicant: LG ELECTRONICS INC., Seoul (KR)

(72) Inventors: Moonmo Koo, Seoul (KR); Mehdi Salehifar, Seoul (KR); Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/058,873

(22) PCT Filed: May 31, 2019

(86) PCT No.: PCT/KR2019/006608
§ 371 (c)(1),
(2) Date: Nov. 25, 2020

(87) PCT Pub. No.: WO2019/231292
PCT Pub. Date: Dec. 5, 2019

(65) Prior Publication Data
US 2021/0235121 A1 Jul. 29, 2021

Related U.S. Application Data

(60) Provisional application No. 62/679,014, filed on May 31, 2018, provisional application No. 62/685,224, (Continued)

(51) Int. Cl.
*H04N 19/625* (2014.01)
*H04N 19/62* (2014.01)

(52) U.S. Cl.
CPC .......... *H04N 19/625* (2014.11); *H04N 19/62* (2014.11)

(58) Field of Classification Search
CPC ...... H04N 19/625; H04N 19/62; H04N 19/70; H04N 19/176; H04N 19/124
(Continued)

(56) References Cited

U.S. PATENT DOCUMENTS

| 2014/0126832 A1 | 5/2014 | Lim |
| 2015/0145874 A1 | 5/2015 | Han et al. |

(Continued)

FOREIGN PATENT DOCUMENTS

| KR | 1020130098360 A | 9/2013 |
| WO | 2018011345 A1 | 1/2018 |

OTHER PUBLICATIONS

Moonmo Koo, et al., "Description of SDR video coding technology proposal by LG Electronics", Joing Video Experts Team (JVET) of ITU-T SG 16 WP 3 and ISO/IEC JTC 1/SC 29/WG 11, 10th Meeting: San Diego, CA, Apr. 10-20, 2018, JVET-J0017-V1.

*Primary Examiner* — Tung T Vo
(74) *Attorney, Agent, or Firm* — Denton US LLP

(57) ABSTRACT

The present disclosure provides a method for reconstructing a video signal through a low-complexity Discrete Sine Transform-7 (DST7) design, including: obtaining a transform index of a current block from the video signal, wherein the transform index corresponds to any one of a plurality of transform combinations including combinations of DST7 and/or a Discrete Cosine Transform-8 (DCT8); deriving a transform combination corresponding to the transform index, wherein the transform combination includes a horizontal transform and a vertical transform, and wherein the horizontal transform and the vertical transform correspond to any one of the DST7 and the DCT8; performing an inverse transform on the current block in a vertical or horizontal direction using the DST7 or the DCT8; and reconstructing the video signal using the inverse transformed current block, wherein a 33-point Discrete Fourier (Continued)

Transform (DFT) is applied to the DST7 when the DST7 is 16×16 and a 65-point DFT is applied to the DST7 when the DST7 is 32×32.

15 Claims, 32 Drawing Sheets

Related U.S. Application Data filed on Jun. 14, 2018, provisional application No. 62/692,888, filed on Jul. 2, 2018.

(58) Field of Classification Search
USPC .................................................. 375/240.2
See application file for complete search history.

(56) References Cited

U.S. PATENT DOCUMENTS

| | | | |
|---|---|---|---|
| 2020/0213615 A1* | 7/2020 | Zhao | H04N 19/625 |
| 2020/0236400 A1* | 7/2020 | Kanoh | H04N 19/52 |
| 2020/0280740 A1* | 9/2020 | Tsukuba | H04N 19/12 |

* cited by examiner

[FIG. 1]
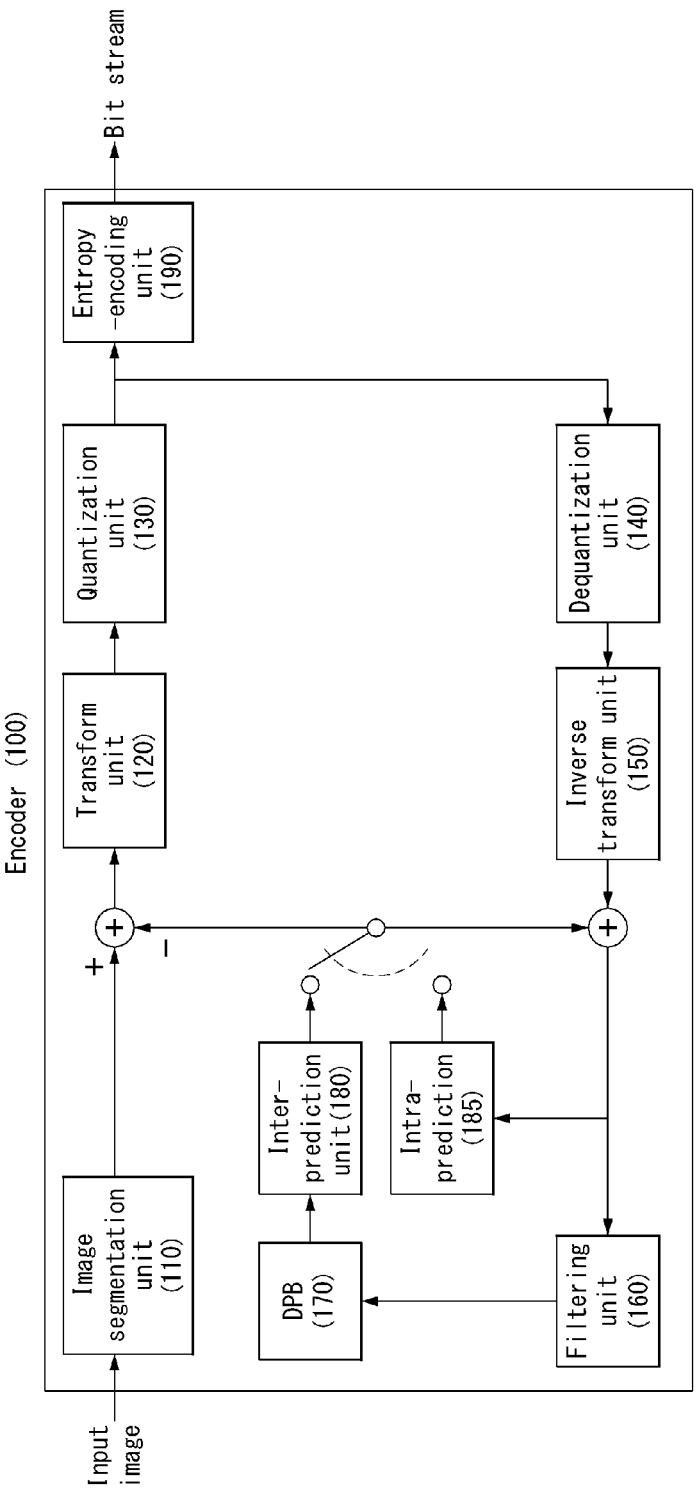

[FIG. 2]
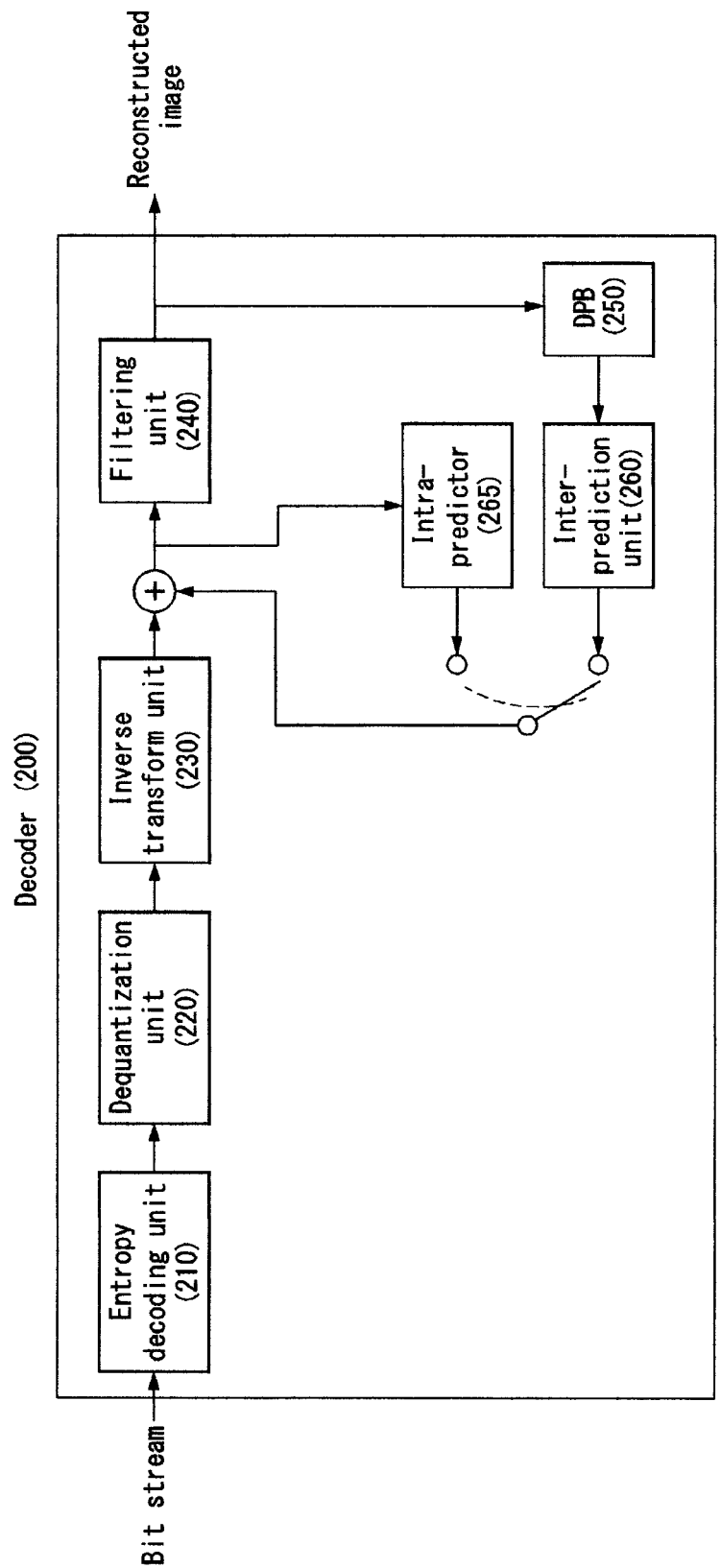

【FIG. 3A】
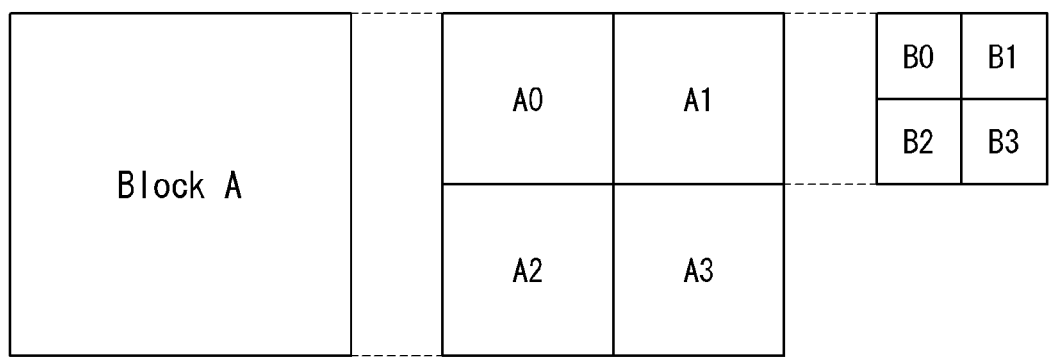
【FIG. 3B】
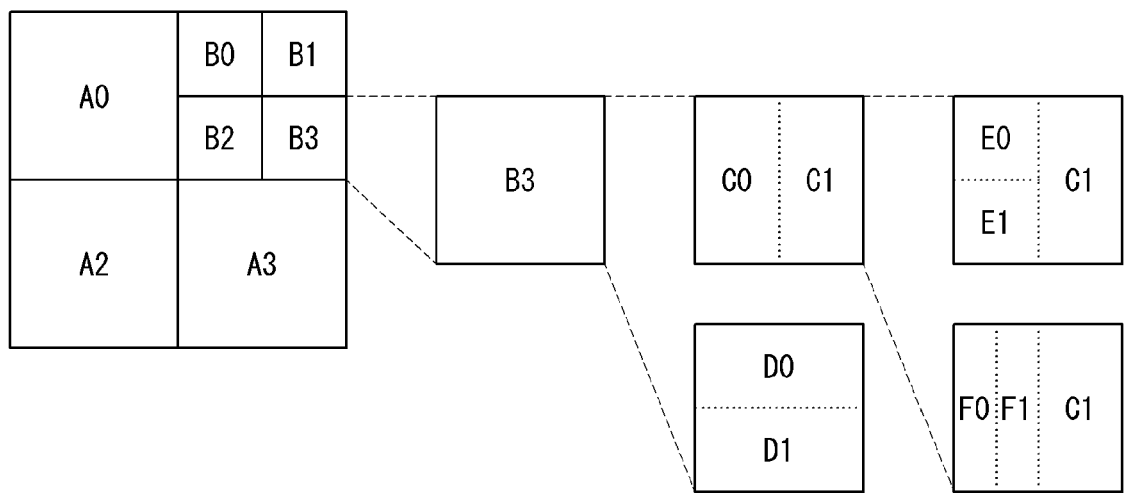

[FIG. 3C]
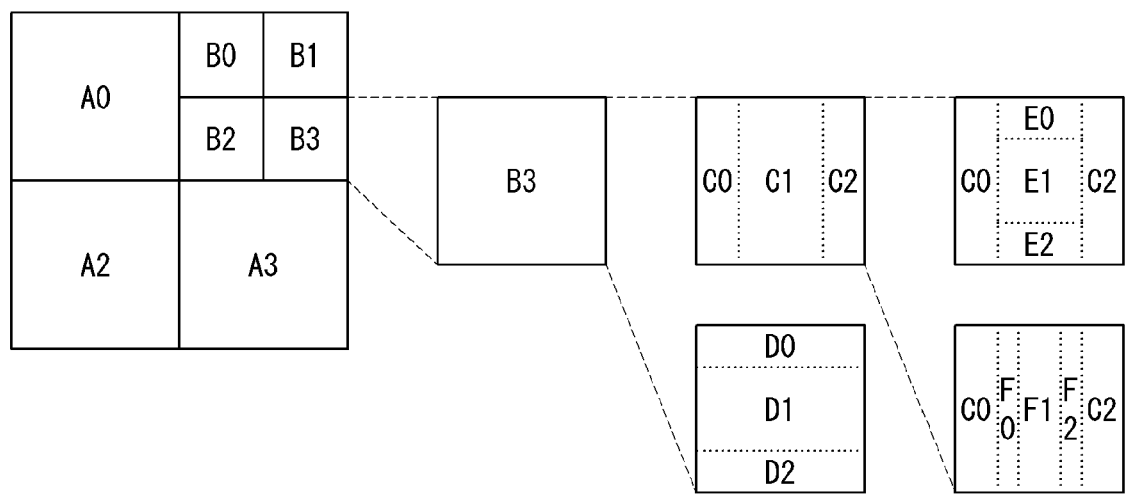
[FIG. 3D]
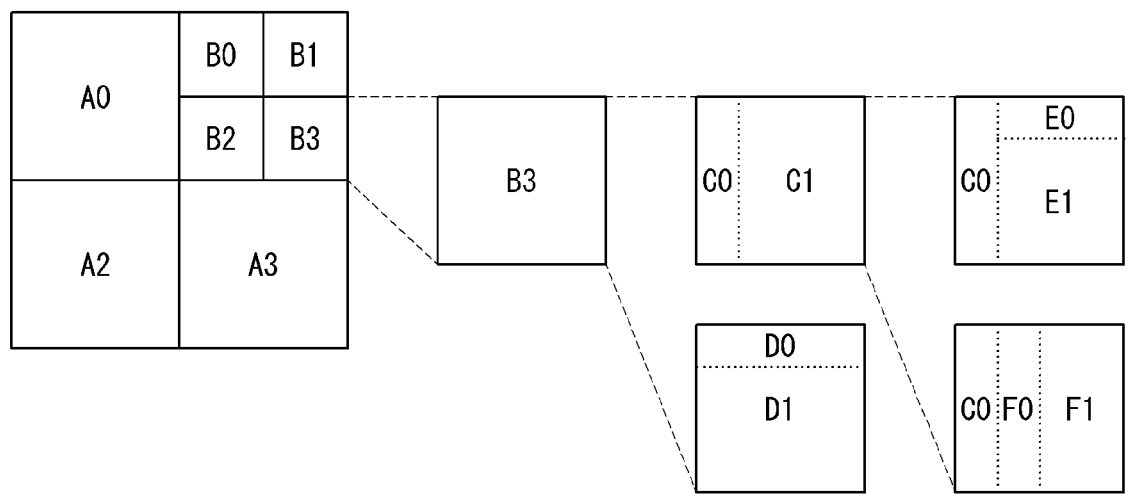

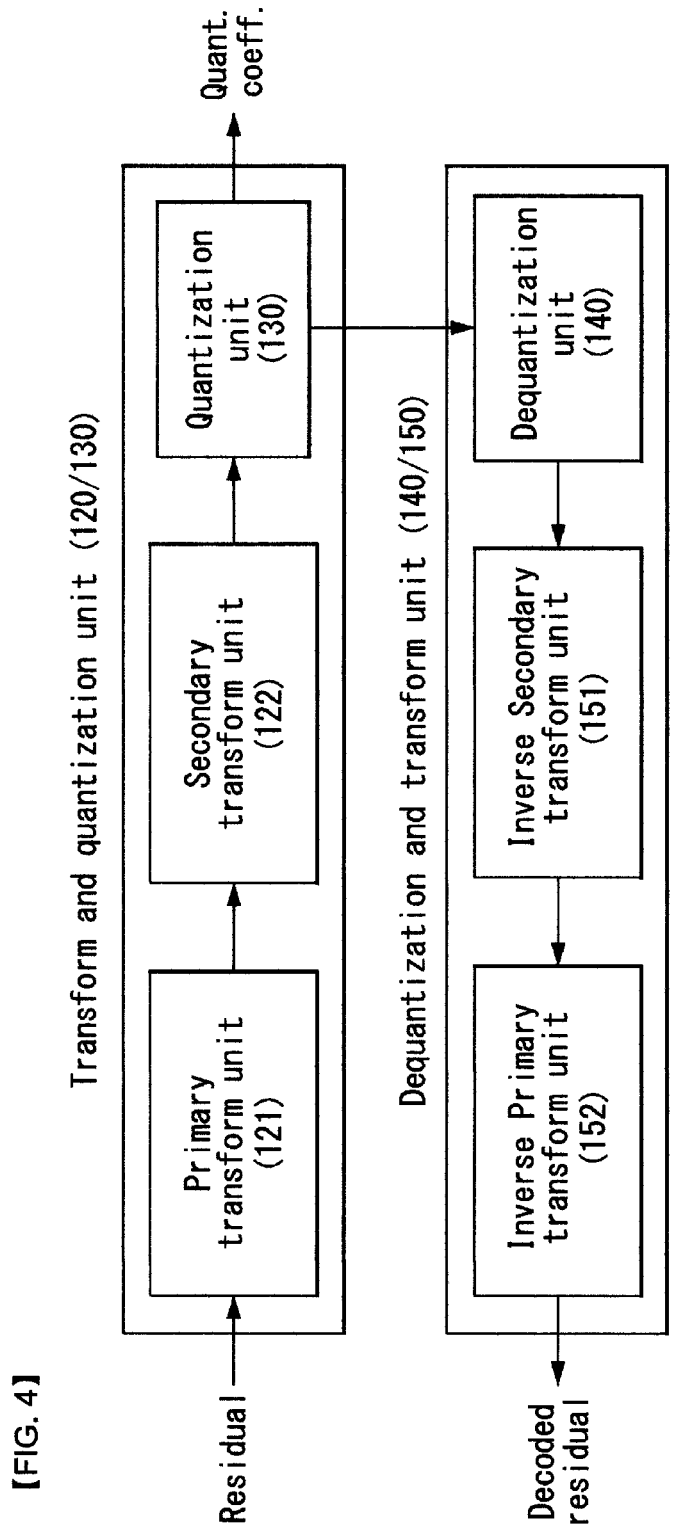
[FIG. 4]

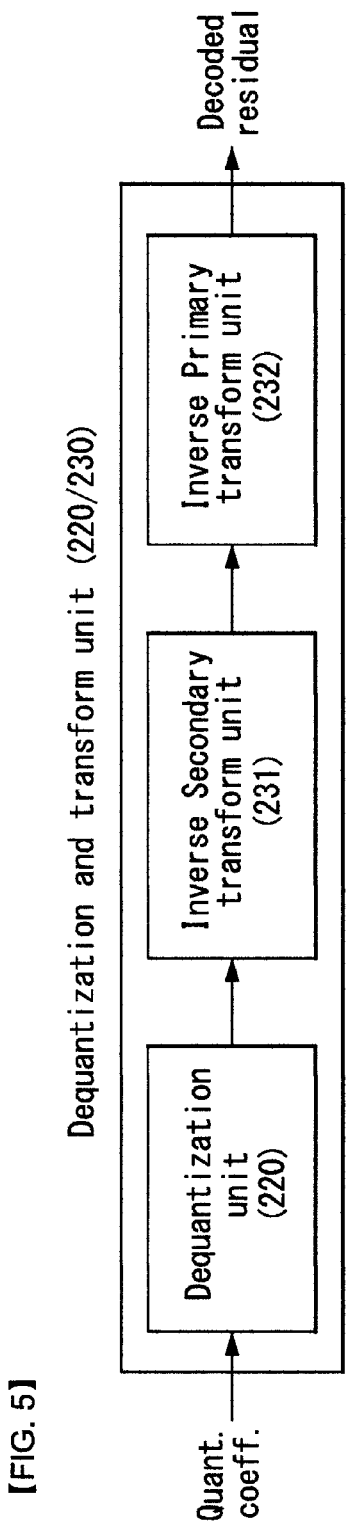
[FIG. 5]

[FIG. 6]

| Configuration group | Index | Horizontal (row) transform | Vertical (column) transform | 35 intra Prediction modes | 67 intra Prediction modes |
|---|---|---|---|---|---|
| Group 0 (G0) | 0 | DST7 | DST7 | 0 | 0 |
| | 1 | DCT5 | DST7 | | |
| | 2 | DST7 | DCT5 | | |
| | 3 | DCT5 | DCT5 | | |
| Group 1 (G1) | 0 | DST7 | DST7 | 1, 3, 5, 7, 13, 15, 17, 19, 21, 23, 29, 31, 33 | 1, 3, 5, 7, 9, 11, 13, 23, 25, 27, 29, 31, 33, 35, 37, 39, 41, 43, 45, 55, 57, 59, 61, 63, 65 |
| | 1 | DST1 | DST7 | | |
| | 2 | DST7 | DST1 | | |
| | 3 | DST1 | DST1 | | |
| Group 2 (G2) | 0 | DST7 | DST7 | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 64, 66 |
| | 1 | DCT8 | DST7 | | |
| | 2 | DST7 | DCT8 | | |
| | 3 | DCT8 | DCT8 | | |
| Group 3 (G3) | 0 | DST7 | DST7 | 8, 9, 10, 11, 12 (Neighboring angles to horizontal directions) | 14, 15, 16, 17, 18, 19, 20, 21, 22 (Neighboring angles to horizontal directions) |
| | 1 | DCT5 | DST7 | | |
| | 2 | DST7 | DCT8 | | |
| | 3 | DCT5 | DCT8 | | |
| Group 4 (G4) | 0 | DST7 | DST7 | 24, 25, 26, 27, 28 (Neighboring angles to vertical directions) | 46, 47, 48, 49, 50, 51, 52, 53, 54 (Neighboring angles to vertical directions) |
| | 1 | DCT8 | DST7 | | |
| | 2 | DST7 | DCT5 | | |
| | 3 | DCT8 | DCT5 | | |
| Group 5 (G5) | 0 | DCT8 | DCT8 | Inter prediction | Inter prediction |
| | 1 | DST7 | DCT8 | | |
| | 2 | DCT8 | DST7 | | |
| | 3 | DST7 | DST7 | | |

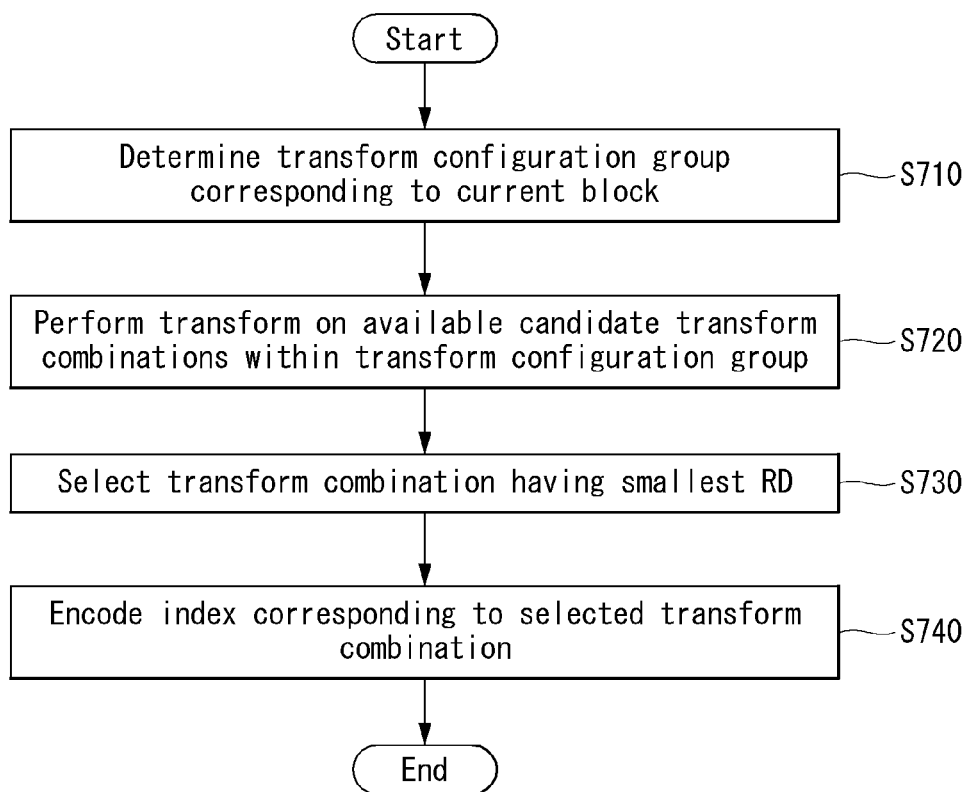
[FIG. 7]

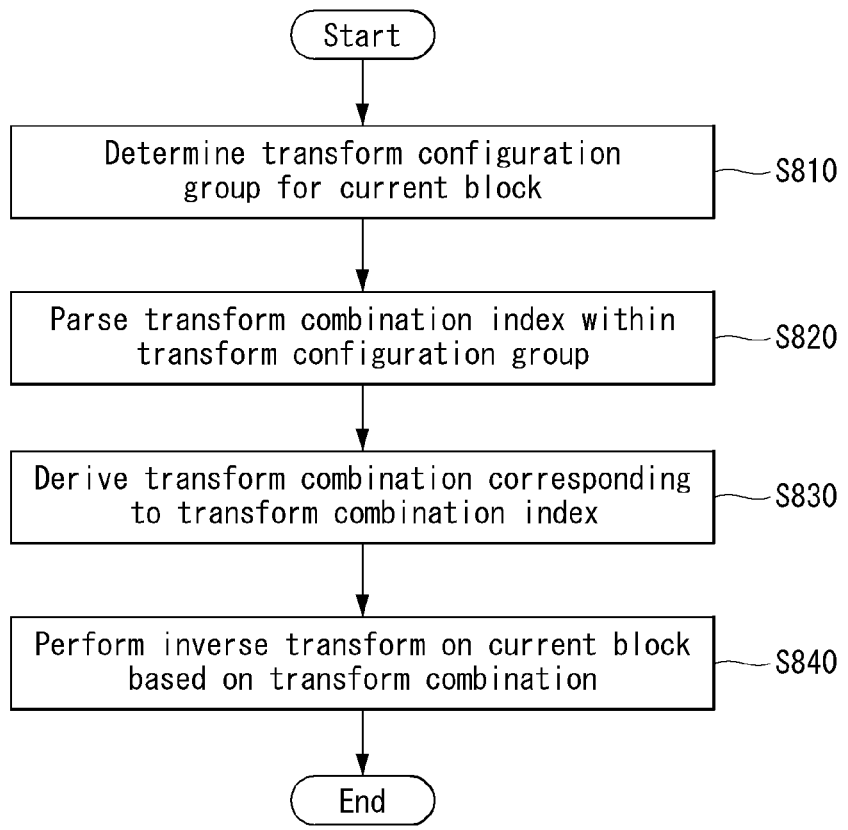

[FIG. 9]
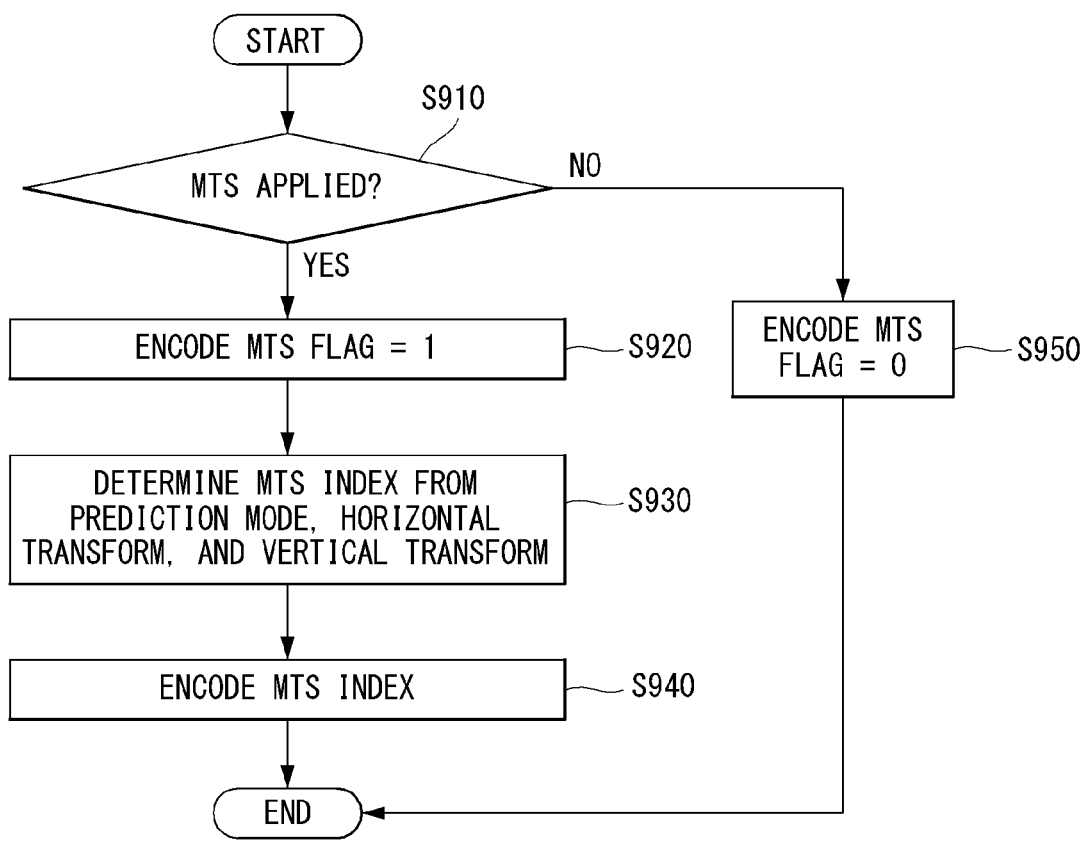

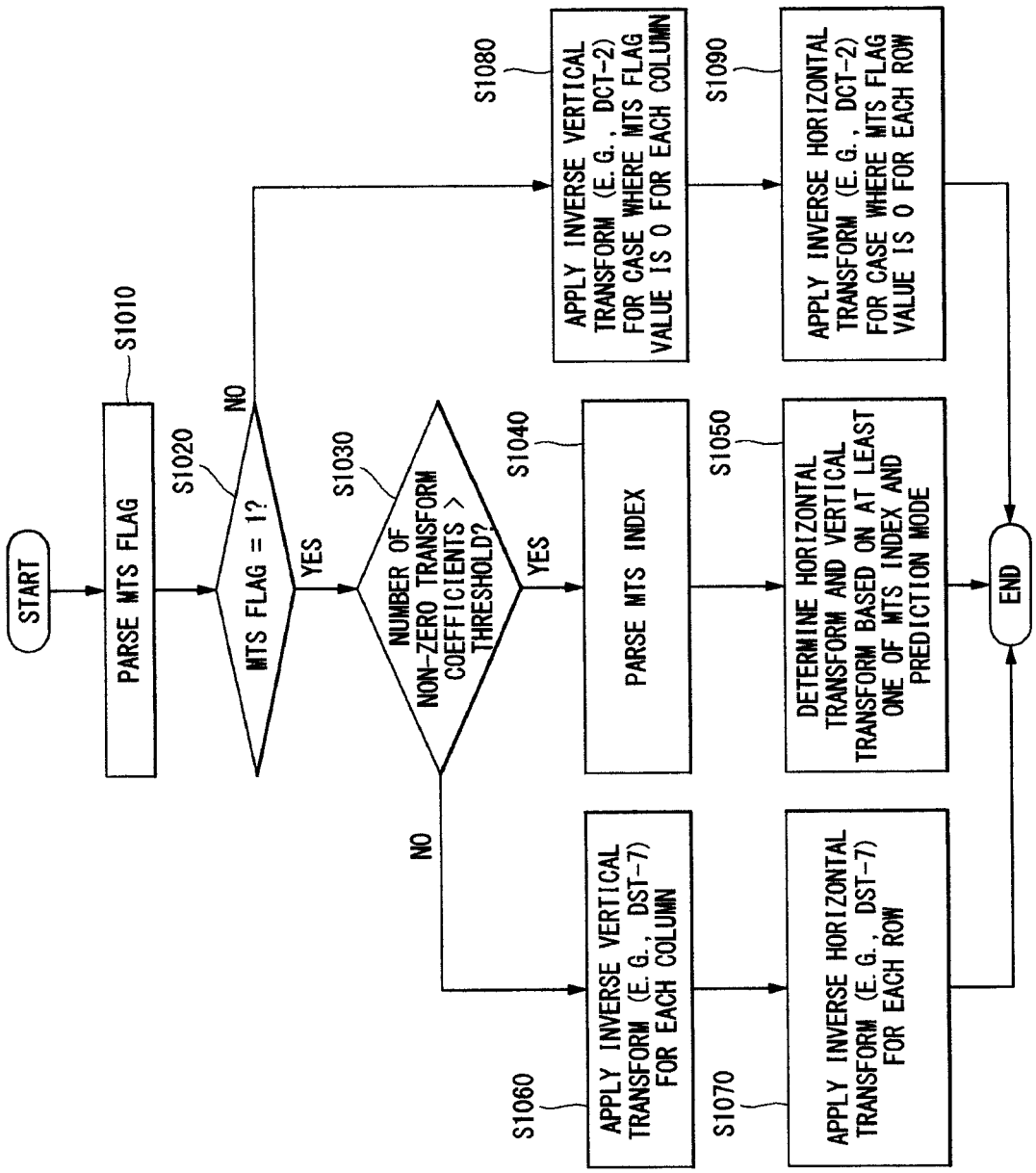
[FIG. 10]

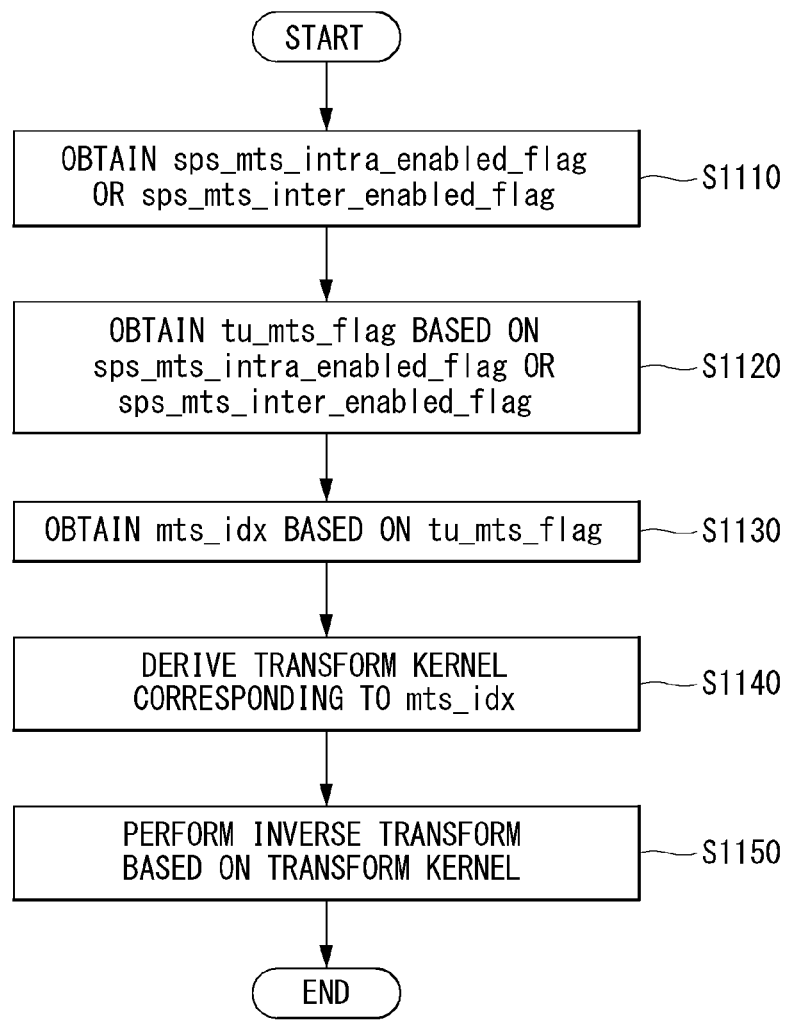
[FIG. 11]

[FIG. 12]

| intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 | 51 | 55 | 53 | 54 | 55 | 56 | 57 | 58 | 59 | 60 | 61 | 62 | 63 | 64 | 65 | 66 | 67 (LM) |
| set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | NULL |

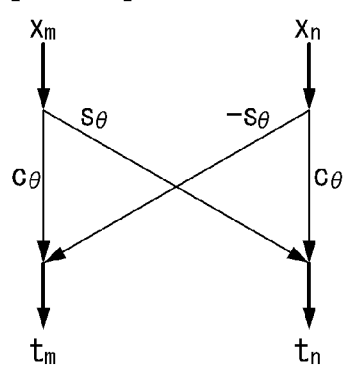
[FIG. 13]

[FIG. 14]
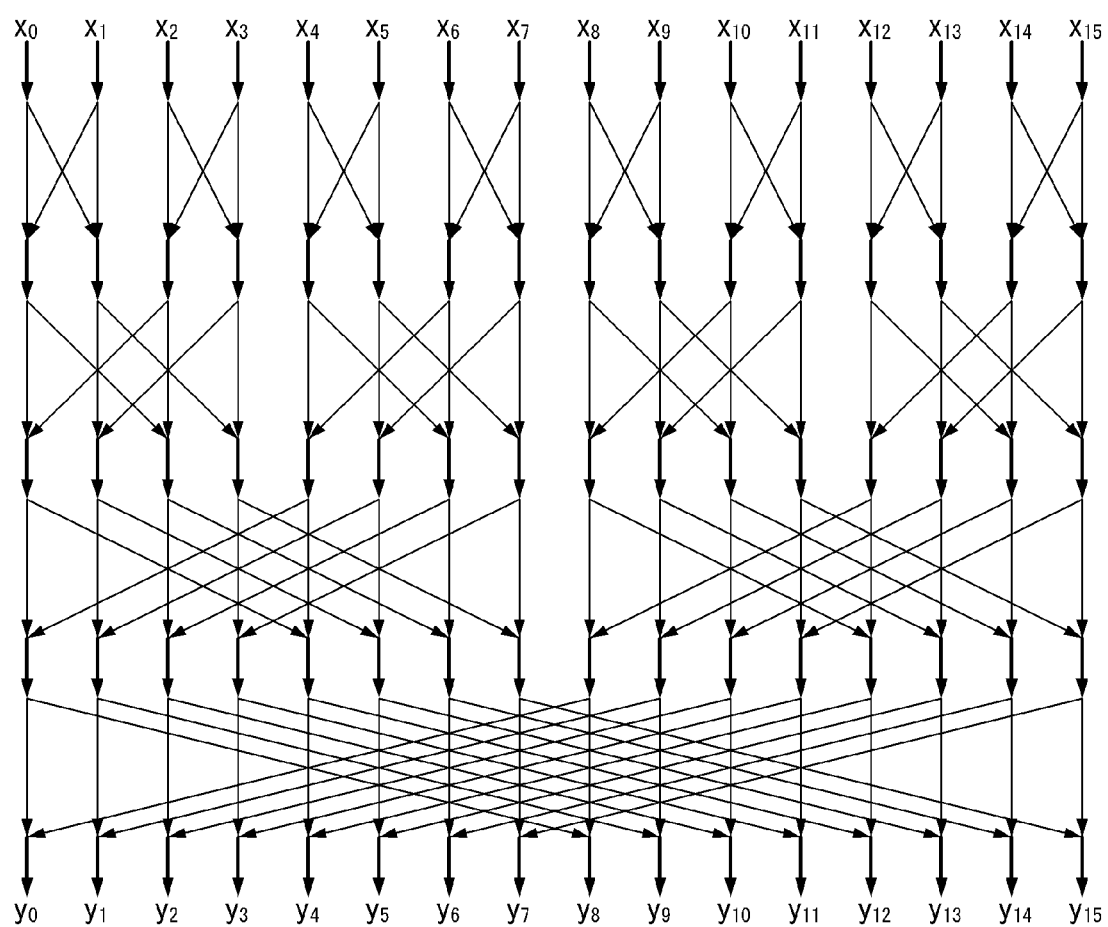

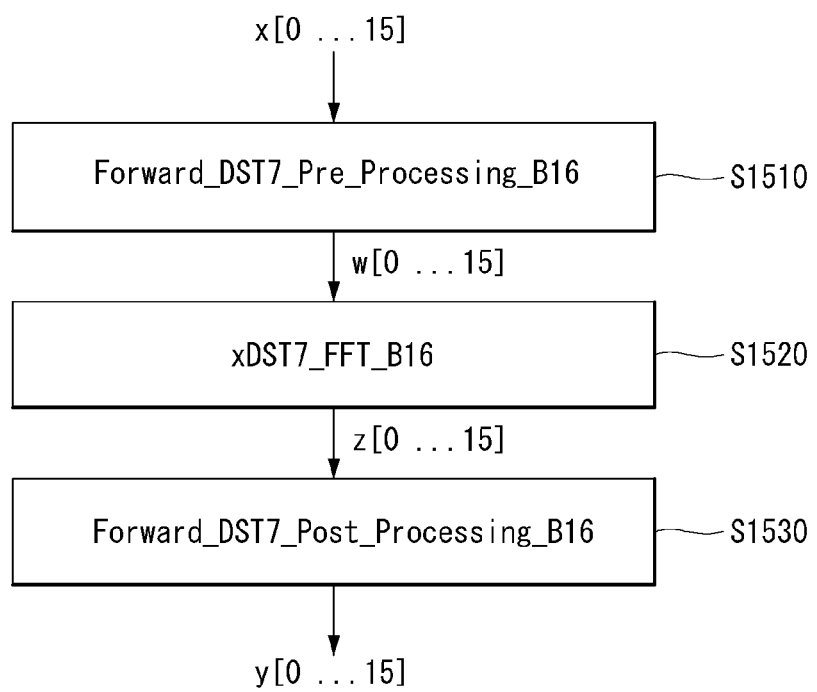
[FIG. 15]

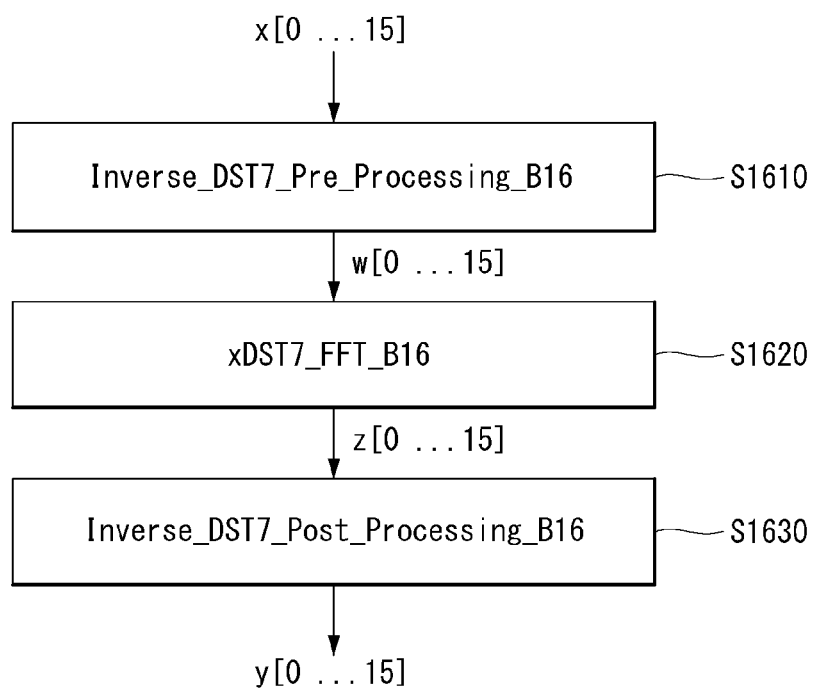
[FIG. 16]

[FIG. 17]
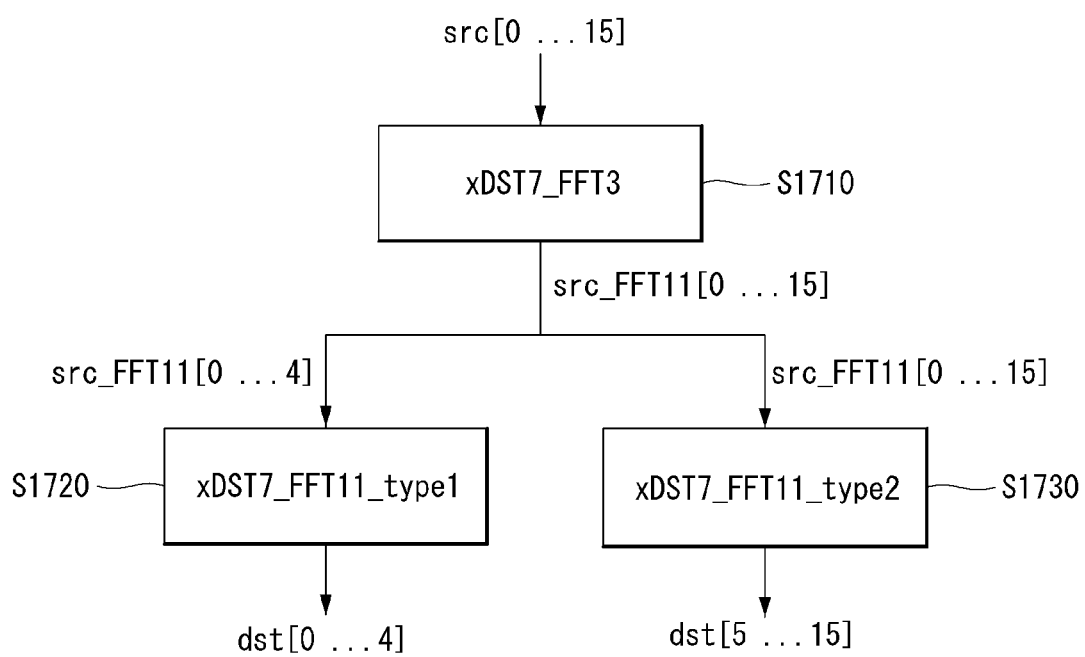

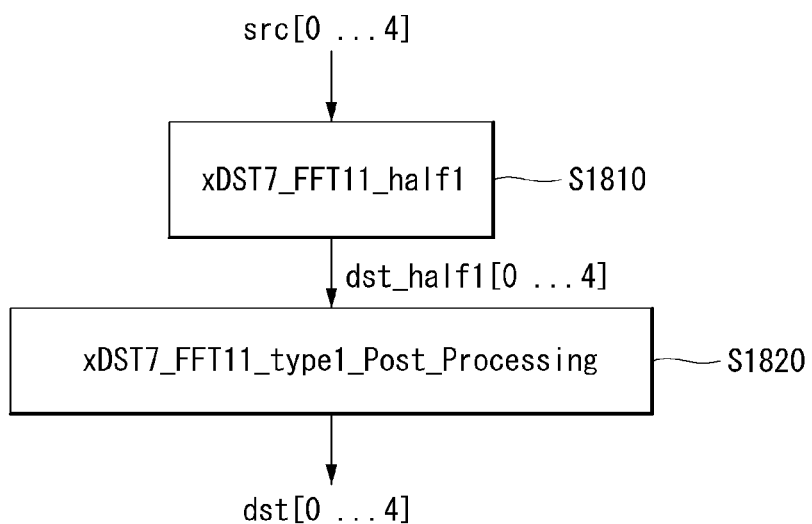
[FIG. 18]

[FIG. 19]
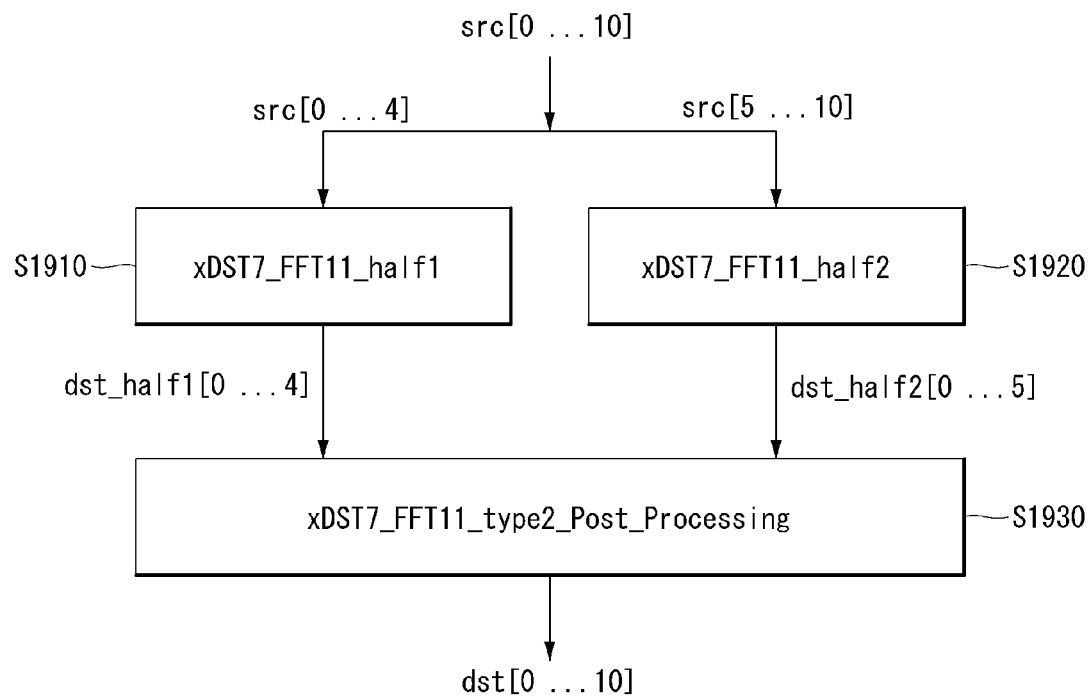

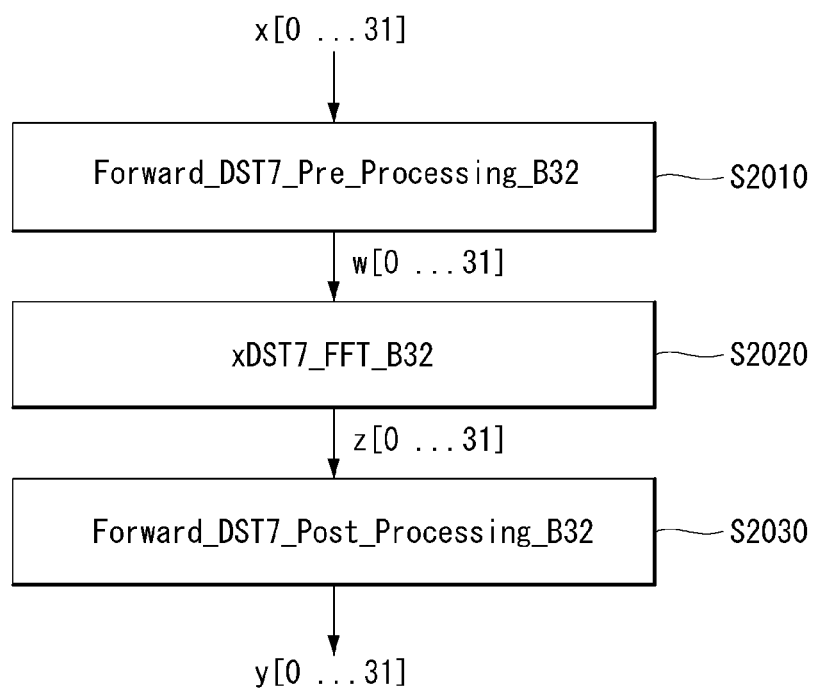
[FIG. 20]

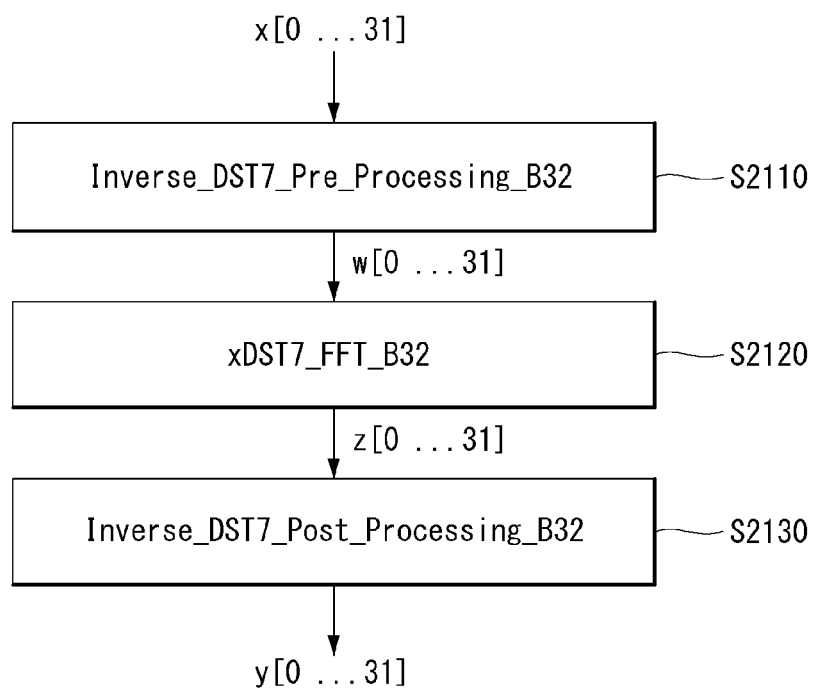
[FIG. 21]

[FIG. 22]
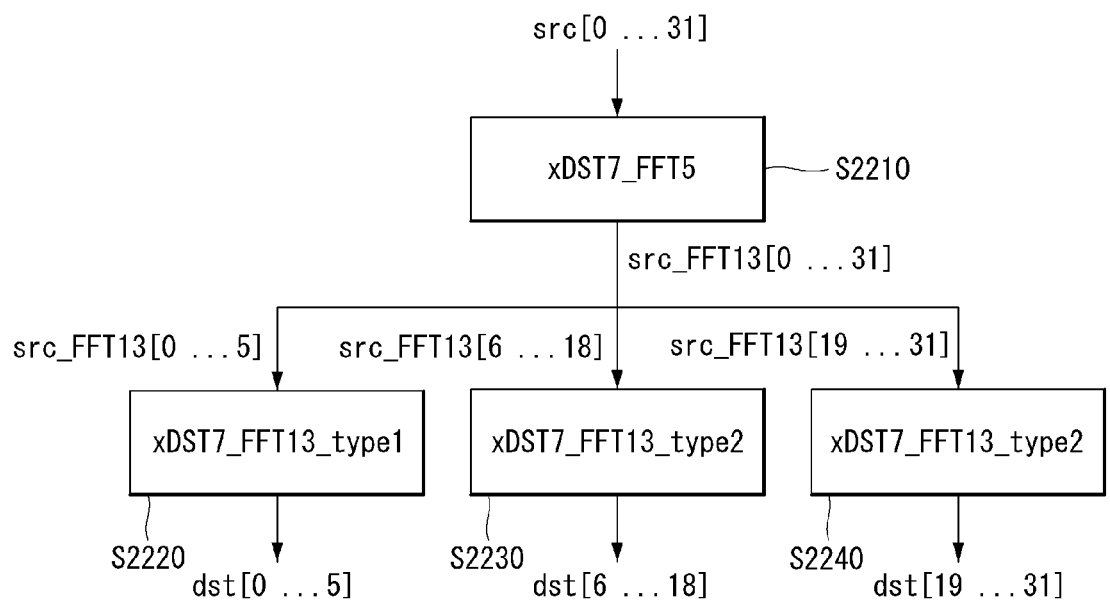

[FIG. 23]
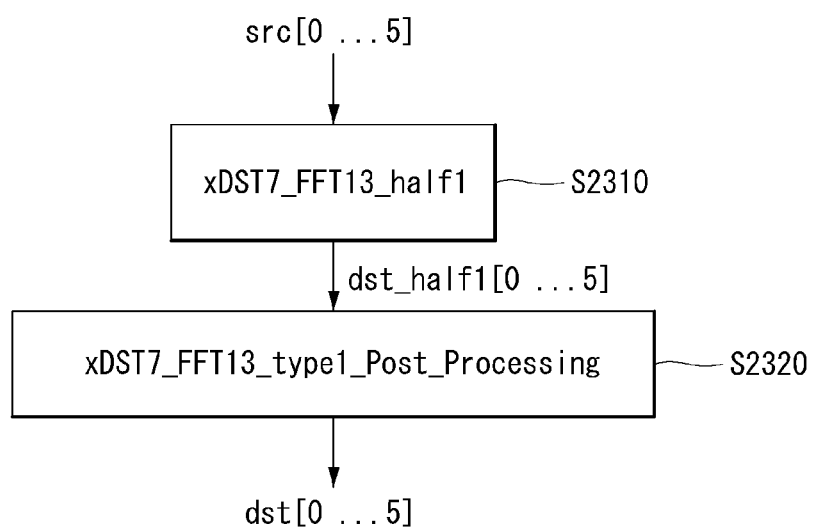

[FIG. 24]
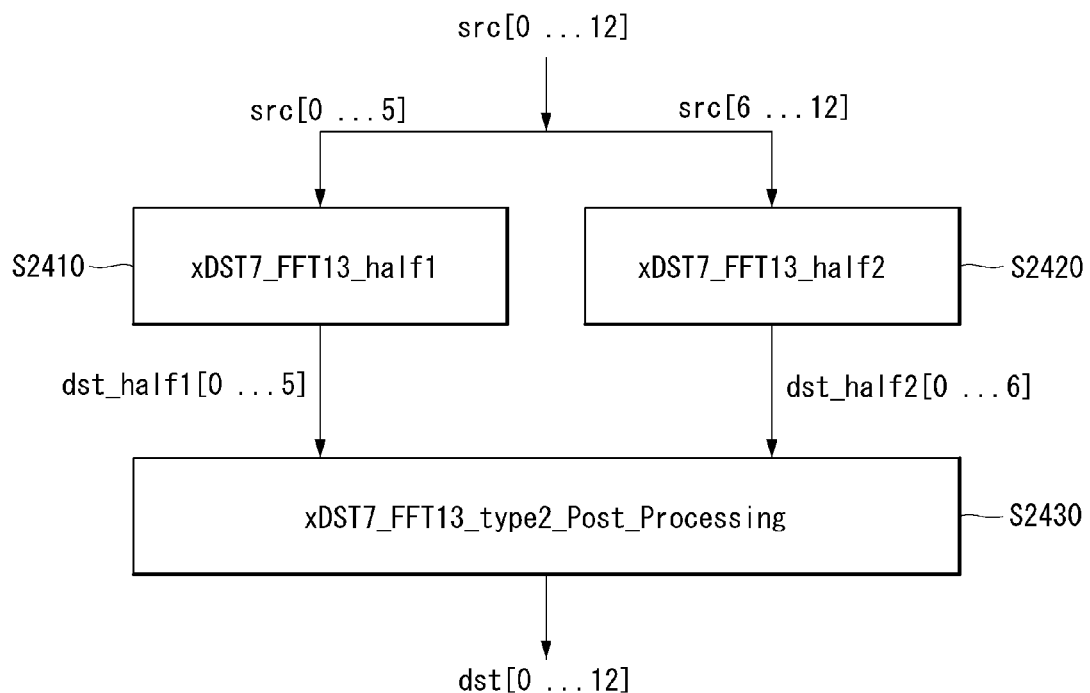

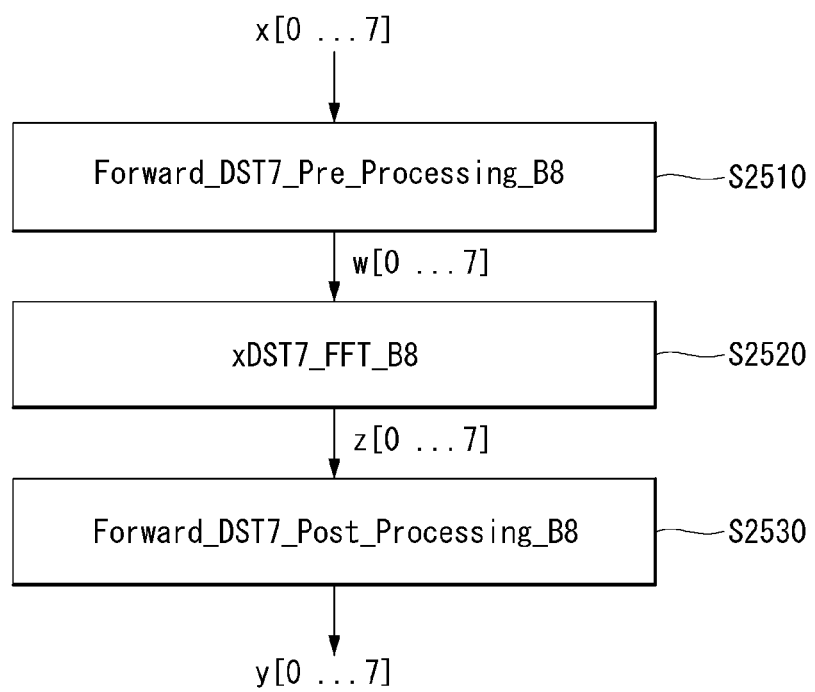
[FIG. 25]

[FIG. 26]
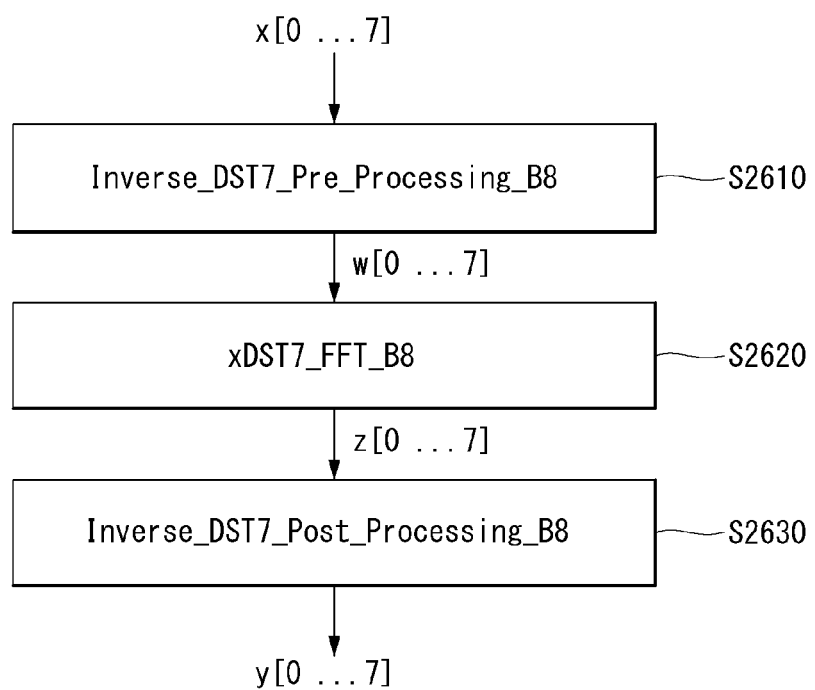

[FIG. 27]
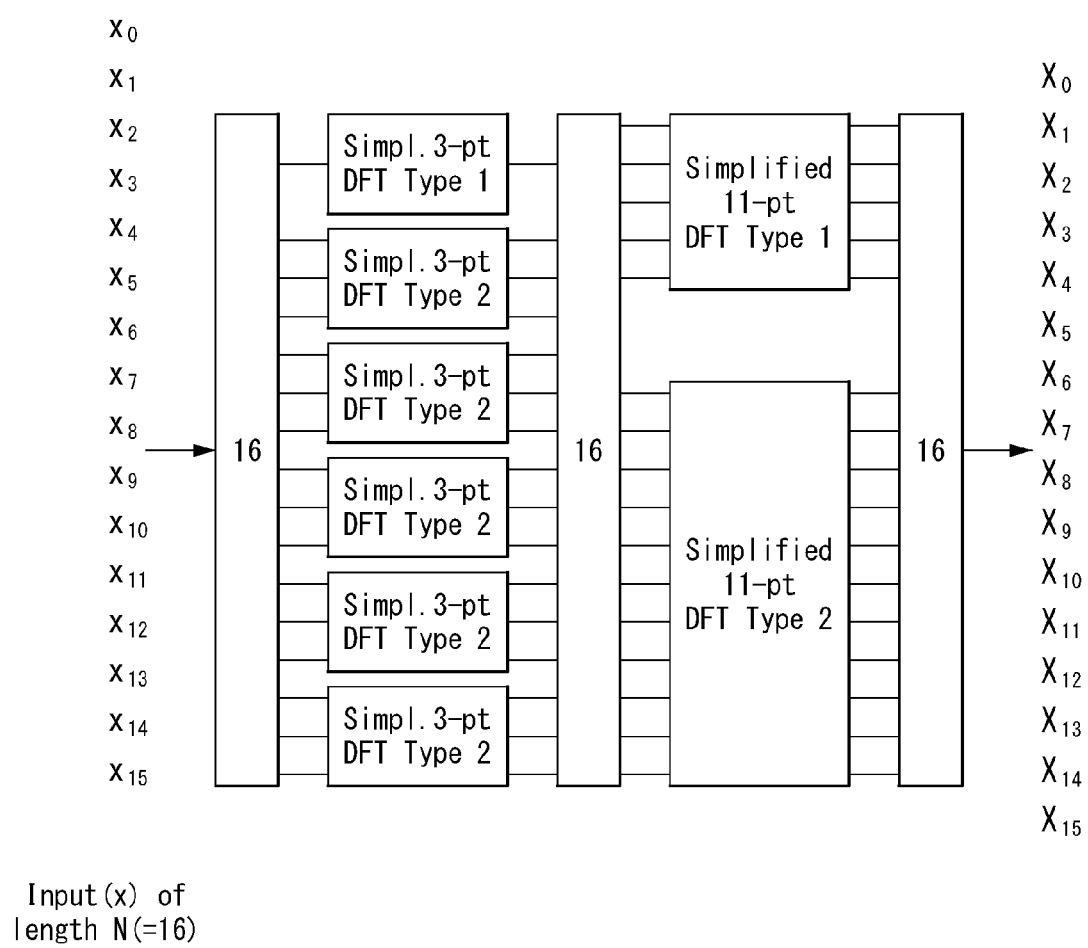
Input(x) of
length N(=16)

[FIG. 28]
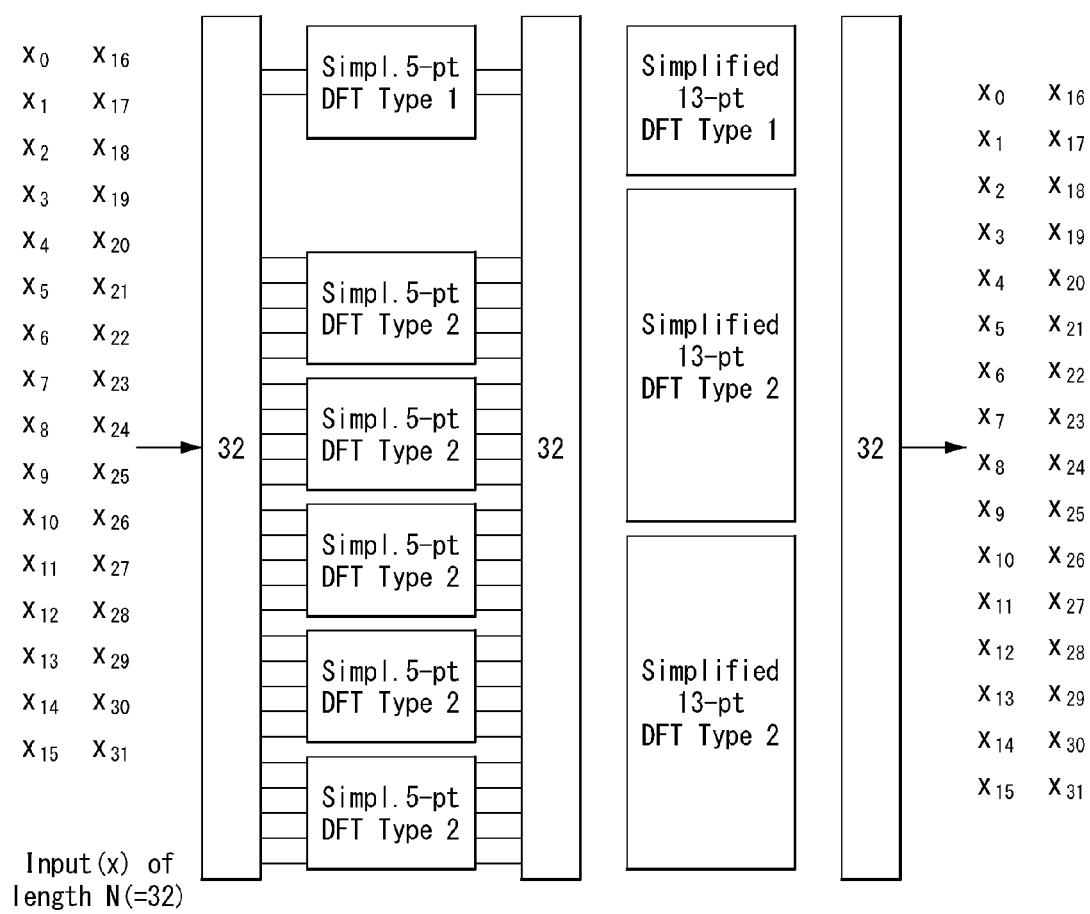

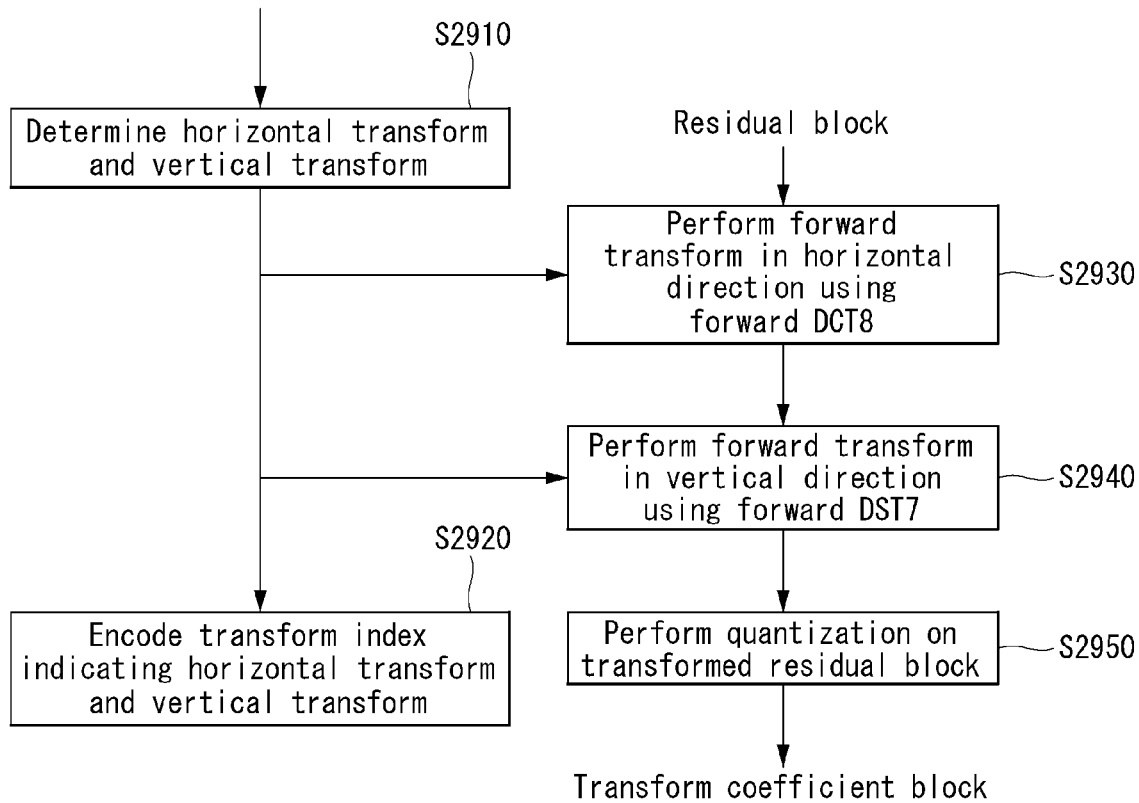
[FIG. 29]

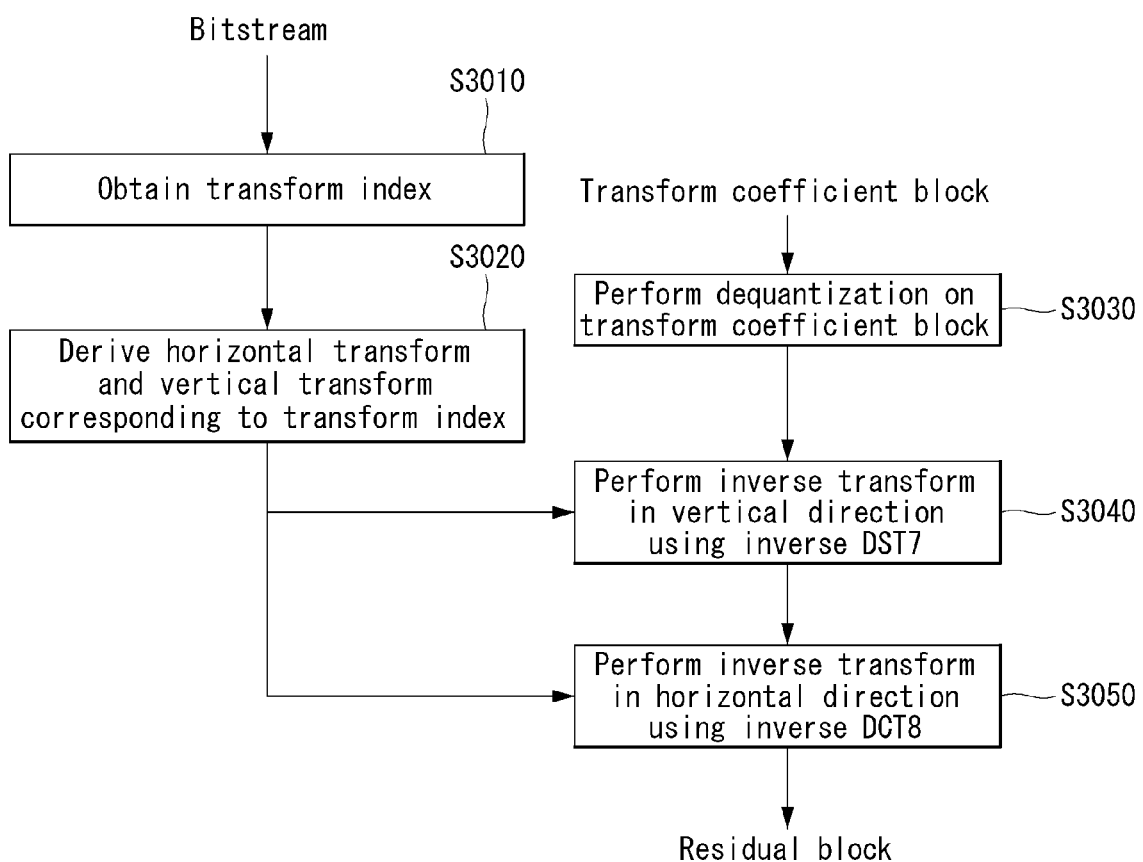
[FIG. 30]

[FIG. 31]
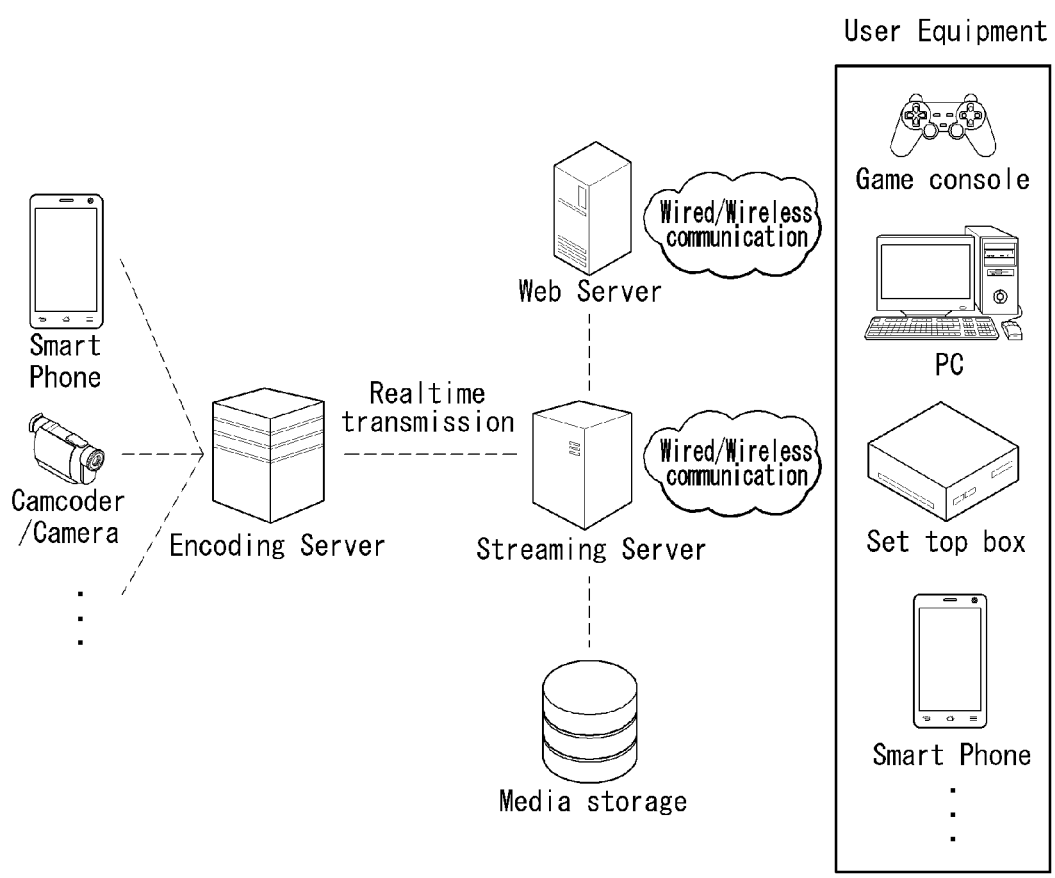

METHOD AND DEVICE FOR DESIGNING LOW COMPLEXITY DST7

CROSS-REFERENCE TO RELATED APPLICATIONS

This application is the National Stage filing under 35 U.S.C. 371 of International Application No. PCT/KR2019/006608, filed on May 31, 2019, which claims the benefit of U.S. Provisional Application No. 62/679,014, filed on May 31, 2018, U.S. Provisional Application No. 62/685,224, filed on Jun. 14, 2018 and U.S. Provisional Application No. 62/692,888, filed on Jul. 2, 2018, the contents of which are all hereby incorporated by reference herein in their entirety.

TECHNICAL FIELD

The present disclosure relates to a method and device for processing video signals and, more specifically, to a technology for designing low-complexity Discrete Sine Transform-7 (DST7) using Discrete Fourier Transform (DFT).

BACKGROUND ART

Next-generation video content will have characteristics of a high spatial resolution, a high frame rate, and high dimensionality of scene representation. In order to process such content, technologies, such as memory storage, a memory access rate, and processing power, will be remarkably increased.

Accordingly, it is necessary to design a new coding tool for more efficiently processing next-generation video content. Particularly, it is necessary to design a more efficient transform in terms of coding efficiency and complexity when a transform is applied.

DISCLOSURE

Technical Problem

The present disclosure proposes a low-complexity arithmetic operation algorithm for a transformation kernel for video compression.

The present disclosure proposes a method for designing low-complexity Discrete Sine Transform-7 (DST7).

The present disclosure proposes a method for designing forward DST7 and inverse DST7 using Discrete Fourier Transform (DFT).

The present disclosure proposes a method for implementing DST7 through one-dimensional DFT or two-dimensional DFT.

The present disclosure proposes a method for implementing DST7 only through integer operation using various scaling methods.

The present disclosure proposes a method for designing DST7 with lengths of 8, 16 and 32 through the method for implementing DST7 using DFT and the method for implementing DST7 only through integer operation.

The present disclosure proposes encoder/decoder structures for reflecting a new transformation design.

Technical Solution

The present disclosure provides a method for designing Discrete Sine Transform-7 (DST7) with lengths of 8, 16 and 32 using DFT.

The present disclosure provides a method for designing forward DST7 using DFT.

The present disclosure provides a method for designing inverse DST7 using DFT.

The present disclosure provides a method for implementing DST7 through one-dimensional DFT or two-dimensional DFT.

The present disclosure provides a method for implementing DST7 through only integer operation using various scaling methods.

Advantageous Effects

The present disclosure can reduce memory use and arithmetic operation complexity by providing a method for designing low-complexity Discrete Sine Transform-7 (DST7).

Furthermore, the present disclosure can reduce complexity of DST7 through an FFT algorithm by designing forward DST7 and inverse DST7 using DFT when still images or moving images are coded.

In this manner, it is possible to reduce arithmetic operation complexity and improve coding efficiency through a new low-complexity arithmetic operation algorithm.

DESCRIPTION OF DRAWINGS

FIG. 1 is a block diagram illustrating the configuration of an encoder for encoding a video signal according to an embodiment of the present disclosure.

FIG. 2 is a block diagram illustrating the configuration of a decoder for decoding a video signal according to an embodiment of the present disclosure.

FIG. 3 illustrates embodiments to which the disclosure may be applied, FIG. 3A is a diagram for describing a block split structure based on a quadtree (hereinafter referred to as a "QT"), FIG. 3B is a diagram for describing a block split structure based on a binary tree (hereinafter referred to as a "BT"), FIG. 3C is a diagram for describing a block split structure based on a ternary tree (hereinafter referred to as a "TT"), and FIG. 3D is a diagram for describing a block split structure based on an asymmetric tree (hereinafter referred to as an "AT").

FIG. 4 is an embodiment to which the disclosure is applied and illustrates a schematic block diagram of a transform and quantization unit 120/130 and a dequantization and transform unit 140/150 within an encoder.

FIG. 5 is an embodiment to which the disclosure is applied and illustrates a schematic block diagram of a dequantization and transform unit 220/230 within a decoder.

FIG. 6 is a table showing a transform configuration group to which Multiple Transform Selection (MTS) is applied as an embodiment to which the present disclosure is applied.

FIG. 7 is a flowchart showing an encoding process in which Multiple Transform Selection (MTS) is performed as an embodiment to which the present disclosure is applied.

FIG. 8 is a flowchart showing a decoding process in which Multiple Transform Selection (MTS) is performed as an embodiment to which the present disclosure is applied.

FIG. 9 is a flowchart for describing a process of encoding an MTS flag and an MTS index as an embodiment to which the present disclosure is applied.

FIG. 10 is a flowchart for describing a decoding process in which a horizontal transform or vertical transform is applied to a row or a column based on an MTS flag and an MTS index as an embodiment to which the present disclosure is applied.

FIG. 11 is a flowchart of performing an inverse transform based on a transform related parameter as an embodiment to which the present disclosure is applied.

FIG. 12 is a table showing allocation of a transform set for each intra prediction mode in an NSST as an embodiment to which the present disclosure is applied.

FIG. 13 is a calculation flow diagram for Givens rotation as an embodiment to which the present disclosure is applied.

FIG. 14 illustrates one round configuration in 4×4 NSST constituted by a givens rotation layer and permutations as an embodiment to which the present disclosure is applied.

FIG. 15 is a flowchart through which forward DST7 with a length of 16 is designed using Discrete Fourier Transform (DFT) as an embodiment to which the present disclosure is applied.

FIG. 16 is a flowchart through which inverse DST7 with a length of 16 is designed using Discrete Fourier Transform (DFT) as an embodiment to which the present disclosure is applied.

FIG. 17 to FIG. 19 are flowcharts through which an xDST7_FFT_16 function of FIG. 15 and FIG. 16 is applied as an embodiment to which the present disclosure is applied.

FIG. 20 is a flowchart through which forward DST7 with a length of 32 is designed using Discrete Fourier Transform (DFT) as an embodiment to which the present disclosure is applied.

FIG. 21 is a flowchart through which inverse DST7 with a length of 32 is designed using Discrete Fourier Transform (DFT) as an embodiment to which the present disclosure is applied.

FIG. 22 to FIG. 24 are flowcharts through which the xDST7_FFT_16 function of FIG. 15 and FIG. 16 is applied as an embodiment to which the present disclosure is applied.

FIG. 25 is a flowchart through which forward DST7 with a length of 8 is designed using Discrete Fourier Transform (DFT) as an embodiment to which the present disclosure is applied.

FIG. 26 is a flowchart through which inverse DST7 with a length of 8 is designed using Discrete Fourier Transform (DFT) as an embodiment to which the present disclosure is applied.

FIG. 27 is a block diagram of 16×16 DST7 using 33-point DFT as an embodiment to which the present disclosure is applied.

FIG. 28 is a block diagram of 32×32 DST7 using 65-point DFT as an embodiment to which the present disclosure is applied.

FIG. 29 is an encoding flowchart through which forward Discrete Sine Transform-7 (DST7) and forward Discrete Cosine Transform-8 (DCT8) are performed using Discrete Fourier Transform (DFT) as an embodiment to which the present disclosure is applied.

FIG. 30 is a decoding flowchart through which inverse Discrete Sine Transform-7 (DST7) and inverse Discrete Cosine Transform-8 (DCT8) are performed using Discrete Fourier Transform (DFT) as an embodiment to which the present disclosure is applied.

FIG. 31 illustrates a content streaming system architecture as an embodiment to which the present disclosure is applied.

BEST MODE

The present disclosure provides a method for reconstructing a video signal through a low-complexity Discrete Sine Transform-7 (DST7) design, the method including: obtaining a transform index of a current block from the video signal, wherein the transform index corresponds to any one of a plurality of transform combinations including combinations of DST7 and/or a Discrete Cosine Transform-8 (DCT8); deriving a transform combination corresponding to the transform index, wherein the transform combination includes a horizontal transform and a vertical transform, and wherein the horizontal transform and the vertical transform correspond to any one of the DST7 and the DCT8; performing an inverse transform on the current block in a vertical or horizontal direction using the DST7 or the DCT8; and reconstructing the video signal using the inverse transformed current block, wherein a 33-point Discrete Fourier Transform (DFT) is applied to the DST7 when the DST7 is 16×16 and a 65-point DFT is applied to the DST7 when the DST7 is 32×32.

In the present disclosure, a step of performing the inverse transform may include: dividing one row or one column of the DST7 into two partial vector signals when the 33-point DFT is applied to the DST7; and applying 11-point DFT type 1 or 11-point DFT type 2 to the two partial vector signals.

In the present disclosure when one row or one column of the DST7 is denoted by src[0 . . . 15], the two partial vector signals may be denoted by src[0 . . . 4] and src[5 . . . 15].

In the present disclosure, a step of performing the inverse transform may include: dividing one row or one column of the DST7 into three partial vector signals when the 65-point DFT is applied to the DST7; and applying 13-point DFT type 1 or 13-point DFT type 2 to the three partial vector signals.

In the present disclosure when one row or one column of the DST7 is denoted by src[0 . . . 31], the three partial vector signals may be denoted by src[0 . . . 5], src[6 . . . 18] and src[19 . . . 31].

In the present disclosure, the 13-point DFT type 1 may be applied to src[0 . . . 5] among the three partial vector signals and the 13-point DFT type 2 may be applied to src[6 . . . 18] and src[19 . . . 31].

In the present disclosure, inverse transform of the DST7 may be applied per column when the vertical transform is the DST7 and inverse transform of the DCT8 may be applied per row when the horizontal transform is the DCT8.

The present disclosure provides a device for reconstructing a video signal through a low-complexity DST7 design, the device including: a parsing unit configured to obtain a transform index of a current block from the video signal, wherein the transform index corresponds to any one of a plurality of transform combinations including combinations of DST7 and/or a Discrete Cosine Transform-8 (DCT8); an inverse transform unit configured to derive a transform combination corresponding to the transform index and perform an inverse transform on the current block in a vertical or horizontal direction using the DST7 or the DCT8; and a reconstructing unit configured to reconstruct the video signal using the inverse transformed current block, wherein the transform combination includes a horizontal transform and a vertical transform, wherein the horizontal transform and the vertical transform correspond to any one of the DST7 and the DCT8, and wherein a 33-point Discrete Fourier Transform (DFT) is applied to the DST7 when the DST7 is 16×16 and a 65-point DFT is applied to the DST7 when the DST7 is 32×32.

MODE FOR DISCLOSURE

Hereinafter, a configuration and operation of an embodiment of the present disclosure will be described in detail with reference to the accompanying drawings, a configuration and operation of the present disclosure described with reference to the drawings are described as an embodiment, and the scope, a core configuration, and operation of the present disclosure are not limited thereto.

Further, terms used in the present disclosure are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present disclosure and a meaning of the corresponding term should be comprehended and construed.

Further, when there is a general term selected for describing the invention or another term having a similar meaning, terms used in the present disclosure may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

In the present disclosure, Multiple Transform Selection (MTS) may refer to a method for performing transform using at least two transform types. This may also be expressed as an Adaptive Multiple Transform (AMT) or Explicit Multiple Transform (EMT), and likewise, mts_idx may also be expressed as AMT_idx, EMT_idx, tu_mts_idx, AMT_TU_idx, EMT_TU_idx, transform index, or transform combination index and the present disclosure is not limited to the expressions.

FIG. 1 is a schematic block diagram of an encoder in which encoding of a video signal is performed as an embodiment to which the present disclosure is applied.

Referring to FIG. 1, the encoder 100 may be configured to include an image division unit 110, a transform unit 120, a quantization unit 130, a dequantization unit 140, an inverse transform unit 150, a filtering unit 160, a decoded picture buffer (DPB) 170, an inter-prediction unit 180, an intra-prediction unit 185, and an entropy encoding unit 190.

The image division unit 110 may divide an input image (or picture or frame) input into the encoder 100 into one or more processing units. For example, the processing unit may be a Coding Tree Unit (CTU), a Coding Unit (CU), a Prediction Unit (PU), or a Transform Unit (TU).

However, the terms are only used for the convenience of description of the present disclosure and the present disclosure is not limited to the definition of the terms. In addition, in the present disclosure, for the convenience of the description, the term coding unit is used as a unit used in encoding or decoding a video signal, but the present disclosure is not limited thereto and may be appropriately interpreted according to the present disclosure.

The encoder 100 subtracts a prediction signal (or a prediction block) output from the inter-prediction unit 180 or the intra-prediction unit 185 from the input image signal to generate a residual signal (or a residual block) and the generated residual signal is transmitted to the transform unit 120.

The transform unit 120 may generate a transform coefficient by applying a transform technique to the residual signal. A transform process may be applied to a quadtree structure square block and a block (square or rectangle) divided by a binary tree structure, a ternary tree structure, or an asymmetric tree structure.

The transform unit 120 may perform a transform based on a plurality of transforms (or transform combinations), and the transform scheme may be referred to as multiple transform selection (MTS). The MTS may also be referred to as an Adaptive Multiple Transform (AMT) or an Enhanced Multiple Transform (EMT).

The MTS (or AMT or EMT) may refer to a transform scheme performed based on a transform (or transform combinations) adaptively selected from the plurality of transforms (or transform combinations).

The plurality of transforms (or transform combinations) may include transforms (or transform combinations) described in FIG. 6 of this specification. In this specification, the transforms or transform types may be denoted by DCT-Type 2, DCT-II, DCT-2 and DCT2, for example.

The transform unit 120 may perform the following embodiments.

The present disclosure provides a method for designing forward DST7 and inverse DST7 using Discrete Fourier Transform (DFT).

The transform unit 120 may implement DST7 through one-dimensional DFT or two-dimensional DFT.

Furthermore, the transform unit 120 may implement DST7 only through integer operation using various scaling method.

Moreover, the transform unit 120 may design DST7 with lengths of 8, 16 and 32 through the method for implementing DST7 using DFT and the method for implementing DST7 only through integer operation.

Detailed embodiments thereof will be described in more detail in the present disclosure.

The quantization unit 130 may quantize the transform coefficient and transmits the quantized transform coefficient to the entropy encoding unit 190 and the entropy encoding unit 190 may entropy-code a quantized signal and output the entropy-coded quantized signal as a bitstream.

Although the transform unit 120 and the quantization unit 130 are described as separate functional units, the present disclosure is not limited thereto and may be combined into one functional unit. The dequantization unit 140 and the inverse transform unit 150 may also be similarly combined into one functional unit.

A quantized signal output from the quantization unit 130 may be used for generating the prediction signal. For example, inverse quantization and inverse transform are applied to the quantized signal through the dequantization unit 140 and the inverse transform unit 1850 in a loop to reconstruct the residual signal. The reconstructed residual signal is added to the prediction signal output from the inter-prediction unit 180 or the intra-prediction unit 185 to generate a reconstructed signal.

Meanwhile, deterioration in which a block boundary is shown may occur due to a quantization error which occurs during such a compression process. Such a phenomenon is referred to as blocking artifacts and this is one of key elements for evaluating an image quality. A filtering process may be performed in order to reduce the deterioration. Blocking deterioration is removed and an error for the current picture is reduced through the filtering process to enhance the image quality.

The filtering unit 160 applies filtering to the reconstructed signal and outputs the applied reconstructed signal to a reproduction device or transmits the output reconstructed signal to the decoded picture buffer 170. The inter-prediction unit 170 may use the filtered signal transmitted to the decoded picture buffer 180 as the reference picture. As such, the filtered picture is used as the reference picture in the inter prediction mode to enhance the image quality and the encoding efficiency.

The decoded picture buffer 170 may store the filtered picture in order to use the filtered picture as the reference picture in the inter-prediction unit 180.

The inter-prediction unit 180 performs a temporal prediction and/or spatial prediction in order to remove temporal redundancy and/or spatial redundancy by referring to the reconstructed picture. Here, since the reference picture used for prediction is a transformed signal that is quantized and dequantized in units of the block at the time of encoding/decoding in the previous time, blocking artifacts or ringing artifacts may exist.

Accordingly, the inter-prediction unit 180 may interpolate a signal between pixels in units of a sub-pixel by applying a low-pass filter in order to solve performance degradation due to discontinuity or quantization of such a signal. Here, the sub-pixel means a virtual pixel generated by applying an interpolation filter and an integer pixel means an actual pixel which exists in the reconstructed picture. As an interpolation method, linear interpolation, bi-linear interpolation, wiener filter, and the like may be adopted.

An interpolation filter is applied to the reconstructed picture to enhance precision of prediction. For example, the inter-prediction unit 180 applies the interpolation filter to the integer pixel to generate an interpolated pixel and the prediction may be performed by using an interpolated block constituted by the interpolated pixels as the prediction block.

Meanwhile, the intra-prediction unit 185 may predict the current block by referring to samples in the vicinity of a block which is to be subjected to current encoding. The intra-prediction unit 185 may perform the following process in order to perform the intra prediction. First, a reference sample may be prepared, which is required for generating the prediction signal. In addition, the prediction signal may be generated by using the prepared reference sample. Thereafter, the prediction mode is encoded. In this case, the reference sample may be prepared through reference sample padding and/or reference sample filtering. Since the reference sample is subjected to prediction and reconstruction processes, a quantization error may exist. Accordingly, a reference sample filtering process may be performed with respect to each prediction mode used for the intra prediction in order to reduce such an error.

The prediction signal generated through the inter-prediction unit 180 or the intra-prediction unit 185 may be used for generating the reconstructed signal or used for generating the residual signal.

FIG. 2 is a schematic block diagram of a decoder in which decoding of a video signal is performed as an embodiment to which the present disclosure is applied.

Referring to FIG. 2, the decoder 200 may be configured to include a parsing unit (not illustrated), an entropy decoding unit 210, a dequantization unit 220, an inverse transform unit 230, a filtering unit 240, a decoded picture buffer (DPB) unit 250, an inter-prediction unit 260, and an intra-prediction unit 265.

In addition, a reconstructed video signal output through the decoder 200 may be reproduced through a reproduction device.

The decoder 200 may receive the signal output from the encoder 100 of FIG. 1 and the received signal may be entropy-decoded through the entropy decoding unit 210.

The dequantization unit 220 obtains the transform coefficient from an entropy-decoded signal by using quantization step size information.

The inverse transform unit 230 inversely transforms the transform coefficient to obtain the residual signal.

Here, the present disclosure provides a method for configuring a transform combination for each transform configuration group divided by at least one of a prediction mode, a block size or a block shape and the inverse transform unit 230 may perform inverse transform based on the transform combination configured by the present disclosure. Further, the embodiments described in the present disclosure may be applied The inverse transform unit 230 may perform the following embodiments.

The present disclosure provides a method for designing forward DST7 and inverse DST7 using Discrete Fourier Transform (DFT).

The inverse transform unit 230 may implement DST7 through one-dimensional DFT or two-dimensional DFT.

Furthermore, the inverse transform unit 230 may implement DST7 only through integer operation using various scaling method.

Moreover, the inverse transform unit 230 may design DST7 with lengths of 8, 16 and 32 through the method for implementing DST7 using DFT and the method for implementing DST7 only through integer operation.

As an embodiment, the inverse transform unit 230 may derive a transform combination corresponding to a transform index and perform inverse transform for the vertical or horizontal direction for a current block using DST7 or DCT8. Here, the transform combination may include a horizontal transform and a vertical transform, and the horizontal transform and the vertical transform may correspond to any one of DST7 and DCT8.

As an embodiment, when 33-point Discrete Fourier Transform (DFT) is applied to DST7, a step of dividing one row or one column of the DST7 into two partial vector signals and a step of applying 11-point DFT type 1 or 11-point DFT type 2 to the two partial vector signals may be included As an embodiment, when one row or one column of the DST7 is represented as src[0 . . . 15], the two partial vector signals may be represented as src[0 . . . 4] and src[5 . . . 15].

As an embodiment, when 65-point Discrete Fourier Transform (DFT) is applied to the DST7, a step of dividing one row or one column of the DST7 into three partial vector signals and a step of applying 13-point DFT type 1 or 13-point DFT type 2 to the three partial vector signals may be included As an embodiment, when one row or one column of the DST7 is represented as src[0 . . . 31], the three partial vector signals may be represented as src[0 . . . 5], src[6 . . . 18] and src[19 . . . 31].

As an embodiment, 13-point DFT type 1 may be applied to src[0 . . . 5] among the three partial vector signals, and 13-point DFT type 2 may be applied to src[6 . . . 18] and src[19 . . . 31].

Meanwhile, the inverse transform unit 230 may perform inverse primary transform for the vertical direction using vertical primary transform and inverse primary transform for the horizontal direction using horizontal primary transform for a transform coefficient block.

Furthermore, although a horizontal transform is applied after a vertical transform is applied, the present disclosure is not limited thereto. That is, the horizontal transform may be applied first and then the vertical transform may be applied.

As an embodiment, a combination of the horizontal transform and the vertical transform may include at least one of embodiments of FIG. 6.

Although the dequantization unit 220 and the inverse transform unit 230 are described as separate functional units, the present disclosure is not limited thereto and may be combined into one functional unit.

The obtained residual signal is added to the prediction signal output from the inter-prediction unit 260 or the intra-prediction unit 265 to generate the reconstructed signal.

The filtering unit 240 applies filtering to the reconstructed signal and outputs the applied reconstructed signal to a generation device or transmits the output reconstructed signal to the decoded picture buffer unit 250. The inter-prediction unit 250 may use the filtered signal transmitted to the decoded picture buffer unit 260 as the reference picture.

In the present disclosure, the embodiments described in the transform unit 120 and the respective functional units of the encoder 100 may be equally applied to the inverse transform unit 230 and the corresponding functional units of the decoder, respectively.

FIG. 3 illustrates embodiments to which the disclosure may be applied, FIG. 3A is a diagram for describing a block split structure based on a quadtree (hereinafter referred to as a "QT"), FIG. 3B is a diagram for describing a block split structure based on a binary tree (hereinafter referred to as a "BT"), FIG. 3C is a diagram for describing a block split structure based on a ternary tree (hereinafter referred to as a "TT"), and FIG. 3D is a diagram for describing a block split structure based on an asymmetric tree (hereinafter referred to as an "AT").

In video coding, one block may be split based on a quadtree (QT). Furthermore, one subblock split by the QT may be further split recursively using the QT. A leaf block that is no longer QT split may be split using at least one method of a binary tree (BT), a ternary tree (TT) or an asymmetric tree (AT). The BT may have two types of splits of a horizontal BT (2N×N, 2N×N) and a vertical BT (N×2N, N×2N). The TT may have two types of splits of a horizontal TT (2N×1/2N, 2N×N, 2N×1/2N) and a vertical TT (½N× 2N, N×2N, ½N×2N). The AT may have four types of splits of a horizontal-up AT (2N×1/2N, 2N×3/2N), a horizontal-down AT (2N×3/2N, 2N×1/2N), a vertical-left AT (½N×2N, 3/2N×2N), and a vertical-right AT (3/2N×2N, ½N×2N). Each BT, TT, or AT may be further split recursively using the BT, TT, or AT.

FIG. 3A shows an example of a QT split. A block A may be split into four subblocks A0, A1, A2, and A3 by a QT. The subblock A1 may be split into four subblocks B0, B1, B2, and B3 by a QT.

FIG. 3B shows an example of a BT split. A block B3 that is no longer split by a QT may be split into vertical BTs C0 and C1 or horizontal BTs D0 and D1. As in the block C0, each subblock may be further split recursively like the form of horizontal BTs E0 and E1 or vertical BTs F0 and F1.

FIG. 3C shows an example of a TT split. A block B3 that is no longer split by a QT may be split into vertical TTs C0, C1, and C2 or horizontal TTs D0, D1, and D2. As in the block C1, each subblock may be further split recursively like the form of horizontal TTs E0, E1, and E2 or vertical TTs F0, F1, and F2.

FIG. 3D shows an example of an AT split. A block B3 that is no longer split by a QT may be split into vertical ATs C0 and C1 or horizontal ATs D0 and D1. As in the block C1, each subblock may be further split recursively like the form of horizontal ATs E0 and E1 or vertical TTs F0 and F1.

Meanwhile, BT, TT, and AT splits may be split together. For example, a subblock split by a BT may be split by a TT or AT. Furthermore, a subblock split by a TT may be split by a BT or AT. A subblock split by an AT may be split by a BT or TT. For example, after a horizontal BT split, each subblock may be split into vertical BTs or after a vertical BT split, each subblock may be split into horizontal BTs. The two types of split methods are different in a split sequence, but have the same finally split shape.

Furthermore, if a block is split, the sequence that the block is searched may be defined in various ways. In general, the search is performed from left to right or from top to bottom. To search a block may mean a sequence for determining whether to split an additional block of each split subblock or may mean a coding sequence of each subblock if a block is no longer split or may mean a search sequence when information of another neighbor block is referred in a subblock.

FIGS. 4 and 5 are embodiments to which the disclosure is applied. FIG. 4 illustrates a schematic block diagram of a transform and quantization unit 120/130 and a dequantization and transform unit 140/150 within the encoder, and FIG. 5 illustrates a schematic block diagram of a dequantization and transform unit 220/230 within the decoder.

Referring to FIG. 4, the transform and quantization unit 120/130 may include a primary transform unit 121, a secondary transform unit 122 and the quantization unit 130. The dequantization and transform unit 140/150 may include the dequantization unit 140, an inverse secondary transform unit 151 and an inverse primary transform unit 152.

Referring to FIG. 5, the dequantization and transform unit 220/230 may include the dequantization unit 220, an inverse secondary transform unit 231 and an inverse primary transform unit 232.

In the disclosure, when a transform is performed, the transform may be performed through a plurality of steps. For example, as in FIG. 4, two steps of a primary transform and a secondary transform may be applied or more transform steps may be used according to an algorithm. In this case, the primary transform may be referred to as a core transform.

The primary transform unit 121 may apply a primary transform on a residual signal. In this case, the primary transform may be pre-defined in a table form in the encoder and/or the decoder.

A discrete cosine transform type 2 (hereinafter "DCT2") may be applied to the primary transform.

Alternatively, a discrete sine transform-type 7 (hereinafter called "DST7") may be applied to a specific case. For example, in the intra prediction mode, the DST7 may be applied to a 4×4 block.

Further, the primary transform may adopt combinations of various transforms DST 7, DCT 8, DST 1, and DCT 5 of the multiple transform selection (MTS). For example, FIG. 6 may be adopted.

The secondary transform unit 122 may apply the secondary transform to a primary transformed signal and here, the secondary transform may be predefined in the table in the encoder and/or the decoder.

As an embodiment, the secondary transform may conditionally adopt a non-separable secondary transform (hereinafter, referred to as 'NSST'). For example, the NSST may be applied only to the intra prediction block and may have a transform set applicable to each prediction mode group.

Here, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, when the transform for prediction mode 52 is applied, input data is transposed and then applied because prediction mode 52 has the same transform set as prediction mode 16.

Meanwhile, since the symmetry for the direction does not exist in the case of a planar mode and a DC mode, each mode has a different transform set and the corresponding transform set may include two transforms. In respect to the remaining direction modes, each transform set may include three transforms.

As another embodiment, the secondary transform may adopt combinations of various transforms DST 7, DCT 8, DST 1, and DCT 5 of the multiple transform selection (MTS). For example, FIG. 6 may be adopted.

As another embodiment, DST7 may be applied as primary transform.

As another embodiment, DCT8 may be applied as primary transform.

As another embodiment, the NSST may be applied to only an 8×8 top-left region instead of the entire primarily transformed block. For example, 8×8 NSST is applied when the block size is 8×8 or more and 4×4 NSST is applied when the block size is less than 8×8. Here, blocks are divided into 4×4 blocks and then 4×4 NSST is applied to each block.

As another embodiment, 4×4 NSST may also be applied in the case of 4×N/N×4 (N≥16).

The NSST, 4×4 NSST and 8×8 NSST will be described in more detail with reference to FIG. 12 to FIG. 15 and other embodiments in the specification.

The quantization unit 130 may perform quantization on a secondarily transformed signal.

The dequantization and inverse transform units 140/150 inversely perform the aforementioned process, and redundant description will be omitted.

FIG. 5 is a schematic block diagram of a dequantization unit 220 and an inverse transform unit 230 in a decoder.

Referring to FIG. 5 above, the dequantization and inverse transform units 220 and 230 may include a dequantization unit 220, an inverse secondary transform unit 231, and an inverse primary transform unit 232.

The dequantization unit 220 obtains the transform coefficient from an entropy-decoded signal by using quantization step size information.

The inverse secondary transform unit 231 performs an inverse secondary transform for the transform coefficients. Here, the inverse secondary transform represents an inverse transform of the secondary transform described in FIG. 4 above.

As another embodiment, the secondary transform may adopt combinations of various transforms DST 7, DCT 8, DST 1, and DCT 5 of the multiple transform selection (MTS). For example, FIG. 6 may be adopted.

The inverse primary transform unit 232 performs an inverse primary transform for the inverse secondary transformed signal (or block) and obtains the residual signal. Here, the inverse primary transform represents the inverse transform of the primary transform described in FIG. 4 above.

As an embodiment, the primary transform may adopt combinations of various transforms DST 7, DCT 8, DST 1, and DCT 5 of the multiple transform selection (MTS). For example, FIG. 6 may be adopted.

As an embodiment of the present disclosure, the DST 7 may be applied to the primary transform.

As an embodiment of the present disclosure, the DCT 8 may be applied to the primary transform.

The present disclosure may provide a method for configuring a transform combination for each transform configuration group divided by at least one of a prediction mode, a block size or a block shape and the inverse primary transform unit 232 may perform the inverse transform based on the transform combination configured by the present disclosure. Further, the embodiments described in the present disclosure may be applied.

FIG. 6 is a table showing a transform configuration group to which Multiple Transform Selection (MTS) is applied as an embodiment to which the present disclosure is applied.

Transform Configuration Group to which Multiple Transform Selection (MTS) is Applied In the present disclosure, a j-th transform combination candidate for transform configuration group $G_i$ is represented by a pair shown in Equation 1 below.

$$(H(G_i,j), V(G_i,j))$$ [Equation 1]

Here, $H(G_i, j)$ indicates the horizontal transform for the j-th candidate, and $V(G_i, j)$ indicates the vertical transform for the j-th candidate. For example, in FIG. 6, $H(G_3, 2)$=DST 7, $V(G_3, 2)$=DCT 8 may be represented. Depending on a context, a value assigned to $H(G_i, j)$ or $V(G_i, j)$ may be a nominal value to distinguish transformations, as in the example above or may be an index value indicating the transform or may be a 2 dimensional (D) matrix for the transform.

Further, in the present disclosure, a 2D matrix value for DCT and DST may be represented as shown in Equations 2 and 3 below.

$$\text{DCT type 2:} C_N^{II}, \text{DCT type 8:} C_N^{VIII}$$ [Equation 2]

$$\text{DST type 7:} S_N^{VII}, \text{DST type 4:} S_N^{IV}$$ [Equation 3]

Here, whether the transform is DST or DCT is represented by S or C, a type number is represented as a superposition in the form of a Roman number, and N of a lower subscript indicates that the transform is an N×N transform. Further, in the 2D matrix such as the $C_N^{II}$ and $S_N^{IV}$, it is assumed that column vectors form a transform basis.

Referring to FIG. 6, transform configuration groups may be determined on the basis of a prediction mode and the number of groups may be a total of 6 (G0 to G5). G0 to G4 correspond to a case in which intra-prediction is applied and G5 represents transform combinations (or a transform set or a transform combination set) applied to a residual block generated according to an inter-prediction.

One transform combination may include a horizontal transform (or row transform) applied to rows of a corresponding 2D block and a vertical transform (or column transform) applied to columns.

Here, each of all transform configuration groups may have four transform combination candidates. The four transform combination candidates may be selected or determined through transform combination index of 0 to 3 and an encoder may encode the transform combination index and transmit the encoded transform combination index to a decoder.

As an embodiment, residual data (or residual signal) obtained through intra-prediction may have different statistical characteristics according to intra-prediction modes. Accordingly, transforms other than general cosine transform (e.g., DCT2 and the like) may be applied to intra-prediction modes as illustrated in FIG. 6.

Referring to FIG. 6, a case in which 35 intra-prediction modes are used and a case in which 67 intra-prediction modes are used are illustrated. A plurality of transform combinations may be applied to each transform configuration group in each intra-prediction mode column. For example, the plurality of transform combinations may include four (row transform and column transform) combinations. As a specific example, DST-7 and DCT-5 can be applied in both the row (horizontal) direction and column (vertical) direction in group 0 and thus a total of four combinations is possible.

Since a total of four transform kernel combinations can be applied per intra-prediction mode, a transform combination index for selecting one of them may be transmitted for each transform unit. In this specification, the transform combination index may be referred to as an MTS index and represented as mts_idx.

In addition, a case in which DCT2 is optimal for both the row direction and column direction may be generated due to characteristics of a residual signal in addition to the transform kernels proposed in FIG. 6. Accordingly, transform may be adaptively performed by defining an MTS flag for each coding unit. Here, DCT2 may be applied to both the row direction and column direction when the MTS flag is 0 and one of the four combinations may be selected or determined through an MTS index when the MTS flag is 1.

As an embodiment, when the MTS flag is 1, if the number of non-zero transform coefficients is not greater than a threshold for one transform unit, the transform kernels of FIG. 6 are not applied and DST-7 may be applied to both the row direction and column direction. For example, the threshold may be set to 2 which may be differently set on the basis of a block size or a transform unit size. This may be applied to other embodiments in the specification.

As an embodiment, transform coefficient values are parsed first, and if the number of non-zero transform coefficients is not greater than the threshold, MTS index is not parsed and DST-7 may be applied to reduce the amount of transmission of additional information.

As an embodiment when the MTS flag is 1, if the number of non-zero transform coefficients is greater than the threshold for one transform unit, MTS index is parsed and horizontal transform and vertical transform may be determined on the basis of the MTS index.

As an embodiment, MTS may be applied only when both the width and height of a transform unit are equal to or less than 32.

As an embodiment, FIG. 6 may be preconfigured through off-line training.

As an embodiment, the MTS index may be defined as an index that can simultaneously indicate combinations of horizontal transform and vertical transform. Alternatively, the MTS index may separately define a horizontal transform index and a vertical transform index.

As an embodiment, the MTS flag or the MTS index may be defined at at least one of sequence, picture, slice, block, coding unit, transform unit, and prediction unit levels. For example, the MTS flag or the MTS index may be defined at at least one of coding unit and transform unit levels.

FIG. 7 is a flowchart showing an encoding process in which Multiple Transform Selection (MTS) is performed as an embodiment to which the present disclosure is applied.

In the present disclosure, an embodiment in which transforms are a separately applied to the horizontal direction and the vertical direction is basically described, but the transform combination may be constituted even by non-separable transforms.

Alternatively, the transform combination may be configured by a mixture of separable transforms and non-separable transforms. In this case, when the non-separable transform is used, row/column transform selection or horizontal/vertical direction selection may not be required and only when the separable transform is selected, the transform combinations of FIG. 6 above may be used.

Further, schemes proposed by the present disclosure may be applied regardless of the primary transform or the secondary transform. That is, there is no limit that the schemes should be applied only to any one of both the primary transform and the secondary transform and the schemes may be applied to both the primary transform and the secondary transform. Here, the primary transform may mean a transform for transforming the residual block first and the secondary transform may mean a transform for applying the transform to the block generated as a result of the primary transform.

First, the encoder may determine the transform configuration group corresponding to the current block (S710). Here, the transform configuration group may mean the transform configuration group of FIG. 6 above and the present disclosure is not limited thereto and the transform configuration group may include other transform combinations.

The encoder may perform a transform for candidate transform combinations available in the transform configuration group (S720).

As a result of performing the transform, the encoder may determine or select a transform combination having a smallest rate distortion (RD) cost (S730).

The encoder may encode the transform combination index corresponding to the selected transform combination (S740).

FIG. 8 is a flowchart showing a decoding process in which Multiple Transform Selection (MTS) is performed as an embodiment to which the present disclosure is applied.

First, the decoder may determine the transform configuration group for the current block (S810).

The decoder may parse (or obtain) the transform combination index from the video signal and here, the transform combination index may correspond to any one of the plurality of transform combinations in the transform configuration group (S820). For example, the transform configuration group may include Discrete Sine Transform type (DST) 7 and Discrete Cosine Transform type (DST) 8. The transform combination index may be referred to as the MTS index.

As an embodiment, the transform configuration group may be configured based on at least one of the prediction mode, the block size, or the block shape of the current block.

The decoder may derive the transform combination corresponding to the transform combination index (S830). Here, the transform combination may include the horizontal transform and the vertical transform, and may include at least one of the DST-7 or the DCT-8.

Further, the transform combination may mean the transform combination described in FIG. 6 above, but the present disclosure is not limited thereto. That is, the transform combination may be configured by other transform combinations depending on other embodiments in the present disclosure.

The decoder may perform the inverse transform for the current block based on the transform combination (S840). When the transform combination includes the row (horizontal) transform and the column (vertical) transform, the column (vertical) transform may be applied after applying the row (horizontal) transform first. However, the present disclosure is not limited thereto and the transform order may be reversed or when the transform combination includes the non-separable transforms, the non-separable transform may be immediately applied.

As an embodiment, when the vertical transform or the horizontal transform is the DST-7 or the DCT-8, the inverse transform of the DST-7 or the inverse transform of the DCT-8 may be applied to each column and then applied to each row.

As an embodiment, in respect to the vertical transform or the horizontal transform, different transform may be applied to each row and/or to each column.

As an embodiment, the transform combination index may be obtained based on the MTS flag indicating whether the MTS is performed. That is, the transform combination index may be obtained when the MTS is performed according to the MTS flag.

As an embodiment, the decoder may check whether the number of non-zero transform coefficients is greater than the threshold. In this case, the transform combination index may be obtained when the number of non-zero transform coefficients is greater than the threshold.

As an embodiment, the MTS flag or the MTS index may be defined in at least one level of a sequence, a picture, a slice, a block, a coding unit, a transform unit, or a prediction unit.

As an embodiment, the inverse transform may be applied only when both the width and the height of the transform unit are equal to or smaller than 32.

On the other hand, as another embodiment, a process of determining the transform configuration group and a process of parsing the transform combination index may be performed at the same time. Alternatively, step S810 above may be preconfigured and omitted in the encoder and/or the decoder.

FIG. 9 is a flowchart for describing a process of encoding an MTS flag and an MTS index as an embodiment to which the present disclosure is applied.

The encoder may determine whether the Multiple Transform Selection (MTS) is applied to the current block (S910).

When the Multiple Transform Selection (MTS) is applied, the encoder may encode MTS flag=1 (S920).

In addition, the encoder may determine the MTS index based on at least one of the prediction mode, the horizontal transform, and the vertical transform of the current block (S930). Here, the MTS index may mean an index indicating any one of the plurality of transform combinations for each intra prediction mode and the MTS index may be transmitted for each transform unit.

When the MTS index is determined, the encoder may encode the MTS index (S940).

On the other hand, when the Multiple Transform Selection (MTS) is not applied, the encoder may encode MTS flag=0 (S950).

FIG. 10 is a flowchart for describing a decoding process in which a horizontal transform or vertical transform is applied to a row or a column based on an MTS flag and an MTS index as an embodiment to which the present disclosure is applied.

The decoder may parse the MTS flag from the bitstream (S1010). Here, the MTS flag may indicate whether the Multiple Transform Selection (MTS) is applied to the current block.

The decoder may determine whether the Multiple Transform Selection (MTS) is applied to the current block based on the MTS flag (S1020). For example, it may be checked whether the MTS flag is 1.

When the MTS flag is 1, the decoder may check whether the number of non-zero transform coefficients is greater than (or equal to or greater than) the threshold (S1030). For example, the threshold may be configured to 2, which may be configured differently based on the block size or the size of the transform unit.

When the number of non-zero transform coefficients is greater than the threshold, the decoder may parse the MTS index (S1040). Here, the MTS index may mean any one of the plurality of transform combinations for each intra prediction mode or inter prediction mode and the MTS index may be transmitted for each transform unit. Alternatively, the MTS index may mean an index indicating any one transform combination defined in a preconfigured transform combination table and here, the preconfigured transform combination table may mean FIG. 6 above, but the present disclosure is limited thereto.

The decoder may derive or determine the horizontal transform and the vertical transform based on at least one of the MTS index and the prediction mode (S1050).

Alternatively, the decoder may derive the transform combination corresponding to the MTS index. For example, the decoder may derive or determine the horizontal transform and the vertical transform corresponding to the MTS index.

Meanwhile, when the number of non-zero transform coefficients is not greater than the threshold, the decoder may apply a preconfigured vertical inverse transform for each column (S1060). For example, the vertical inverse transform may be the inverse transform of the DST7.

In addition, the decoder may apply preconfigured horizontal inverse transform for each row (S1070). For example, the horizontal inverse transform may be an inverse transform of DST7. That is, when the number of non-zero transform coefficients is not greater than the threshold, a transform kernel preconfigured in the encoder or the decoder may be used. For example, widely used transform kernels (e.g., DCT-2 and the like) instead of transform kernels defined in the transform combination table as illustrated in FIG. 6 may be used.

Meanwhile, when the MTS flag is 0, the decoder may apply the preconfigured vertical inverse transform for each column (S1080). For example, the vertical inverse transform may be the inverse transform of the DCT2.

In addition, the decoder may apply the preconfigured horizontal inverse transform for each row (S1090). For example, the horizontal inverse transform may be the inverse transform of the DCT2. That is, when the MTS flag is 0, the transform kernel preconfigured in the encoder or decoder may be used. For example, the transform kernel that is not defined in the transform combination table illustrated in FIG. 6 above, but is widely used may be used.

FIG. 11 is a flowchart of performing an inverse transform based on a transform related parameter as an embodiment to which the present disclosure is applied.

The decoder to which the present disclosure is applied may obtain sps_mts_intra_enabled_flag or sps_mts_inter_enabled_flag (S1110). Here, sps_mts_intra_enabled_flag indicates whether tu_mts_flag exists in a residual coding syntax of an intra coding unit. For example, when sps_mts_intra_enabled_flag=0, tu_mts_flag does not exist in the residual coding syntax of the intra coding unit and when sps_mts_intra_enabled_flag=0, tu_mts_flag exists in the residual coding syntax of the intra coding unit. In addition, sps_mts_inter_enabled_flag indicates whether tu_mts_flag exists in the residual coding syntax of the inter coding unit. For example, when sps_mts_inter_enabled_flag=0, tu_mts_flag does not exist in the residual coding syntax of the inter coding unit and when sps_mts_inter_enabled_flag=0, tu_mts_flag exists in the residual coding syntax of the inter coding unit.

The decoder may obtain tu_mts_flag based on sps_mts_intra_enabled_flag or sps_mts_inter_enabled_flag (S1120). For example, when sps_mts_intra_enabled_flag=1 or sps_mts_inter_enabled_flag=1, the decoder may obtain tu_mts_flag. Here, tu_mts_flag indicates whether multiple transform selection (hereinafter, referred to as "MTS") is applied to a residual sample of a luma transform block. For example, when tu_mts_flag=0, the MTS is not applied to the residual sample of the luma transform block and when tu_mts_flag=1, the MTS is applied to the residual sample of the luma transform block.

As another example, at least one of the embodiments of the present disclosure may be applied to the tu_mts_flag.

The decoder may obtain mts_idx based on tu_mts_flag (S1130). For example, when tu_mts_flag=1, the decoder may obtain mts_idx. Here, mts_idx indicates which transform kernel is applied to luma residual samples along the horizontal and/or vertical direction of a current transform block.

For example, at least one of the embodiments of the present disclosure may be applied to mts_idx. As a specific example, at least one of the embodiments of FIG. 6 above may be applied.

The decoder may derive the transform kernel corresponding to mts_idx (S1140). For example, the transform kernel corresponding to the mts_idx may be defined by being divided into the horizontal transform and the vertical transform.

As another example, different transform kernels may be applied to the horizontal transform and the vertical transform. However, the present disclosure is not limited thereto, and the same transform kernel may be applied to the horizontal transform and the vertical transform.

As an embodiment, mts_idx may be defined as shown in Table 1 below.

TABLE 1

| mts_idx[x0][y0] | trTypeHor | trTypeVer |
|---|---|---|
| 0 | 0 | 0 |
| 1 | 1 | 1 |
| 2 | 2 | 1 |
| 3 | 1 | 2 |
| 4 | 2 | 2 |

In addition, the decoder may perform inverse transform on the basis of the transform kernel (S1150).

Although an embodiment in which tu_mts_flag is obtained in order to determine whether MTS is applied and mts_idx is obtained according to an obtained tu_mtx_flag value to determine a transform kernel has been mainly described in FIG. 11, the present disclosure is not limited thereto. For example, the decoder may directly parse mtx_idx to determine a transform kernel. In this case, the aforementioned Table 1 may be used. That is, DCT-2 may be applied for the horizontal/vertical directions when the mtx_idx value indicates 0 and DST-7 and/or DCT-8 may be applied in response to an mts_idx value when the mts_idx value indicates a value other than 0.

As another embodiment of the present disclosure, a decoding process of performing the transform process is described.

The decoder may check a transform size nTbS (S10). Here, the transform size nTbS may be a variable representing a horizontal sample size of scaled transform coefficients.

The decoder may check a transform kernel type trType (S20). Here, the transform kernel type trType may be a variable representing the type of transform kernel and various embodiments of the present disclosure may be applied.

The transform kernel type trType may include a horizontal transform kernel type trTypeHor and a vertical transform kernel type trTypeVer.

Referring to Table 1 above, when the transform kernel type trType is 0, the transform kernel type may represent DCT2, when the transform kernel type trType is 1, the transform kernel type may represent DST7, and when the transform kernel type trType is 2, the transform kernel type may represent DCT8.

The decoder may perform a transform matrix multiplication based on at least one of the transform size nTbS or the transform kernel type (S30).

As another example, when the transform kernel type is 1 and the transform size is 4, a predetermined transform matrix 1 may be applied when performing the transform matrix multiplication.

As another example, when the transform kernel type is 1 and the transform size is 8, a predetermined transform matrix 2 may be applied when performing the transform matrix multiplication.

As another example, when the transform kernel type is 1 and the transform size is 16, a predetermined transform matrix 3 may be applied when performing the transform matrix multiplication.

As another example, when the transform kernel type is 1 and the transform size is 32, a predefined transform matrix 4 may be applied when performing the transform matrix multiplication.

Similarly, when the transform kernel type is 2 and the transform size is 4, 8, 16, or 32, predefined transform matrices 5, 6, 7, and 8 may be applied, respectively.

Here, each of the predefined transform matrices 1 to 8 may correspond to any one of various types of transform matrices. As an example, the transform matrix of the type illustrated in FIG. 6 above may be applied.

The decoder may derive a transform sample based on the transform matrix multiplication (S40).

Although the above-described embodiments may be independently used, the present disclosure is not limited thereto and may be used by being combined with other embodiments of this specification.

FIG. 12 is a table showing allocation of a transform set for each intra prediction mode in an NSST as an embodiment to which the present disclosure is applied.

Non-Separable Secondary Transform (NSST)

The secondary transform unit may apply the secondary transform to a primary transformed signal and here, the secondary transform may be defined in the table in the encoder and/or the decoder.

As an embodiment, the secondary transform may conditionally adopt a non-separable secondary transform (hereinafter, referred to as 'NSST'). For example, the NSST may be applied only to the intra prediction block and may have a transform set applicable to each prediction mode group.

Here, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, when the transform for prediction mode 52 is applied, input data is transposed and then applied because prediction mode 52 has the same transform set as prediction mode 16.

Meanwhile, since the symmetry for the direction does not exist in the case of a planar mode and a DC mode, each mode may have a different transform set and the corresponding transform set may include two transforms. In respect to the remaining directional modes, each transform set may include three transforms. However, the present disclosure is not limited thereto, and each transform set may include a plurality of transforms.

FIG. 13 is a calculation flow diagram for Givens rotation as an embodiment to which the present disclosure is applied.

As another embodiment, the NSST may not be applied to the entire primary transformed block but may be applied only to a top-left 8×8 area. For example, when the block size is 8×8 or more, 8×8 NSST is applied and when the block size is less than 8×8, 4×4 NSST is applied and in this case, the block is divided into 4×4 blocks and then, the 4×4 NSST is applied to each of the divided blocks.

As another embodiment, even in the case of 4×N/N×4 (N>=16), the 4×4 NSST may be applied.

Since both the 8×8 NSST and the 4×4 NSST follow a transformation combination configuration described in the present disclosure and are the non-separable transforms, the 8×8 NSST receives 64 data and outputs 64 data and the 4×4 NSST has 16 inputs and 16 outputs.

Both the 8×8 NSST and the 4×4 NSST are configured by a hierarchical combination of Givens rotations. A matrix corresponding to one Givens rotation is shown in Equation 4 below and a matrix product is shown in Equation 5 below.

$$R_\theta = \begin{bmatrix} \cos\theta & -\sin\theta \\ \sin\theta & \cos\theta \end{bmatrix}$$ [Equation 4]

$$l_m = x_m\cos\theta - x_n\sin\theta$$
$$l_n = x_m\sin\theta + x_n\cos\theta$$ [Equation 5]

As illustrated in FIG. 13 above, since one Givens rotation rotates two data, in order to process 64 data (for the 8×8 NSST) or 16 data (for the 4×4 NSST), a total of 32 or 8 Givens rotations are required.

Therefore, a bundle of 32 or 8 is used to form a Givens rotation layer. Output data for one Givens rotation layer is transferred as input data for a next Givens rotation layer through a determined permutation.

FIG. 14 illustrates one round configuration in 4×4 NSST constituted by a givens rotation layer and permutations as an embodiment to which the present disclosure is applied.

Referring to FIG. 14 above, it is illustrated that four Givens rotation layers are sequentially processed in the case of the 4×4 NSST. As illustrated in FIG. 14 above, the output data for one Givens rotation layer is transferred as the input data for the next Givens rotation layer through a determined permutation (i.e., shuffling).

As illustrated in FIG. 14 above, patterns to be permutated are regularly determined and in the case of the 4×4 NSST, four Givens rotation layers and the corresponding permutations are combined to form one round.

In the case of the 8×8 NSST, six Givens rotation layers and the corresponding permutations form one round. The 4×4 NSST goes through two rounds and the 8×8 NSST goes through four rounds. Different rounds use the same permutation pattern, but applied Givens rotation angles are different. Accordingly, angle data for all Givens rotations constituting each transform need to be stored.

As a last step, one permutation is further finally performed on the data output through the Givens rotation layers, and corresponding permutation information is stored separately for each transform. In forward NSST, the corresponding permutation is performed last and in inverse NSST, a corresponding inverse permutation is applied first on the contrary thereto.

In the case of the inverse NSST, the Givens rotation layers and the permutations applied to the forward NSST are performed in the reverse order and rotation is performed by taking a negative value even for an angle of each Givens rotation.

FIG. 15 is a flowchart through which forward DST7 with a length of 16 is designed using Discrete Fourier Transform (DFT) as an embodiment to which the present disclosure is applied.

Embodiment 1: Design and Implementation of DST7 with Length of 16

The present disclosure provides specific embodiments of designing DST7 using DFT. Embodiments of the present disclosure can be used to design DCT8 and applied to MTS configuration.

Signals (information) transmitted between blocks illustrated in the flowchart of FIG. 15 may be scalar values or may have a vector form. For example, a vector may be denoted by x[0 . . . N−1] which represents a signal (information) including N elements such as x[0 . . . N−1]=[x[0] x[1] . . . x[N−2] x[N−1]]. A partial signal of the vector x[0 . . . N−1] may be represented as x[i . . . j]. For example, a partial signal of x[0 . . . 15] may be represented as x[5 . . . 10]=[x[5] x[6] x[7] x[8] x[9] x[10]].

Referring to FIG. 15, a flowchart through which DST7 is implemented for one row or column with a length of 16 is illustrated. Here, DST7 with a length of 16 is denoted by DST7_B16, forward DST7 is denoted by forward DST7_B16, and inverse DST7 is denoted by inverse DST7_B16.

In addition, input data may be denoted by x[0 . . . 15] and final output data may be denoted by y[0 . . . 15].

An encoder performs pre-processing on a forward DST7 with a length of 16 when input data x[0 . . . 15] is input (S1510).

The encoder may apply DFT to an output w[0 . . . 15] of step S1510 (S1520). Here, step S1520 of applying DFT will be described in detail later with reference to FIG. 17 to FIG. 19.

The encoder may perform post-processing on an output z[0 . . . 15] of step S1520 and output final output data y[0 . . . 15] (S1530).

FIG. 16 is a flowchart through which inverse DST7 with a length of 16 is designed using Discrete Fourier Transform (DFT) as an embodiment to which the present disclosure is applied.

Referring to FIG. 16, a flowchart through which inverse DST7 is implemented for one row or column with a length of 16 is illustrated. Here, input data may be denoted by x[0 . . . 15] and final output data may be denoted by y[0 . . . 15].

A decoder performs pre-processing on inverse DST7 with a length of 16 when input data x[0 . . . 15] is input (S1610).

The decoder may apply DFT to the output of step S1610 (S1620). Here, step S1620 of applying DFT will be described in detail later with reference to FIG. 17 to FIG. 19.

The decoder may perform post-processing on the output of step S1620 and output final output data y[0 . . . 15] (S1630).

FIG. 17 to FIG. 19 are flowcharts through which an xDST7_FFT_B16 function of FIG. 15 and FIG. 16 is applied as embodiments to which the present disclosure is applied.

Referring to FIG. 17, src[0 . . . 15] is input to an xDST7_FFT3 block and src_FFT11[0 . . . 15] is output (S1710). The output src_FFT11[0 . . . 15] may be divided into two partial signals and transmitted.

For example, src_FFT11[0 . . . 4] may be transmitted to an xDST7_FFT11_type1 block and src_FFT11[5 . . . 15] may be transmitted to an xDST7_FFT11_type2 block.

The xDST7_FFT11_type1 block receives src_FFT11[0 . . . 4] and outputs dst[0 . . . 4] (S1720).

The xDST7_FFT11_type2 block receives src_FFT11[5 . . . 15] and outputs dst[5 . . . 15] (S1730).

Here, implementation of the xDST7_FFT11_type1 block will be described in detail with reference to FIG. 18 and implementation of the xDST7_FFT11_type2 block will be described in detail with reference to FIG. 19.

Referring to FIG. 18, src[0 . . . 4] is input to an xDST7_FFT11_half1 block and dst_half1[0 . . . 4] is output (S1810).

The output dst_half1[0 . . . 4] is input to an xDST7_FFT11_type1 block and dst[0 . . . 4] is output (S1820).

Referring to FIG. 19, src[0 . . . 10] is divided into two partial signals and transmitted. For example, src[0 . . . 4] may be transmitted to the xDST7_FFT11_half1 block and src[5 . . . 10] may be transmitted to an xDST7_FFT11_half2 block.

The xDST7_FFT11_half1 block receives src [0 . . . 4] and outputs dst_half1[0 . . . 4] (S1910).

The xDST7_FFT11_half2 block receives src[5 . . . 10] and outputs dst_half2 [0 . . . 5] (S1920).

The encoder/decoder may perform post-processing on the output of step S1920 through an xDST7_FFT11_type2_Post_Processing block and output final output data dst[0 . . . 10] (S1930).

src_FFT11[5 . . . 15] of FIG. 17 corresponds to src[0 . . . 10] of FIG. 19. That is, src[0]=src_FFT11[5], src[1]=src_FFT11[6], . . . , src[10]=src_FFT11[15].

In addition, in the xDST7_FFT11_type2_Post_Processing block of FIG. 19, dst_half1[0 . . . 4] and dst_half2[0 . . . 5] are sequentially input from the left and respectively correspond to input parameters src_half1[0 . . . 4] and src_half2[0 . . . 5]. This will be described in detail with reference to a table showing the operation of each block.

In this manner, the block diagrams of FIG. 15 and FIG. 16 can be interpreted in connection with the block diagrams of FIG. 17 to FIG. 19.

Detailed operations of the functions of FIG. 15 to FIG. 19 can be described with reference to Table 2 to Table 10.

TABLE 2

Operation of forward_DST7_Pre_Processing_B16 function

| | |
|---|---|
| Name | Forward_DST7_Pre_Processing_B16 |
| Input | src[0 . . . 15] |
| Output | dst[0 . . . 15] |
| Operation | dst[0] = src[10]; dst[1] = src[8]; dst[2] = src[1]; dst[3] = −src[12]; dst[4] = −src[14]; dst[5] = src[6]; dst[6] = src[3]; dst[7] = src[5]; dst[8] = −src[15]; dst[9] = src[4]; dst[10] = src[2]; dst[11] = src[7]; dst[12] = −src[13]; dst[13] = −src[11]; dst[14] = src[0]; dst[15] = src[9]; |

TABLE 3

Operation of forward_DST7_Post_Processing_B16 function

| | |
|---|---|
| Name | Forward_DST7_Post_Processing_B16 |
| Input | src[0 . . . 15] |
| Output | dst[0 . . . 15] |
| Operation | int aiReordIdx[16] = {12, 0, 14, 10, 2, 5, 8, 4, 7, 6, 3, 9, 15, 1, 11, 13}; for (int i = 0; i < 16; i++) dst[i] = (int)((src[aiReordIdx[i]] + rnd_factor) >> final_shift); |

In Table 3, rnd_factor=1<<(final_shift−1) can be used. In addition, when a function of applying DST7 to all rows or columns of one block is used in FIGS. 15 and 16, if a value "shift" is delivered through a parameter, final_shift=shift−1 can be used.

TABLE 4

Operation of inverse_DST7_Pre_Processing_B16 function

| | |
|---|---|
| Name | Inverse_DST7_Pre_Processing_B16 |
| Input | src[0 . . . 15] |
| Output | dst[0 . . . 15] |
| Operation | dst[0] = src[5]; dst[1] = src[4]; dst[2] = src[15]; dst[3] = −src[6];<br>dst[4] = −src[7]; dst[5] = src[3]; dst[6] = src[14]; dst[7] = src[13];<br>dst[8] = −src[8]; dst[9] = src[2]; dst[10] = src[1]; dst[11] = src[12];<br>dst[12] = −src[9]; dst[13] = −src[10]; dst[14] = src[0]; dst[15] = src[11]; |

TABLE 5

Operation of inverse_DST7_Post_Processing_B16 function

| | |
|---|---|
| Name | Inverse_DST7_Post_Processing_B16 |
| Input | src[0 . . . 15] |
| Output | dst[0 . . . 15] |
| Operation | int aiReordIdx[16] = {12, 13, 0, 11, 14, 1, 10, 15, 2, 9, 5, 3, 8, 6, 4, 7};<br>for (int i = 0; i < 16; i++)<br>dst[i] = Clip3(outputMinimum, outputMaximum, (int)((src[aiReordIdx[i]] + rnd_factor) >> final_shift)); |

In Table 5, rnd_factor=1<<(final_shift−1) can be used. In addition, when a function of applying DST7 to all rows or columns of one block is used in FIGS. 15 and 16, if a value "shift" is delivered through a parameter, final_shift=shift−1 can be used.

In Table 5, outputMinimum and outputMaximum represent a minimum value and a maximum value of an output value, Clip3 function performs operation of Clip3(A, B, C)=(C<A)?A:(C>B)?B:C. That is, the Clip3 function performs clipping such that the value C must be present in the range of A to B.

TABLE 6

Operation of xDST7_FFT3 function

| | |
|---|---|
| Name | xDST7_FFT3 |
| Input | src[0 . . . 15] |
| Output | dst[0 . . . 15] |
| Operation | int C3 = −443;<br>dst[10] = ((−src[0] * C3) + rnd_factor) >> shift;<br>for (Int i = 0; i < 5; i++)<br>{dst[i] = (((src[3*i + 1] + src[3*i + 2] + src[3*i + 3]) << 9) + rnd_factor) >> shift;<br>dst[5 + i] = ((((src[3*i + 1] << 1) − src[3*i + 2] − src[3*i + 3]) << 8) + rnd_factor) >> shift;<br>dst[11 + i] = (((src[3*i + 2] − src[3*i + 3]) * C3) + rnd_factor) >> shift;} |

In Table 6, the value C3 means round $$\left(\sin\left(\frac{2\pi}{3}\right)\cdot 2^9\right)$$

and indicates scaling of a multiplication coefficient by $2^9$. In Table 6, since shift=10 and rnd_factor=1<<(shift−1)=$2^9$ are applied, dst[i] and dst[5+i] may be calculated as represented by Equation 6.

$$dst[i]=(src[3*i+1]+src[3*i+2]+src[3*i+3]+1)>>1$$

$$dst[5+i]=((src[3*i+1]<<1)-src[3*i+2]-src[3*i+3]+2)>>2 \quad \text{[Equation 6]}$$

TABLE 7

Operation of xDST7_FFT11_half1 function

| | |
|---|---|
| Name | xDST7_FFT11_half1 |
| Input | src[0 . . . 4] |
| Output | dst[0 . . . 4] |
| Operation | int C11R[5] = {193, 324, 353, 269, 100};<br>dst[0] = src[0] * C11R[1] + src[1] * C11R[3] − src[2] * C11R[4] − src[3] * C11R[2] − src[4] * C11R[0];<br>dst[1] = src[0] * C11R[2] − src[1] * C11R[4] − src[2] * C11R[1] + src[3] * C11R[0] + src[4] * C11R[3];<br>dst[2] = −src[0] * C11R[3] + src[1] * C11R[2] − src[2] * C11R[0] − src[3] * C11R[4] + src[4] * C11R[1];<br>dst[3] = src[0] * C11R[4] − src[1] * C11R[0] + src[2] * C11R[3] − src[3] * C11R[1] + src[4] * C11R[2];<br>dst[4] = src[0] * C11R[0] + src[1] * C11R[1] + src[2] * C11R[2] + src[3] * C11R[3] + src[4] * C11R[4]; |

In Table 7, a sequence C11R represents a value calculated through round $$\left( \frac{1}{\sqrt{2 \times 16 + 1}} \cdot \sin\left(\frac{2\pi i}{11}\right) \cdot 2^{11} \right),$$

i=1, 2, 3, 4, 5.

TABLE 8

Operation of xDST7_FFT11_half2 function

| | |
|---|---|
| Name | xDST7_FFT11_half2 |
| Input | src[0 . . . 5] |
| Output | dst[0 . . . 5] |
| Operation | int C11I[6] = {357, 300, 148, −51, −233, −342};<br>dst[0] = (src[0] + src[1] + src[2] + src[3] + src[4] + src[5]) * C11I[0];<br>dst[1] = src[0] * C11I[0] + src[1] * C11I[2] + src[2] * C11I[4] + src[3] * C11I[5] + src[4] * C11I[3] + src[5] * C11I[1];<br>dst[2] = src[0] * C11I[0] + src[1] * C11I[3] + src[2] * C11I[5] + src[3] * C11I[2] + src[4] * C11I[1] + src[5] * C11I[4];<br>dst[3] = src[0] * C11I[0] + src[1] * C11I[4] + src[2] * C11I[3] + src[3] * C11I[1] + src[4] * C11I[5] + src[5] * C11I[2];<br>dst[4] = src[0] * C11I[0] + src[1] * C11I[5] + src[2] * C11I[1] + src[3] * C11I[4] + src[4] * C11I[2] + src[5] * C11I[3];<br>dst[5] = src[0] * C11I[0] + src[1] * C11I[1] + src[2] * C11I[2] + src[3] * C11I[3] + src[4] * C11I[4] + src[5] * C11I[5]; |

In Table 8, a sequence C11R represents a value calculated through round $$\left( \frac{1}{\sqrt{2 \times 16 + 1}} \cdot \cos\left(\frac{2\pi i}{11}\right) \cdot 2^{11} \right),$$

i=0, 1, 2, 3, 4, 5.

TABLE 9

Operation of xDST7_FFT11_type1_Post_Processing function

| | |
|---|---|
| Name | xDST7_FFT11_type1_Post_Processing |
| Input | src[0 . . . 4] |
| Output | dst[0 . . . 4] |
| Operation | dst[0] = src[4]; dst[1] = −src[0]; dst[2] = src[1]; dst[3] = src[2]; dst[4] = src[3]; |

TABLE 10

Operation of xDST7_FFT11_type2_Post_Processing function

| | |
|---|---|
| Name | xDST7_FFT11_type2_Post_Processing |
| Input | src_half1[0 . . . 4], src_half2[0 . . . 5] |
| Output | dst[0 . . . 10] |
| Operation | dst[0] = −src_half2[0]; |

TABLE 10-continued

Operation of xDST7_FFT11_type2_Post_Processing function

| | |
|---|---|
| Name | xDST7_FFT11_type2_Post_Processing |
| | dst[1] = src_half2[5] − src_half1[4];<br>dst[2] = −(src_half2[1] − src_half1[0]);<br>dst[3] = src_half2[2] − src_half1[1];<br>dst[4] = −(src_half2[3] + src_half1[2]);<br>dst[5] = src_half2[4] − src_half1[3];<br>dst[6] = −(src_half2[4] + src_half1[3]);<br>dst[7] = src_half2[3] − src_half1[2];<br>dst[8] = src_half2[2] + src_half1[1];<br>dst[9] = −(src_half2[1] + src_half1[0]);<br>dst[10] = src_half2[5] + src_half1[4]; |

When DST7 is applied to a two-dimensional 16×16 block for the horizontal direction (or vertical direction), the flowcharts of FIG. 15 and FIG. 16 may be used for 16 rows (or columns).

FIG. 20 is a flowchart through which forward DST7 with a length of 32 is designed using Discrete Fourier Transform (DFT) as an embodiment to which the present disclosure is applied.

Embodiment 2: Design and Implementation of DST7 with Length of 32

The present disclosure provides specific embodiments of designing DST7 using DFT. Embodiments of the present disclosure can be used to design DCT8 and applied to MTS configuration.

Referring to FIG. 20, a flowchart through which DST7 is implemented for one row or column with a length of 32 is illustrated. Here, DST7 with a length of 32 is denoted by DST7_B32, forward DST7 is denoted by forward DST7_B32, and inverse DST7 is denoted by inverse DST7_B32.

In addition, input data may be denoted by x[0 . . . 31] and final output data may be denoted by y[0 . . . 31].

An encoder performs pre-processing on a forward DST7 with a length of 32 when input data x[0 . . . 31] is input (S2010).

The encoder may apply DFT to an output w[0 . . . 31] of step S2010 (S2020). Here, step S2020 of applying DFT will be described in detail later with reference to FIG. 22 to FIG. 24.

The encoder may perform post-processing on an output z[0 . . . 31] of step S2020 and output final output data y[0 . . . 31] (S2030).

FIG. 21 is a flowchart through which inverse DST7 with a length of 32 is designed using Discrete Fourier Transform (DFT) as an embodiment to which the present disclosure is applied.

Referring to FIG. 21, a flowchart through which inverse DST7 is implemented for one row or column with a length of 32 is illustrated. Here, input data may be denoted by x[0 . . . 31] and final output data may be denoted by y[0 . . . 31].

A decoder performs pre-processing on inverse DST7 with a length of 32 when input data x[0 . . . 31] is input (S2110).

The decoder may apply DFT to the output w[0 . . . 31] of step S2110 (S2120). Here, step S2120 of applying DFT will be described in detail later with reference to FIG. 22 to FIG. 24.

The decoder may perform post-processing on the output z[0 . . . 31] of step S2120 and output final output data y[0 . . . 31] (S2130).

FIG. 22 to FIG. 24 are flowcharts through which an xDST7_FFT_B16 function of FIG. 15 and FIG. 16 is applied as embodiments to which the present disclosure is applied.

Referring to FIG. 22, src[0 . . . 31] is input to an xDST7_FFT5 block and src_FFT13[0 . . . 31] is output (S2210). The output src_FFT13[0 . . . 31] may be divided into three partial signals and transmitted.

For example, src_FFT13[0 . . . 5] may be transmitted to an xDST7_FFT13 type1 block, src_FFT13[6 . . . 18] may be transmitted to an xDST7_FFT13_type2 block, and src_FFT13[19 . . . 31] may be transmitted to an xDST7_FFT13_type2 block.

The xDST7_FFT13_type1 block receives src_FFT13[0 . . . 5] and outputs dst[0 . . . 5](S2220).

The xDST7_FFT13_type2 block receives src_FFT13[6 . . . 18] and outputs dst[6 . . . 18] (S2230).

The xDST7_FFT13_type2 block receives src_FFT13[19 . . . 31] and outputs dst[19 . . . 31] (S2240).

Here, implementation of the xDST7_FFT13_type1 block will be described in detail with reference to FIG. 23 and implementation of the xDST7_FFT13_type2 block will be described in detail with reference to FIG. 24.

Referring to FIG. 23, src[0 . . . 5] is input to an xDST7_FFT13_half1 block and dst_half1[0 . . . 5] is output (S2310).

The output dst_half1[0 . . . 5] is input to an xDST7_FFT14_type1_Post_Processing block and dst[0 . . . 5] is output (S2320).

Referring to FIG. 24, src[0 . . . 12] may be divided into two partial signals and transmitted. For example, src[0 . . . 5] may be transmitted to the xDST7_FFT13_half1 block and src[6 . . . 12] may be transmitted to an xDST7_FFT13 half2 block.

The xDST7_FFT13 half1 block receives src [0 . . . 5] and outputs dst_half1[0 . . . 5] (S2410).

The xDST7_FFT13 half2 block receives src[6 . . . 12] and outputs dst_half2[0 . . . 6] (S2420).

The encoder/decoder may perform post-processing on the outputs of steps S2410 and S2420 through an xDST7_FFT13_type2_Post_Processing block and output final output data dst[0 . . . 12] (S1930).

src_FFT13[0 . . . 5] of FIG. 22 corresponds to src[0 . . . 5] of FIG. 23. That is, src[0]=src_FFT13[0], src[1]=src_FFT13[1], . . . , src[5]=src_FFT13[5].

In addition, src_FFT13[6 . . . 18] or src_FFT13[19 . . . 31] of FIG. 22 corresponds to src[0 . . . 12] of FIG. 24. For example, src[0]=src_FFT13[6], src[1]=src_FFT13[7], . . . , src[12]=src_FFT13[18].

In addition, in the xDST7_FFT13_type2_Post_Processing block of FIG. 24, dst_half1[0 . . . 5] and dst_half2[0 . . . 6] are sequentially input from the left and respectively correspond to input parameters src_half1[0 . . . 5] and src_half2[0 . . . 6]. This will be described in detail with reference to a table showing the operation of each block.

In this manner, the block diagrams of FIG. 20 and FIG. 21 can be interpreted in connection with the block diagrams of FIG. 22 to FIG. 24.

Detailed operations of the functions of FIG. 20 to FIG. 24 can be described with reference to Table 11 to Table 18.

TABLE 11

| Operation of forward_DST7_Pre_Processing_B32 function | |
|---|---|
| Name | Forward_DST7_Pre_Processing_B32 |
| Input | src[0 . . . 31] |
| Output | dst[0 . . . 31] |
| Operation | int aiFFTInReordIdx[32] = {12, 25, −14, 1, 10, −23, 27, 29, −16, 3, 8,−21, −19, 31, −18, 5, 6, 4, −17, 30, −20, 7, 9, 2, −15, 28, −22, −24, 11, 0, −13, 26};<br>for (int i = 0; i < 32; i++)<br>{int index = aiFFTInReordIdx[i];<br>dst[i] = (index < 0)? −src[−index]:src[index];} |

TABLE 12

| Operation of forward_DST7_Post_Processing_B32 function | |
|---|---|
| Name | Forward_DST7_Post_Processing_B32 |
| Input | src[0 . . . 31] |
| Output | dst[0 . . . 31] |
| Operation | int aiFFTOutReordIdx[32] = {−27, −17, 0, 15, 25, −29, −6, 2, 13, 23, −31, −8, 4, 11, 21, −20, −10, 5, 9, 19, −22, −12, 3, 7, 30, −24, −14, 1, 18, 28, −26, −16}; |

TABLE 12-continued

Operation of forward_DST7_Post_Processing_B32 function

| Name | Forward_DST7_Post_Processing_B32 |
|---|---|
| | for (int i = 0; i < 32; i++)<br>{int index = aiFFTOutReordIdx[i];<br>dst[i] = (int)((((index < 0)? -src[-index]:src[index]) +<br>rnd_factor) >> final_shift);} |

In Table 12, rnd_factor=1<<(final_shift−1) can be used. In addition, when a function of applying DST7 to all rows or columns of one block is used in FIGS. 20 and 21, if a value "shift" is delivered through a parameter, final_shift=shift−1 can be used.

TABLE 13

Operation of inverse_DST7_Pre_Processing_B32 function

| Name | Inverse_DST7_Pre_Processing_B32 |
|---|---|
| Input | src[0 . . . 31] |
| Output | dst[0 . . . 31] |
| Operation | int aiFFTInReordIdx[32] = {6, 19, −7, 31, 5, −20, 18, 17, −8,<br>30, 4, −21, −22, 16, −9, 29, 3, 2, −23, 15, −10, 28, 27,<br>1, −24, 14, −11, −12, 26, 0, −25, 13};<br>for (int i = 0; i < 32; i++)<br>{int index = aiFFTInReordIdx[i];<br>dst[i] = (index < 0)? -src[-index]:src[index];} |

TABLE 14

Operation of inverse_DST7_Post_Processing_B32 function

| Name | Inverse_DST7_Post_Processing_B32 |
|---|---|
| Input | src[0 . . . 31] |
| Output | dst[0 . . . 31] |
| Operation | int aiFFTOutReordIdx[32] = {−27, −16, −17, −26, 0, 28,<br>15, 18, 25, 1, −29, −14, −6, −24, 2, 30, 13, 7, 23,<br>3, −31, −12, −8, −22, 4, 19, 11, 9, 21, 5, −20, −10};<br>for (int i = 0; i < 32; i++)<br>{int index = aiFFTOutReordIdx[i];<br>dst[i] = Clip3(outputMinimum, outputMaximum,<br>(Int)((((index < 0)? -src[-index]:src[index]) +<br>rnd_factor) >> final_shift));} |

In Table 14, rnd_factor=1<<(final_shift−1) can be used. In addition, when a function of applying DST7 to all rows or columns of one block is used in FIGS. 20 and 21, if a value "shift" is delivered through a parameter, final_shift=shift−1 can be used.

In Table 14, outputMinimum and outputMaximum represent a minimum value and a maximum value of an output value, Clip3 function performs operation of Clip3(A, B, C)=(C<A)?A:(C>B)?B:C. That is, the Clip3 function performs clipping such that the value C must be present in the range of A to B.

TABLE 15

Operation of xDST7_FFT13_half1 function

| Name | xDST7_FFT13_half1 |
|---|---|
| Input | src[0 . . . 5] |
| Output | dst[0 . . . 5] |
| Operation | Int C13R[6] = {167, 296, 357, 336, 238, 86};<br>dst[0] = −src[0] * C13R[0] − src[1] * C13R[1] − src[2] * C13R[2] − src[3] * C13R[3] − src[4] * C13R[4] − src[5] * C13R[5];<br>dst[1] = −src[0] * C13R[1] − src[1] * C13R[3] − src[2] * C13R[5] + src[3] * C13R[4] + src[4] * C13R[2] + src[5] * C13R[0];<br>dst[2] = −src[0] * C13R[2] − src[1] * C13R[5] + src[2] * C13R[3] + src[3] * C13R[0] − src[4] * C13R[1] − src[5] * C13R[4];<br>dst[3] = −src[0] * C13R[3] + src[1] * C13R[4] + src[2] * C13R[0] − src[3] * C13R[2] + src[4] * C13R[5] + src[5] * C13R[1];<br>dst[4] = −src[0] * C13R[4] + src[1] * C13R[2] − src[2] * C13R[1] + src[3] * C13R[5] + src[4] * C13R[0] − src[5] * C13R[3];<br>dst[5] = −src[0] * C13R[5] + src[1] * C13R[0] − src[2] * C13R[4] + src[3] * C13R[1] − src[4] * C13R[3] + src[5] * C13R[2]; |

In Table 15, a sequence C13R indicates a value calculated through round $$\left(\frac{1}{\sqrt{2\times 32+1}}\cdot\sqrt{2}\cdot\sin\left(\frac{2\pi i}{13}\right)\cdot 2^{11}\right),$$

i=1, 2, 3, 4, 5, 6

TABLE 16

Operation of xDST7_FFT13_half2 function

| Name | xDST7_FFT13_half2 |
|---|---|
| Input | src[0 . . . 6] |
| Output | dst[0 . . . 6] |

TABLE 16-continued

Operation of xDST7_FFT13_half2 function

| Name | xDST7_FFT13_half2 |
|---|---|
| Operation | int C13I[7] = {359, 318, 204, 43, −127, −269, −349};<br>dst[0] = (src[0] + src[1] + src[2] + src[3] + src[4] + src[5] + src[6]) * C13I[0];<br>dst[1] = src[0] * C13I[0] + src[1] * C13I[1] + src[2] * C13I[2] + src[3] * C13I[3] + src[4] * C13I[4] + src[5] * C13I[5] + src[6] * C13I[6];<br>dst[2] = src[0] * C13I[0] + src[1] * C13I[2] + src[2] * C13I[4] + src[3] * C13I[6] + src[4] * C13I[5] + src[5] * C13I[3] + src[6] * C13I[1];<br>dst[3] = src[0] * C13I[0] + src[1] * C13I[3] + src[2] * C13I[6] + src[3] * C13I[4] + src[4] * C13I[1] + src[5] * C13I[2] + src[6] * C13I[5];<br>dst[4] = src[0] * C13I[0] + src[1] * C13I[4] + src[2] * C13I[5] + src[3] * C13I[1] + src[4] * C13I[3] + src[5] * C13I[6] + src[6] * C13I[2];<br>dst[5] = src[0] * C13I[0] + src[1] * C13I[5] + src[2] * C13I[3] + src[3] * C13I[2] + src[4] * C13I[6] + src[5] * C13I[1] + src[6] * C13I[4];<br>dst[6] = src[0] * C13I[0] + src[1] * C13I[6] + src[2] * C13I[1] + src[3] * C13I[5] + src[4] * C13I[2] + src[5] * C13I[4] + src[6] * C13I[3]; |

In Table 16, a sequence C13I indicates a value calculated through round $$\left(\frac{1}{\sqrt{2\times 32+1}}\cdot\sqrt{2}\cdot\cos\left(\frac{2\pi i}{13}\right)\cdot 2^{11}\right),$$

i=0, 1, 2, 3, 4, 5, 6.

TABLE 17

Operation of xDST7_FFT13_type1_Post_Processing function

| Name | xDST7_FFT13_type1_Post_Processing |
|---|---|
| Input | src[0 . . . 5] |
| Output | dst[0 . . . 5] |
| Operation | dst[0] = −src[0]; dst[1] = src[1]; dst[2] = −src[2];<br>dst[3] = src[3]; dst[4] = −src[4]; dst[5] = src[5]; |

TABLE 18

Operation of xDST7_FFT13_type2_Post_Processing function

| Name | xDST7_FFT13_type2_Post_Processing |
|---|---|
| Input | src_half1[0 . . . 5], src_half2[0 . . . 6] |
| Output | dst[0 . . . 12] |
| Operation | dst[0] = src_half2[0];<br>for (int i = 0; i < 6; i++)<br>{dst[1 + i] = src_half1[i] + src_half2[1 + i];}<br>for (int i = 0; i < 6; i++)<br>{dst[7 + i] = −src_half1[5 − i] + src_half2[6 − i];} |

When DST7 is applied to a two-dimensional 32×32 block for the horizontal direction (or vertical direction), the flowcharts of FIG. 20 and FIG. 21 may be used for 32 rows (or columns).

FIG. 25 is a flowchart through which forward DST7 with a length of 8 is designed using Discrete Fourier Transform (DFT) as an embodiment to which the present disclosure is applied.

Embodiment 3: Design and Implementation of DST7 with Length of 8

The present disclosure provides specific embodiments of designing DST7 using DFT. Embodiments of the present disclosure can be used to design DCT8 and applied to MTS configuration.

Referring to FIG. 25, a flowchart through which DST7 is implemented for one row or column with a length of 8 is illustrated. Here, DST7 with a length of 8 is denoted by DST7_B8, forward DST7 is denoted by forward DST7_B8, and inverse DST7 is denoted by inverse DST7_B8.

In addition, input data may be denoted by x[0 . . . 7] and final output data may be denoted by y[0 . . . 7].

An encoder performs pre-processing on a forward DST7 with a length of 8 when input data x[0 . . . 7] is input (S2510).

The encoder may apply DFT to an output w[0 . . . 7] of step S2510 (S2520). Here, step S2520 of applying DFT will be described in detail later with reference to FIG. 27 and FIG. 28.

The encoder may perform post-processing on an output z[0 . . . 7] of step S2520 and output final output data y[0 . . . 7] (S2530).

FIG. 26 is a flowchart through which inverse DST7 with a length of 8 is designed using Discrete Fourier Transform (DFT) as an embodiment to which the present disclosure is applied.

Referring to FIG. 26, a flowchart through which inverse DST7 is implemented for one row or column with a length of 8 is illustrated. Here, input data may be denoted by x[0 . . . 7] and final output data may be denoted by y[0 . . . 7].

A decoder performs pre-processing on inverse DST7 with a length of 8 when input data x[0 . . . 7] is input (S2610).

The decoder may apply DFT to the output w[0 . . . 7] of step S2610 (S2620). Here, step S2620 of applying DFT will be described in detail later with reference to FIG. 27 and FIG. 28.

The decoder may perform post-processing on the output z[0 . . . 7] of step S2620 and output final output data y[0 . . . 7] (S2630).

Detailed operations of the functions of FIG. 25 and FIG. 26 can be described with reference to Table 19 to Table 23.

TABLE 19

Operation of forward_DST7_Pre_Processing_B8 function

| Name | Forward_DST7_Pre_Processing_B8 |
|---|---|
| Input | src[0 . . . 7] |
| Output | dst[0 . . . 7] |

TABLE 19-continued

Operation of forward_DST7_Pre_Processing_B8 function

| Name | Forward_DST7_Pre_Processing_B8 |
|---|---|
| Operation | dst[0] = src[1]; dst[1] = src[5]; dst[2] = −src[0]; dst[3] = −src[2]; dst[4] = −src[7]; dst[5] = src[6]; dst[6] = −src[3]; dst[7] = −src[4]; |

TABLE 20

Operation of forward_DST7_Post_Processing_B8 function

| Name | Forward_DST7_Post_Processing_B8 |
|---|---|
| Input | src[0 . . . 7] |
| Output | dst[0 . . . 7] |
| Operation | int aiReordIdx[8] = {0, 2, 4, 6, 7, 5, 3, 1};<br>for (int i = 0; i < 8; i++)<br>{dst[i] = (int)((src[aiReordIdx[i]] + rnd_factor) >> shift);} |

In Table 20, rnd_factor=1<<(final_shift−1) can be used. Here, the value "shift" is a value delivered through a parameter when a function of applying DST7 to all rows or columns of one block is used.

TABLE 21

Operation of inverse_DST7_Pre_Processing_B8 function

| Name | Inverse_DST7_Pre_Processing_B8 |
|---|---|
| Input | src[0 . . . 7] |
| Output | dst[0 . . . 7] |
| Operation | dst[0] = src[7]; dst[1] = src[5]; dst[2] = −src[0]; dst[3] = −src[1]; dst[4] = −src[4]; dst[5] = src[3]; dst[6] = −src[6]; dst[7] = −src[2]; |

TABLE 22

Operation of inverse_DST7_Post_Processing_B8 function

| Name | Inverse_DST7_Post_Processing_B8 |
|---|---|
| Input | src[0 . . . 7] |
| Output | dst[0 . . . 7] |

TABLE 22-continued

Operation of inverse_DST7_Post_Processing_B8 function

| Name | Inverse_DST7_Post_Processing_B8 |
|---|---|
| Operation | for (Int i = 0; i < 8; i++)<br>{dst[i] = Clip3(outputMinimum, outputMaximum,<br>(Int)((src[i]) + rnd_factor) >> shift);} |

In Table 22, rnd_factor=1<<(final_shift−1) can be used. Here, the value "shift" is a value delivered through a parameter when a function of applying DST7 to all rows or columns of one block is used.

In Table 5, outputMinimum and outputMaximum represent a minimum value and a maximum value of an output value, Clip3 function performs operation of Clip3(A, B, C) (C<A)?A:(C>B)?B:C. That is, the Clip3 function performs clipping such that the value C must be present in the range of A to B.

TABLE 23

Operation of xDST7_FFT_B8 function

| Name | xDST7_FFT_B8 |
|---|---|
| Input | src[0 . . . 7] |
| Output | dst[0 . . . 7] |
| Operation | int C8[8] = {127, 237, 314, 350, 338, 280, 185, 65};<br>dst[0] = src[0] * C8[0] + src[1] * C8[2] − src[2] * C8[7] − src[3] * C8[6] − src[4] * C8[3] + src[5] * C8[4] − src[6] * C8[1] − src[7] * C8[5];<br>dst[1] = −src[0] * C8[1] − src[1] * C8[5] − src[2] * C8[0] − src[3] * C8[2] + src[4] * C8[7] + src[5] * C8[6] + src[6] * C8[3] − src[7] * C8[4];<br>dst[2] = src[0] * C8[2] − src[1] * C8[7] − src[2] * C8[6] − src[3] * C8[3] + src[4] * C8[4] − src[5] * C8[1] − src[6] * C8[5] − src[7] * C8[0];<br>dst[3] = −src[0] * C8[3] + src[1] * C8[4] − src[2] * C8[1] − src[3] * C8[5] − src[4] * C8[0] − src[5] * C8[2] + src[6] * C8[7] + src[7] * C8[6];<br>dst[4] = src[0] * C8[4] − src[1] * C8[1] − src[2] * C8[5] − src[3] * C8[0] − src[4] * C8[2] + src[5] * C8[7] + src[6] * C8[6] + src[7] * C8[3];<br>dst[5] = −src[0] * C8[5] − src[1] * C8[0] − src[2] * C8[2] + src[3] * C8[7] + src[4] * C8[6] + src[5] * C8[3] − src[6] * C8[4] + src[7] * C8[1];<br>dst[6] = src[0] * C8[6] + src[1] * C8[3] − src[2] * C8[4] + src[3] * C8[1] + src[4] * C8[5] + src[5] * C8[0] + src[6] * C8[2] − src[7] * C8[7];<br>dst[7] = −src[0] * C8[7] − src[1] * C8[6] − src[2] * C8[3] + src[3] * C8[4] − src[4] * C8[1] − src[5] * C8[5] − src[6] * C8[0] − src[7] * C8[2]; |

In Table 23, a sequence C8 indicates a value calculated through round $$\left(\frac{1}{\sqrt{2\times 8+1}}\cdot\sqrt{2}\cdot\sin\left(\frac{2\pi i}{17}\right)\cdot 2^{10}\right),$$

i=1, 2, 3, 4, 5, 6, 7, 8.

When DST7 is applied to a two-dimensional 8×8 block for the horizontal direction (or vertical direction), the flowcharts of FIG. 25 and FIG. 26 may be used for 8 rows (or columns).

Embodiment 4: Method of Partially Applying DST7 Implementation Proposed in Embodiments 1 to 3

DST7 implementation proposed in embodiments 1 and 2 may be applied to DST7 with a length of 16 and DST7 with a length of 32 and DST7 implementation proposed in embodiment 3 may be applied to DST7 with a length of 8. However, the present disclosure is not limited thereto and DST7 implementation may be applied in a different manner. For example, when DST7 implementation proposed in embodiment 3 is not applied, DST7 implementation of a general matrix multiplication form may be applied.

Embodiment 5: Implementation of DST7 Using Discrete Fourier Transform (DFT)

A matrix form of N×N DST7 may be represented by Equation 7.

$$[S_N^{VII}]_{n,k} = \frac{2}{\sqrt{2N+1}} \sin\left(\frac{\pi(2k+1)(n+1)}{2N+1}\right), \quad \text{[Equation 7]}$$

$$n, k = 0, 1, \ldots, N-1$$

Here, if n is a row index in a range of 0 to N−1 and k is a column index in a range of 0 to N−1, the matrix of Equation 7 matches an inverse DST7 matrix multiplied by transform coefficients to reconstruct original inputs.

Accordingly, the transpose matrix of Equation 7 is a forward DST7 matrix. Further, forward DST7 and inverse DST7 matrices are orthogonal and each fundamental vector thereof has norm 1.

A relationship between DST7 and DFT may be represented by Equation 8 on the basis of Equation 7.

$$(S_N^{VII})^T = R\Im[F_{2N+1}]QP \text{ where} \quad \text{[Equation 8]}$$

$$[R]_{n,k} = \begin{cases} -1, & \text{if } k = 2n+1, n = 0, 1, \ldots, N-1 \\ 0 & \text{otherwise} \end{cases},$$

$$Q = \begin{pmatrix} 0^T \\ I_N \\ -J_N \end{pmatrix}, \text{ and}$$

$$[P]_{n,k} = \begin{cases} 1 & \text{if } k+1 = 2(n+1), \quad n = 0, 1, \ldots, N/2-1 \\ 1 & \text{if } k+1 = 2(N-n)-1, \quad n = N/2, \ldots, N-1 \\ 0, & \text{otherwise} \end{cases}$$

In Equation 8, R is an N×(2N+1) matrix (number of rows×number of columns), Q is a (2N+1)×N matrix, and P is an N×N matrix. $I_N$ represents an N×N identify matrix and $J_N$ represent $$[J_N]_{ij,i,j=0,\ldots,N-1} = \begin{cases} 1, & j = N-1-i \\ 0, & \text{otherwise} \end{cases}.$$

In Equation 8, $\Im[F_{2N+1}]$ means that DFT with a length of (2N+1) is performed and then only an imaginary part of a DFT result is taken. Equation 8 holds N only when N is an even number. Specifically, $\Im[F_{2N+1}]$ means that (2N+1)×1 vector (z) is output from calculation of z=QPx when x input to forward DST7 is an N×1 vector, DFT with a length of 2N+1 is performed using this vector (z) as input, and then only an imaginary part is taken.

As represented by Equation 8, the matrices P, Q and R simply execute rearranging of N inputs and assigning of signs (+/−) thereof such that a main calculation part of forward DST7 becomes 2N+1 length DFT.

The present disclosure uses DST7 having a size of 2n×2n (N=2n). Accordingly, 9-point DFT, 17-point DFT, 33-point DFT, and 65-point DFT can be applied in the case of N=4, 8, 16, 32, respectively.

In this specification, cases of N=8, 16, 32 are mainly described, design of DFTs corresponding thereto is introduced in the form of equivalent multi-dimensional DFT, and a method of integrating the DFTs to obtain low-complexity DST7 is provided.

Inverse N×N DST7 consistent with forward DST6 may be represented as 2N+1 length DFT as expressed by Equation 9.

$$S_N^{VII} = R\Im[F_{2N+1}]QP, \text{ where} \quad \text{[Equation 9]}$$

$$[R]_{n,k} = \begin{cases} 1, & \text{if } k = n+1, \quad n = 1, 3, \ldots, N-1 \\ -1, & \text{if } k = n+1, \quad n = 0, 2, \ldots, N-2 \\ 0 & \text{otherwise} \end{cases},$$

$$Q = \begin{pmatrix} 0^T \\ J_N \\ -I_N \end{pmatrix}, \text{ and}$$

$$[P]_{n,k} = \begin{cases} 1 & \text{if } k = n, \quad n = 0, 1, \ldots, N-1 \\ 0, & \text{otherwise} \end{cases}$$

Here, R is an N×(2N+1) matrix (number of rows×number of columns), Q is a (2N+1)×N matrix, and $I_N$ is an N×N identity matrix. $J_N$ is defined as represented by the above Equation 8.

$\Im[F_{2N+1}]$ means that (2N+1)×1 vector (z) is output from calculation of z=QPx when x input to forward DST7 is an N×1 vector, DFT with a length of 2N+1 is performed using this vector (z) as input, and then only an imaginary part is taken. That is, the meaning of $\Im[F_{2N+1}]$ in Equation 9 is the same as definition in Equation 8 except that z=QPx is calculated.

In Equation 9, N is an even number. Further, the same 2N+1 length DFT as that in forward DST7 may be reused for inverse DST7.

Trigonometric transform with a length of an even number may be applied to a codec system to which the present disclosure is applied. For example, DFTs with lengths of 17, 35, 65 and 129 are required for DST7 with lengths of 8, 16, 32 and 64 from Equation 8. 33-point DFT and 65-point DFT applicable to DST7 with a length of 8 and DST7 with a length of 16 may be represented by one-dimensional DFT as expressed by Equation 10 and Equation 11. Equation 12 represents DFT formula for a normal length N.

$$X(k) = \frac{1}{\sqrt{2 \cdot 16 + 1}} \sum_{n=0}^{32} x(n) W_N^{nk}, \quad W_N = e^{-j(2\pi/33)} \quad \text{[Equation 10]}$$

$$X(k) = \frac{1}{\sqrt{2 \cdot 32 + 1}} \sum_{n=0}^{64} x(n) W_N^{nk}, \quad W_N = e^{-j(2\pi/65)} \quad \text{[Equation 11]}$$

$$X(k) = \frac{1}{\sqrt{N}} \sum_{n=0}^{N-1} x(n) W_N^{nk}, \quad W_N = e^{-j(2\pi/M)} \quad \text{[Equation 12]}$$

Although a procedure in which 2N+1 length DFT is applied for N×N DST7 implementation has been described, the length N may be used instead of the length 2N+1 for convenience of expression in description including Equations 10 and 11. Accordingly, it is necessary to appropriately change expression when DFT is applied through Equations 8 and 9.

In addition, the one-dimensional 33-point DFT and on-dimensional 65-point DFT are represented by equivalent two-dimensional DFTs through simple input/output data conversion and Equations corresponding thereto are Equations 13 and 14.

$$\hat{X}(k_1,k_2) = \frac{1}{\sqrt{2\cdot 16+1}} \sum_{n_2=0}^{10} \sum_{n_1=0}^{2} \hat{x}(n_1,n_2) W_3^{n_1 k_1} W_{11}^{n_2 k_2} = \sum_{n_2=0}^{10} \hat{y}(k_1,n_2) W_{11}^{n_2 k_2}$$ [Equation 13]

$$\hat{X}(k_1,k_2) = \frac{1}{\sqrt{2\cdot 32+1}} \sum_{n_2=0}^{12} \sum_{n_1=0}^{4} \hat{x}(n_1,n_2) W_5^{n_1 k_1} W_{13}^{n_2 k_2} = \sum_{n_2=0}^{12} \hat{y}(k_1,n_2) W_{13}^{n_2 k_2}$$ [Equation 14]

Here, n denotes an index for input data and k indicates an index for a transform coefficient.

Hereinafter, a residue of a number is denoted as $\langle x \rangle_N$=xmodN. Further, four index variables $n_1$, $n_2$, $k_1$, and $k_2$ are introduced, and a relationship between 33-point DFT and 65-point DFT may be represented by Equations 15 and 16.

$$n = \langle 22n_1+12n_2 \rangle_{33}$$

$$k = \langle 11k_1+3k_2 \rangle_{33}$$ [Equation 15]

$$n = \langle 26n_1+40n_2 \rangle_{65}$$

$$k = \langle 13k_1+5k_2 \rangle_{65}$$ [Equation 16]

Here, n denotes an index for input data and k indicates an index for a transform coefficient. Equation 15 represents an index mapped to 33-point DFT and Equation 16 represents an index mapped to 65-point DFT.

Input/output data mapping between one-dimensional DFT and two-dimensional DFT is given as represented by Equations 17 and 18 according to Equations 15 and 16. From Equations 15 and 16, the present disclosure can define new input/output variables as two index arguments $\hat{x}(n_1,n_2)$ and $\hat{X}(k_1,k_2)$ as represented by Equations 17 and 18.

$$\hat{x}(n_1,n_2)=x(\langle 22n_1+12n_2 \rangle_{33})$$

$$\hat{X}(k_1,k_2)=X(\langle 11k_1+3k_2 \rangle_{33})$$ [Equation 17]

$$\hat{x}(n_1,n_2)=x(\langle 26n_1+40n_2 \rangle_{65})$$

$$\hat{X}(k_1,k_2)=X(\langle 13k_1+5k_2 \rangle_{65})$$ [Equation 18]

Here, $\langle x \rangle_N$=xmodN.

Embodiment 5-1: Indexing Method for Two-Dimensional DFT Constituting DST7

Although two-dimensional DFT is achieved according to Equations 15 and 17, the present disclosure is not limited thereto. That is, when Equation 19 is satisfied, two-dimensional DFT as represented by Equations 13 and 14 can be formed.

$$N=N_1 N_2$$

$$n=\langle K_1 n_1+K_2 n_2 \rangle_N$$

$$k=\langle K_3 k_1+K_4 k_2 \rangle_N$$

$$\langle K_1 K_3 \rangle_N=N_2$$

$$\langle K_2 K_4 \rangle_N=N_1$$

$$\langle K_1 K_4 \rangle_N=\langle K_2 K_3 \rangle_N=0$$ [Equation 19]

Here, $N_1$ and $N_2$ are mutually prime factors. In addition, $\langle x \rangle_N$=x mod N.

33-point one-dimensional DFT corresponds to $(N_1, N_2)$=(3, 11) and 65-point one-dimensional DFT corresponds to $(N_1, N_2)$=(5, 13). Since $N_1$ and $N_2$ are mutually prime factors in both cases, Equation 19 can be applied. If $K_1$, $K_2$, $K_3$, and $K_4$ satisfy Equation 20, the condition of $\langle K_1 K_4 \rangle_N$=$\langle K_2 K_3 \rangle_N$=0 is satisfied in Equation 19.

$$K_1=\alpha N_2, K_2=\beta N_1, K_3=\gamma N_2, K_4=\delta N_1$$ [Equation 20]

To satisfy other conditions of Equation 19, the relation of Equation 21 needs to be satisfied.

$$\langle \alpha\gamma N_2 \rangle_{N_1}=1, \langle \beta\delta N_1 \rangle_{N_2}=1$$ [Equation 21]

Accordingly, $K_1$, $K_2$, $K_3$, and $K_4$ that satisfy Equation 19 can be derived from Equation 20 through $\alpha$, $\beta$, $\gamma$, $\delta$ that satisfy Equation 21, and thus equivalent two-dimensional DFTs can be configured. Embodiments of available $\alpha$, $\beta$, $\gamma$, $\delta$ are as follows.

1) $(\alpha, \beta, \gamma, \delta)$=(2, 4, 1, 1)

This corresponds to Equation 15 and a case of $(N_1, N_2)$=(3, 11).

2) $(\alpha, \beta, \gamma, \delta)$=(2, 8, 1, 1)

This corresponds to Equation 16 and a case of $(N_1, N_2)$=(5, 13).

3) $(\alpha, \beta, \gamma, \delta)$=(1, 1, 2, 4)

This corresponds to a case of $(N_1, N_2)$=(3, 11).

4) $(\alpha, \beta, \gamma, \delta)$=(1, 1, 2, 8)

This corresponds to a case of $(N_1, N_2)$=(5, 13).

When the corresponding two-dimensional DFT is configured according to $K_1$, $K_2$, $K_3$, and $K_4$ derived from $\alpha$, $\beta$, $\gamma$, $\delta$ that satisfy Equation 21, symmetry with respect to input/output data and intermediate result values as in the above-described Equations may occur in the process of calculating the two-dimensional DFT.

Accordingly, complexity necessary to execute DST7 can be considerably reduced by applying the methods and structures proposed in the above-described embodiments even to two-dimensional DFT having different indices (i.e., different $\alpha$, $\beta$, $\gamma$, $\delta$ values) from those of the above-described embodiments.

In short, DFT with a length of N ($N=N_1 N_2$, $N_1$ and $N_2$ being mutually prime factors) can be calculated as two-dimensional DFT as represented by Equation 22 through index conversion (i.e., conversion between a one-dimensional index and a two-dimensional index) that satisfies Equations 19 to 21.

$$\hat{X}(k_1, k_2) = \frac{1}{\sqrt{N}} \sum_{n_2=0}^{N_2-1} \sum_{n_1=0}^{N_1-1} \hat{x}(n_1, n_2) W_{N_1}^{n_1 k_1} W_{N_2}^{n_2 k_2} = \quad \text{[Equation 22]}$$

$$\sum_{n_2=0}^{N_2-1} \hat{y}(k_1, n_2) W_{N_2}^{n_2 k_2}$$

When the two-dimensional DFT form as represented by Equation 22 is used, the two-dimensional DFT can be divided into short-length DFTs and calculated and thus the amount of calculation can be considerably reduced as compared to equivalent one-dimensional DFT.

Embodiment 5-2: Optimization for Low-Complexity DST7 Design

According to Equations 13 and 14, the present disclosure executes 3-point DFT of $\hat{x}(0, n_2)$, $\hat{x}(1,n_2)$, and $\hat{x}(2,n_2)$ and 5-point DFT of $\hat{x}(0,n_2)$, $\hat{x}(1,n_2)$, $\hat{x}(2,n_2)$, $\hat{x}(3,n_2)$, and $\hat{x}(4,n_2)$ for given $n_2$.

For $\hat{y}(k_1,n_2)$ generated after execution of the inner DFT loops of Equations 13 and 14, the present disclosure can define a real part and an imaginary part as represented by Equation 23.

$$\hat{y}(k_1,n_2) = \hat{y}_R(k_1,n_2) + j \cdot \hat{y}_I(k_1,n_2) \quad \text{[Equation 23]}$$

Here, $\hat{y}_R$ represents a real part and $\hat{y}_I$ represents an imaginary part.

Similarly, input $\hat{x}(n_1,n_2)$ and output $\hat{X}(k_1,k_2)$ can also be divided into real parts and imaginary parts.

$$\hat{x}(n_1,n_2) = \hat{x}_R(n_1,n_2) + j \cdot \hat{x}_I(n_1,n_2)$$

$$\hat{X}(k_1,k_2) = \hat{X}_R(k_1,k_2) + j \cdot \hat{X}_I(k_1,k_2) \quad \text{[Equation 24]}$$

Here, input $\hat{x}(n_1,n_2)$ may be pixels or residual data to which a designated transform is predicted to be applied. Accordingly, it can be assumed that actual $\hat{x}_I(n_1,n_2)$ has a value of 0.

On this assumption, the present disclosure can check relationships between first transformed data $\hat{y}(k_1,n_2)$ output according to input symmetries imposed on first-stage DFT (i.e., 3-point DFT in the case of 33-point DFT, 5-point DFT in the case of 65-point DFT). These symmetries are provided by matrices P and Q of Equation 8 or 9 and are described in Equations 25 and 26.

Case 1)

$$x(0,n_2)=0, \; x(2,n_2)=-x(1,n_2)$$

Case 2)

$$x(0,n_2)=-x(0,n_2'), \; x(1,n_2)=-x(2,n_2'), \; x(2,n_2)=-x(1,n_2')$$
for some $n_2'$ \quad [Equation 25]

Case 1)

$$x(0,n_2)=0, \; x(3,n_2)=-x(2,n_2), \; x(4,n_2)=-x(1,n_2)$$

Case 2)

$$x(0,n_2)=-x(0,n_2'), \; x(1,n_2)=-x(4,n_2'), \; x(2,n_2)=-x(3,n_2'),$$

$$x(3,n_2)=-x(2,n_2'), \; x(4,n_2)=-x(1,n_2') \text{ for some } n_2' \quad \text{[Equation 26]}$$

Furthermore, first-stage output relationships in $\hat{y}(k_1,n_2)$ are as represented by Equations 27 and 28.

$$\hat{y}_R(2,n_2)=\hat{y}_R(1,n_2)$$

$$\hat{y}_I(0,n_2)=0, \; \hat{y}_I(2,n_2)=-\hat{y}_I(1,n_2) \quad \text{[Equation 27]}$$

$$\hat{y}_R(3,n_2)=\hat{y}_R(2,n_2), \; \hat{y}_R(4,n_2)=\hat{y}_R(1,n_2)$$

$$\hat{y}_I(0,n_2)=0, \; \hat{y}_I(3,n_2)=-\hat{y}_I(2,n_2), \; \hat{y}_I(4,n_2)=-\hat{y}_I(1,n_2) \quad \text{[Equation 28]}$$

Equations 25 and 27 represent relationships in 3-point FFT belonging to 33-point DFT and Equations 26 and 28 represent relations in 5-point FFT belonging to 65-point DFT.

For example, in Equations 25 and 26, Case 1 occurs when $n_2=0$ and Case 2 occurs when $n_2=11-n_2'$, $n_2'=1, 2, \ldots, 10$ ($n_2=13-n_2'$, $n_2'=1, 2, \ldots, 12$). For inputs of Case 1, real parts of all outputs from 3-point FFT (5-point FFT) become 0, and one (two) imaginary part output needs to be maintained because the present disclosure can reconstruct the remaining one output (two outputs) according to Equations 27 and 28.

Due to input patterns of Case 2 in Equations 25 and 26, $\hat{y}(k_1,n_2)$ and $\hat{y}(k_1,n_2')$ has a relationship as represented by Equation 29 in the present disclosure.

$$\hat{y}_R(k_1,n_2)=-\hat{y}_R(k_1,n_2')$$

$$\hat{y}_I(k_1,n_2)=\hat{y}_I(k_1,n_2') \quad \text{[Equation 29]}$$

In the case of Equation 29, the relationship between indices $n_2=11-n_2'$, $n_2'=1, 2, \ldots, 10$ ($n_2=13-n_2'$, $n_2'=1, 2, \ldots, 12$) of 11-point FFT (13-point FFT) is equally applied.

Accordingly, the present disclosure executes 3-point FFT (5-point FFT) only when $n_2$ is within the range of [0, 5] ([0, 6]) due to Equation 29 and thus can reduce the amount of related calculation.

Further, only some outputs, that is, two (three) real part outputs and one (two) imaginary part output, are calculated because other parts of the outputs can be reconstructed according to Equation 21 in each 3-point FFT (5-point FFT) calculation over the range of [1, 5] ([1, 6]).

Due to symmetries present in the first-stage outputs (Equation 29), outputs calculated from outer loops (second-stage FFT) in Equations 13 and 14 are symmetrically arranged which can reduce the amount of calculation. Input patterns of the outer loops (second-stage FFT) are as represented by Equations 30 to 33.

1) Real Part $$\hat{y}_R(k_1,0)=0, \; \hat{y}_R(k_1,6)=-\hat{y}_R(k_1,5), \; \hat{y}_R(k_1,7)=-\hat{y}_R(k_1,4),$$

$$\hat{y}_R(k_1,8)=-\hat{y}_R(k_1,3), \; \hat{y}_R(k_1,9)=-\hat{y}_R(k_1,2), \; \hat{y}_R(k_1,10)=-\hat{y}_R(k_1,1) \quad \text{[Equation 30]}$$

1) Real Part $$\hat{y}_R(k_1,0)=0, \; \hat{y}_R(k_1,7)=-\hat{y}_R(k_1,6), \; \hat{y}_R(k_1,8)=-\hat{y}_R(k_1,5), \; \hat{y}_R(k_1,9)=-\hat{y}_R(k_1,4),$$

$$\hat{y}_R(k_1,10)=-\hat{y}_R(k_1,3), \; \hat{y}_R(k_1,11)=-\hat{y}_R(k_1,2), \; \hat{y}_R(k_1,12)=-\hat{y}_R(k_1,1) \quad \text{[Equation 31]}$$

2) Imaginary Part $$\hat{y}_I(k_1,6)=\hat{y}_I(k_1,5), \; \hat{y}_I(k_1,7)=\hat{y}_I(k_1,4),$$

$$\hat{y}_I(k_1,8)=\hat{y}_I(k_1,3), \; \hat{y}_I(k_1,9)=\hat{y}_I(k_1,2), \; \hat{y}_I(k_1,10)=\hat{y}_I(k_1,1) \quad \text{[Equation 32]}$$

2) Imaginary Part $$\hat{y}_I(k_1,7)=\hat{y}_I(k_1,6), \; \hat{y}_I(k_1,8)=\hat{y}_I(k_1,5), \; \hat{y}_I(k_1,9)=\hat{y}_I(k_1,4),$$

$$\hat{y}_I(k_1,10)=\hat{y}_I(k_1,3), \; \hat{y}_I(k_1,11)=\hat{y}_I(k_1,2), \; \hat{y}_I(k_1,12)=\hat{y}_I(k_1,1) \quad \text{[Equation 33]}$$

Equations 30 and 32 represent input symmetries encountered in 11-point FFT belonging to 33-point FFT.

Equations 31 and 33 represent input symmetries encountered in 13-point FFT belonging to 65-point FFT. According to outer loop iteration, other symmetries are also encountered among input sets of 11-point FFT (13-point FFT), which enables output reconstruction for one of previous iterations.

In the present disclosure, if the vector $\hat{y}(k_1,n_2)$ is represented as $\hat{Y}(k_1)=[\hat{y}(k_1,0)\ \hat{y}(k_1,1)\ \ldots\ \hat{y}(k_1,N_2-1)]^T=\hat{Y}_R(k_1)+j\cdot\hat{Y}_I(k_1)$, input symmetries present in an iteration process may be represented by Equation 34.

Case 1:

$$\hat{Y}_I(k_1)=0$$

Case 2:

$$\hat{Y}_R(k_1)=\hat{Y}_R(k_1'),\ \hat{Y}_I(k_1)=-\hat{Y}_I(k_1') \quad [\text{Equation 34}]$$

In two-dimensional DFT such as 33-point FFT (65-point FFT), $k_1$ has a range of [0, 2] ([0, 4]).

In Equation 34, Case 1 occurs only when $k_1=0$. In Equation 34, Case 2 occurs when $k_1=3-k_1'$, $k_1'=1,2(k_1=5-k_1',\ k_1'=1,2,3,4)$.

The number of effective iterations of 11-point FFT (15-point FFT) in 33-point FFT (65-point FFT) can be reduced to 2(3) from 3(5) because output of skipped iteration can be derived from one of previous iterations thereof from symmetries in Equation 34.

Further, the present disclosure can take only imaginary parts of outputs from 33-point FFT (65-point FFT) according to Equations 8 and 9, and thus the output pattern of each case in Equation 34 may be represented by Equations 35 to 38.

Case 1:

$$\hat{X}_I(k_1,0)=0,\ \hat{X}_I(k_1,11-k_2)=-\hat{X}_I(k_1,k_2),\ k_2=1,2,\ldots,10 \quad [\text{Equation 35}]$$

Case 1:

$$\hat{X}_I(k_1,0)=0,\ \hat{X}_I(k_1,13-k_2)=-\hat{X}_I(k_1,k_2),\ k_2=1,2,\ldots,12 \quad [\text{Equation 36}]$$

Case 2:

$$\hat{X}_I(k_1,0)=-\hat{X}_I(3-k_1,0),\ \hat{X}_I(k_1,k_2)=-\hat{X}_I(3-k_1,11-k_2),$$
$$k_1=1,2,\ k_2=1,2,\ldots,10 \quad [\text{Equation 37}]$$

Case 2:

$$\hat{X}_I(k_1,0)=-\hat{X}_I(5-k_1,0),\ \hat{X}_I(k_1,k_2)=-\hat{X}_I(5-k_1,13-k_2),$$
$$k_1=1,2,3,4,\ k_2=1,2,\ldots,12 \quad [\text{Equation 38}]$$

Equations 35 and 38 represent output symmetry in 11-point FFT belonging to 33-point FFT and Equations 36 and 38 represent output symmetry in 13-point FFT belonging to 65-point FFT.

Due to symmetries as represented by Equations 35 to 38, subsequent iterations of the outer loops become unnecessary in two-dimensional DFT. From the relationship between forward DST7 and DFT in Equation 8, finally output k indices are k=2m+1. Here, the range of m is [0, 15] ([0, 31]) for 16×16 DST7 (32×32 DST7).

FIG. 27 to FIG. 28 are embodiments to which the present disclosure is applied,

FIG. 27 is a block diagram of 16×16 DST7 to which 33-point DFT is applied, and FIG. 28 is a block diagram of 32×32 DST7 to which 65-point DFT is applied.

Embodiment 5-3: Configuration in which Winograd FFT Block is Replaced with Simplified DFT Block The present embodiment proposes a configuration in which a general DFT is used instead of Winograd FFT.

Formulas for a general one-dimensional DFT are provided as Equations 7 and 8 for 33-point DFT and 65-point DFT. In addition, formulas for general two-dimensional DFTs corresponding to 33-point one-dimensional DFT and 65-point one-dimensional DFT are provided as Equations 13 and 14.

In FIG. 27 and FIG. 28, the first-stage DFT is 3-point DFT or 5-point DFT. A general DFT formula for the first-stage DFT is as follows.

$$\hat{y}(k_1, n_2) = \quad [\text{Equation 39}]$$

$$\hat{y}_R(k_1, n_2) + j\cdot\hat{y}_I(k_1, n_2) = \sum_{n_1=0}^{N_1-1} \hat{x}(n_1, n_2) W_{N_1}^{n_1 k_1}$$

$$\hat{y}_R(k_1, n_2) = \sum_{n_1=0}^{N_1-1} \hat{x}(n_1, n_2)\cos\left(\frac{2\pi k_1 n_1}{N_1}\right)$$

$$\hat{y}_I(k_1, n_2) = -\sum_{n_1=0}^{N_1-1} \hat{x}(n_1, n_2)\sin\left(\frac{2\pi k_1 n_1}{N_1}\right)$$

In Equation 39, the first-stage DFT is 3-point DFT when $N_1=3$ and 5-point DFT when $N_1=5$. The corresponding DFT is calculated only for a range in which $n_2$ is 0 to $(N_2-1)/2$ in Equation 34 according to symmetry proposed in Equation 21. That is, $N_2=11$ when $N_1=3$ and $N_2=13$ when $N_1=5$.

Case 1 in Equations 25 and 26 corresponds to simplified 3-point DFT Type 1 of FIG. 27 and simplified 5-point DFT Type 1 of FIG. 28, which correspond to a case in which $n_2=0$.

The simplified 3-point DFT Type 1 is given as Equation 40.

$$\hat{y}_R(k_1, 0) = 0,\ \hat{y}_I(k_1, 0) = -2\hat{x}(1, 0)\sin\left(\frac{2\pi k_1}{3}\right) \quad [\text{Equation 40}]$$

In Equation 40, calculation is necessary only when $k_1=1$ and thus only one-time multiplication is required. In the same manner, a Equation with respect to the simplified 5-point DFT Type 1 is obtained as Equation 41.

$$\hat{y}_R(k_1, 0) = 0, \quad [\text{Equation 41}]$$

$$\hat{y}_I(k_1, 0) = -2\hat{x}(1, 0)\sin\left(\frac{2\pi k_1}{5}\right) - 2\hat{x}(2, 0)\sin\left(\frac{2\pi k_1 \cdot 2}{5}\right)$$

In Equation 41, calculation is necessary only when $k_1=1$, 2 and thus only two multiplications are required. Further, multiplication by 4 in Equations 40 and 41 can be processed by left shift operation and thus is not counted as multiplication.

Case 2 in Equations 25 and 26 corresponds to the simplified 3-point DFT Type 2 of FIG. 27 and the simplified 5-point DFT Type 2 of FIG. 28, which correspond to cases in which $n_2=1\sim5$ and $n_2=1\sim6$.

The simplified 3-point DFT Type 2 can be implemented through Equation 39. Here, by using the symmetry of Equation 27, $\hat{y}_R(k_1, n_2)$ can be obtained only for a case of $k_1=0$, 1 and $\hat{y}_I(k_1, n_2)$ can be obtained only for a case of $k_1=1$.

Likewise, the simplified 5-point DFT Type 2 can be implemented through Equation 39. Likewise, by using the symmetry of Equation 28, $\hat{y}_R(k_1, n_2)$ can be obtained only for a case of $k_1=0$, 1, 2 and $\hat{y}_I(k_1, n_2)$ can be obtained only for a case of $k_1=1$, 2.

In FIG. 27 and FIG. 28, the second-stage DFT is 11-point DFT or 13-point DFT. A general DFT formula with respect to the second-stage DFT is as represented by Equation 42.

$$\hat{X}(k_1, k_2) = \qquad \text{[Equation 42]}$$

$$\hat{X}_R(k_1, k_2) + j \cdot \hat{X}_I(k_1, k_2) = \sum_{n_2=0}^{N_2-1} \hat{y}(k_1, n_2) W_{N_2}^{n_2 k_2}$$

$$\hat{X}_I(k_1, k_2) =$$

$$\sum_{n_2=0}^{N_2-1} \left[ \hat{y}_I(k_1, n_2) \cos\left(\frac{2\pi k_2 n_2}{N_2}\right) - \hat{y}_R(k_1, n_2) \sin\left(\frac{2\pi k_2 n_2}{N_2}\right) \right]$$

In Equation 42, the second-stage DFT is 11-point DFT when $N_2=11$ and 13-point DFT when $N_2=13$. The corresponding DFT is calculated only for a range in which $k_1$ is 0 to $(N_1-1)/2$ in Equation 42 according to symmetries proposed in Equations 36 to 38. $N_1=3$ when $N_2=11$ and $N_1=5$ when $N_2=13$.

Case 1 of Equation 34 and Equation 35 correspond to the simplified 11-point DFT Type 1 of FIG. 27. Further, case 1 of Equation 34 and Equation 36 correspond to the simplified 13-point DFT Type 1 of FIG. 28.

The simplified 11-point DFT Type 1 and the simplified 13-point DFT Type 1 are obtained as Equation 43 when the symmetries proposed in Equations 30 to 33 are used. That is, this corresponds to a case of $k_1=0$.

$$\hat{X}_I(0, k_2) = \sum_{n_2=1}^{\frac{N_2-1}{2}} [-2\hat{y}_R(0, n_2)] \sin\left(\frac{2\pi k_2 n_2}{N_2}\right) = \qquad \text{[Equation 43]}$$

$$-2 \sum_{n_2=1}^{\frac{N_2-1}{2}} \hat{y}_R(0, n_2) \sin\left(\frac{2\pi k_2 n_2}{N_2}\right)$$

According to Equation 43, the simplified 11-point DFT Type 1 requires five multiplications and the simplified 13-point DFT Type 1 requires six multiplications.

Similarly, the simplified 11-point DFT Type 2 and the simplified 13-point DFT Type 2 may be obtained as Equation 44 when the symmetries proposed in Equations 30 to 33 are used. Here, the simplified 11-point DFT Type 2 is executed when $k_1=1$ and the simplified 13-point DFT Type 2 is executed when $k_1=1, 2$.

$$\hat{X}_I(k_1, k_2) = 2 \left[ \sum_{n_2=1}^{N_2-1} \hat{y}_I(k_1, n_2) \cos\left[\frac{2\pi k_2 n_2}{N_2}\right] \right] + \qquad \text{[Equation 44]}$$

$$\hat{y}_I(k_1, 0) - 2 \left[ \sum_{n_2=1}^{\frac{N_2-1}{2}} \hat{y}_R(k_1, n_2) \sin\left(\frac{2\pi k_2 n_2}{N_2}\right) \right]$$

According to Equation 44, the simplified 11-point DFT Type 2 requires ten multiplications and the simplified 13-point DFT Type 2 requires twelve multiplications.

In multiplications appearing in Equations 40 to 44, cosine values and sine values are multiplied as DFT kernel coefficients. Since available $N_1$ and $N_2$ values are 3, 5, 11 and 13, coefficient values as represented by Equation 45 appear in the multiplications. Here, the case of i=0 is excluded because the corresponding cosine or sine value has 0 or 1 in this case.

$$\cos\left(\frac{2\pi i}{3}\right), \sin\left(\frac{2\pi i}{3}\right), i = 1, 2 \qquad \text{[Equation 45]}$$

$$\cos\left(\frac{2\pi i}{5}\right), \sin\left(\frac{2\pi i}{5}\right), i = 1, 2, 3, 4$$

$$\cos\left(\frac{2\pi i}{11}\right), \sin\left(\frac{2\pi i}{11}\right), i = 1, 2, 3, 4, 5$$

$$\cos\left(\frac{2\pi i}{13}\right), \sin\left(\frac{2\pi i}{13}\right), i = 1, 2, 3, 4, 5, 6$$

In Equations 43 and 44, since $n_2$ index increases only to $(N_2-1)/2$, the value i is limited to $(N_2-1)/2$ for the last two cases of Equation 45.

The number of all coefficients appearing in Equation 45 is $2 \times (2+4+5+6)=34$, $2 \times (2+5)=14$ coefficients are necessary for 33-point DFT and $2 \times (4+6)=20$ coefficients are necessary for 65-point DFT. Each coefficient can be approximated to an integer through scaling and rounding, and input data of DST7 is residual data in the form of an integer and thus all related calculations can be performed integer operation. Of course, intermediate results values are also scaled values so that it is necessary to appropriately down-scale the values in each calculation step or output step.

In addition, since forms in which cosine values and sine values are referred to are $$\cos\left(\frac{2\pi k_1 n_1}{N_1}\right), \sin\left(\frac{2\pi k_1 n_1}{N_1}\right), \cos\left(\frac{2\pi k_2 n_2}{N_2}\right), \text{ and } \sin\left(\frac{2\pi k_2 n_2}{N_2}\right),$$

a coefficient value reference sequence may vary according to $k_1$ and $k_2$ values.

Accordingly, a sequence table having the $k_1$ and $k_2$ values as addresses is generated so that a reference sequence according to $n_1$ and $n_2$ may be obtained in the form of table look-up. For example, if $N_2=11$ and $k_2=3$, $$\lfloor \langle k_2 n_2 \rangle_{N_2} \rfloor_{n_2=1,2,\ldots,5} = [3, 6, 9, 1, 4]$$

can be a corresponding table entry and corresponding table entries can be set for all available $k_2$ values.

In FIG. 27 and FIG. 28, rectangles denoted by 16 and 32 are blocks that execute data permutation and sign conversion. The simplified 3-point DFT Type 1, simplified 3-point DFT Type 2, simplified 5-point DFT Type 1, and simplified 5-point DFT Type 2 blocks in FIG. 27 and FIG. 28 can receive corresponding data through index conversion proposed in Equations 15 and 16 and input data symmetries proposed in Equations 25 and 26, some data is input after the signs thereof are converted due to symmetries of Equations 25 and 26.

Embodiment 6: DST7 Implementation Through Various Scaling Methods

The simplified 3-point DFT Type 2 of FIG. 27 and the simplified 5-point DFT Type 2 of FIG. 28 are calculated through Equation 39. More specifically, this corresponds to the case of $n_2 \neq 0$ in Equation 39, and $$\cos\left(\frac{2\pi k_1 n_1}{N_1}\right) \text{ and } \sin\left(\frac{2\pi k_1 n_1}{N_1}\right)$$

have the same absolute value according to change in the value $n_1$ in many cases. Accordingly, $N_1$ multiplications are not necessary even if the value $n_1$ increases to $N_1-1$ from 0 as in Equation 39. It is assumed that the value A/B is scaled as represented by Equation 46 for the case of $n_2 \neq 0$ (i.e., the case of simplified 3-point DFT Type 2 of FIG. 27 and simplified 5-point DFT Type 2 of FIG. 28) in Equation 39.

$$\frac{A}{B}\hat{y}_R(k_1, n_2) = \frac{A}{B}\sum_{n_1=0}^{N_1-1} \hat{x}(n_1, n_2)\cos\left(\frac{2\pi k_1 n_1}{N_1}\right) = \quad \text{[Equation 46]}$$

$$\frac{1}{B}\sum_{n_1=0}^{N_1-1} \hat{x}(n_1, n_2)\left(\frac{2\pi k_1 n_1}{N_1}\right)\left[A\cos\left(\frac{2\pi k_1 n_1}{N_1}\right)\right]$$

$$\frac{A}{B}\hat{y}_I(k_1, n_2) = -\frac{A}{B}\sum_{n_1=0}^{N_1-1} \hat{x}(n_1, n_2)\sin\left(\frac{2\pi k_1 n_1}{N_1}\right) =$$

$$\frac{1}{B}\left[-\sum_{n_1=0}^{N_1-1} \hat{x}(n_1, n_2)\left[A\sin\left(\frac{2\pi k_1 n_1}{N_1}\right)\right]\right]$$

Since $$\cos\left(\frac{2\pi k_1 n_1}{N_1}\right) \text{ or } \sin\left(\frac{2\pi k_1 n_1}{N_1}\right)$$

is a floating-point number having an absolute value equal to or smaller than 1, an integer value or a floating-point number having sufficient accuracy can be generated by appropriately multiplying the value A as represented in Equation 46. 1/B finally multiplied in Equation 46 can be calculated only through shift operation in response to the value B. This will be described in more detail in embodiment 7.

When Equations 40 and 41 are multiplied by A/2B instead of A/B, Equations 47 and 48 are obtained.

$$\frac{A}{2B}\hat{y}_R(k_1, 0) = 0, \quad \text{[Equation 47]}$$

$$\frac{A}{2B}\hat{y}_I(k_1, 0) = \frac{1}{B}\left[-\hat{x}(1, 0)\left[A\sin\left(\frac{2\pi k_1}{3}\right)\right]\right]$$

$$\frac{A}{2B}\hat{y}_R(k_1, 0) = 0, \quad \text{[Equation 48]}$$

$$\frac{A}{2B}\hat{y}_I(k_1, 0) =$$

$$\frac{1}{B}\left[-\hat{x}(1, 0)\left[A\sin\left(\frac{2\pi k_1}{5}\right)\right] - \hat{x}(2, 0)\left[A\sin\left(\frac{2\pi k_1}{5}\right)\right]\right]$$

In Equations 47 and 48, an integer value or a floating-point number having sufficient accuracy can be generated by multiplying $$\cos\left(\frac{2\pi k_1 n_1}{N_1}\right) \text{ or } \sin\left(\frac{2\pi k_1 n_1}{N_1}\right)$$

by A, finally multiplied 1/B can also be calculated through only shift operation in response to the value B. This will be described in more detail in embodiment 7.

The simplified 11-point DFT Type 1 and the simplified 13-point DFT Type 1 execute the arithmetic operation (corresponding to the case of $k_1=0$) described in Equation 43, and Equation 49 can be obtained by multiplying C/2D as a scaling value.

$$\frac{C}{2D}\hat{X}_I(0, k_2) = \frac{1}{D}\sum_{n_2=1}^{\frac{N_2-1}{2}} [-\hat{y}_R(0, n_2)]\left[C\sin\left(\frac{2\pi k_2 n_2}{N_2}\right)\right] \quad \text{[Equation 49]}$$

$$\frac{A}{B}\frac{C}{2D}\hat{X}_I(0, k_2) = \frac{1}{D}\sum_{n_2=1}^{\frac{N_2-1}{2}} \left[-\frac{A}{B}\hat{y}_R(0, n_2)\right]\left[C\sin\left(\frac{2\pi k_2 n_2}{N_2}\right)\right]$$

Since $$\sin\left(\frac{2\pi k_2 n_2}{N_2}\right)$$

can be multiplied by C as in Equation 49, integer or fixed-point operation can be applied. When A/B that is a scaling value multiplied in Equation 46 is considered, a total scaling value multiplied by $\hat{X}_1(0,k_2)$ that is final result data becomes $$\frac{A}{B}\frac{C}{2D}$$

as represented in Equation 49. Furthermore, $$\frac{A}{B}\hat{y}_R(0, n_2)$$

calculated from Equation 46 can be directly applied as input as in Equation 49.

The simplified 11-point DFT Type 2 and the simplified 13-point DFT Type 2 are calculated through Equation 44 (the simplified 11-point DFT Type 2 is executed when $k_1=1$ and the simplified 13-point DFT Type 2 is executed when $k_1=1, 2$), and Equation 50 is obtained when C/2D is multiplied as a scaling value as in Equation 49.

$$\frac{C}{2D}\hat{X}_I(k_1, k_2) = \quad \text{[Equation 50]}$$

$$\left[\frac{1}{D}\sum_{n_2=1}^{\frac{N_2-1}{2}} \hat{y}_I(k_1, n_2)\left[C\cos\left(\frac{2\pi k_2 n_2}{N_2}\right)\right]\right] + \frac{C}{2D}\hat{y}_I(k_1, 0) +$$

$$\left[\frac{1}{D}\sum_{n_2=1}^{\frac{N_2-1}{2}} [-\hat{y}_R(k_1, n_2)]\left[C\sin\left(\frac{2\pi k_2 n_2}{N_2}\right)\right]\right]$$

$$\frac{A}{B}\frac{C}{2D}\hat{X}_I(k_1, k_2) = \left[\frac{1}{D}\sum_{n_2=1}^{\frac{N_2-1}{2}} \tilde{y}_I(k_1, n_2)\left[C\cos\left(\frac{2\pi k_2 n_2}{N_2}\right)\right]\right] +$$

-continued $$\left[\frac{1}{D}\sum_{n_2=1}^{\frac{N_2-1}{2}}\left[-\frac{A}{B}\hat{y}_R(k_1,n_2)\right]\left[C\sin\left(\frac{2\pi k_2 n_2}{N_2}\right)\right]\right]$$

where $\tilde{y}_I(k_1, n_2) = \begin{cases} \frac{A}{2B}\hat{y}_I(k_1, 0), & \text{if } n_2 = 0 \\ \frac{A}{B}\hat{y}_I(k_1, n_2), & \text{otherwise} \end{cases}$ In Equation 50, it can also be confirmed that $$\sin\left(\frac{2\pi k_2 n_2}{N_2}\right) \text{ and } \cos\left(\frac{2\pi k_2 n_2}{N_2}\right)$$

are multiplied by C as in Equation 49. Accordingly, integer or floating-point operation can be used to multiply cosine values and sine values. When A/B multiplied in Equation 46 and A/2B multiplied in Equation 48 are considered together as in Equation 49, the second formula of Equation 50 is obtained. When $\tilde{y}_I(k_1,n_2)$ is defined as in Equation 50, values obtained through Equations 46 to 48 can be used as input data of Equation 50.

In Equation 50, available $k_2$ value 0 to 10 in the case of the simplified 11-point DFT Type 2 and 0 to 12 in the case of the simplified 13-point DFT Type 2. Due to symmetry essentially present in cosine values and sine values, a relation such as Equation 51 is established.

$$f(k_1, k_2) = \frac{1}{D}\sum_{n_2=0}^{\frac{N_2-1}{2}}\tilde{y}_I(k_1,n_2)\left[C\cos\left(\frac{2\pi k_2 n_2}{N_2}\right)\right]$$ [Equation 51]

$$g(k_1, k_2) = \frac{1}{D}\sum_{n_2=0}^{\frac{N_2-1}{2}}\left[-\frac{A}{B}\hat{y}_R(k_1,n_2)\right]\left[C\sin\left(\frac{2\pi k_2 n_2}{N_2}\right)\right]$$

$$\frac{A}{B}\frac{C}{2D}\hat{X}_I(k_1, k_2) = f(k_1, k_2) + g(k_1, k_2) = h(k_1, k_2)$$

$h(k_1, k_2) =$
$$\begin{cases} f(k_1, k_2), & k_2 = 0 \\ f(k_1, k_2) + g(k_1, k_2), & 1 \le k_2 \le \frac{N_2-1}{2} \\ f(k_1, N_2 - k_2) - g(k_1, N_2 - k_2), & \frac{N_2+1}{2} \le k_2 \le N_2 - 1 \end{cases}$$

In Equation 51, $N_2$ for the simplified 11-point DFT Type 2 is 11 and $N_2$ for the simplified 13-point DFT Type 2 is 13. Definition of all identifies appearing in Equation is as in Equation 50.

Accordingly, $f(k_1,k_2)$ can be calculated only for $$0 \le k_2 \le \frac{N_2-1}{2}$$

and $g(k_1,k_2)$ can be calculated only for $$1 \le k_2 \le \frac{N_2-1}{2}$$

as in Equation 51. According to the same principle, calculation can be performed for $$1 \le k_2 \le \frac{N_2-1}{2}$$

according to symmetry for $k_2$ in Equation 49.

Embodiment 7: Implementation of DST7 Only Using Integer or Floating-Point Operation Through Scaling Value Adjustment All scaling values appearing in embodiment 6 have the form of A/B, $$\cos\left(\frac{2\pi kn}{N}\right) \text{ or } \sin\left(\frac{2\pi kn}{N}\right)$$

is multiplied by A first to enable integer operation and then multiplied by 1/B. Further, since the number of cosine values and sine values appearing in all Equations is limited as in Equation 45, corresponding cosine values and sine values are multiplied by A in advance, stored in an array or a ROM, and used in a table look-up manner. Equation 46 may be represented as Equation 52.

$$\frac{A}{B}\hat{y}_R(k_1, n_2) = \frac{1}{B}\sum_{n_1=0}^{N_1-1}\hat{x}(n_1, n_2)\left[A\cos\left(\frac{2\pi k_1 n_1}{N_1}\right)\right]$$ [Equation 52]

$$\frac{A}{B}\hat{y}_I(k_1, n_2) = \frac{1}{B}\left[-\sum_{n_1=0}^{N_1-1}\hat{x}(n_1, n_2)\left[A\sin\left(\frac{2\pi k_1 n_1}{N_1}\right)\right]\right]$$

Here, with respect to $$A\cos\left(\frac{2\pi kn}{N}\right) \text{ or } A\sin\left(\frac{2\pi kn}{N}\right),$$

if a sufficiently large value is multiplied as A and then rounded off, it is possible to maintain the accuracy of the value while modifying the cosine or sine value into a scaled integer value. $2^n$ may be generally used as the value A. For example, $$A\cos\left(\frac{2\pi kn}{N}\right) \text{ or } A\sin\left(\frac{2\pi kn}{N}\right)$$

can be approximated as represented by Equation 53.

$$2^n\cos\left(\frac{2\pi kn}{N}\right) \approx \left(2^n\cos\left(\frac{2\pi kn}{N}\right)\right)$$ [Equation 53]

In Equation 53, "round" represents a rounding operator. Although any type of rounding for obtaining an integer is available, a conventional rounding method of performing rounding on the basis of 0.5 may be used.

In Equation 52, multiplication by 1/B (i.e., division by B) may be implemented through right shift operation when B is $2^m$. When $B=2^m$, multiplication by $1/B$ can be approximated as represented in Equation 54. Here, rounding may be conceived as in Equation 54, but the present disclosure is not limited thereto.

$$\frac{x}{2^m} \approx \qquad [\text{Equation 54}]$$

$$\begin{cases} x >> m, \text{ when rounding is not considered} \\ (x + (1 << (m-1))) >> m, \text{ when rounding is considered} \end{cases}$$

Meanwhile, the multiplied value A need not necessarily be $2^n$ as in Equation 53. Particularly, when a scaling factor in the form of $$\frac{1}{\sqrt{N}}$$

needs to be additionally multiplied, this may be reflected in the value A.

For example, since values multiplied as numerators in Equations 49 to 51 are A and C, one of A and C may be multiplied by $$\frac{1}{\sqrt{N}},$$

and when $$\frac{1}{\sqrt{N}} = \alpha\beta,$$

A may be multiplied by α and C may be multiplied by β. As another example in which A is not $2^n$, a value such as $$2^{\frac{1}{2}}$$

may be additionally multiplied because cases in which $$2^{\frac{1}{2}}$$

is additionally multiplied in order to maintain the same kernel coefficient value range for transforms of all sizes in a codec system to which the present disclosure is applied are generated.

In a similar manner, Equations 40, 41, 43 and 44 may be appropriately approximated only through simple operations of Equations 55 to 58.

$$\frac{A}{2B}\hat{y}_R(k_1, 0) = 0, \qquad [\text{Equation 55}]$$

$$\frac{A}{2B}\hat{y}_I(k_1, 0) = \frac{1}{B}\left[-\hat{x}(1,0)\left[A\sin\left(\frac{2\pi k_1}{3}\right)\right]\right]$$

$$\frac{A}{2B}\hat{y}_R(k_1, 0) = 0, \qquad [\text{Equation 56}]$$

$$\frac{A}{2B}\hat{y}_I(k_1, 0) =$$
$$\frac{1}{B}\left[-\hat{x}(1,0)\left[A\sin\left(\frac{2\pi k_1}{5}\right)\right] - \hat{x}(2,0)\left[A\sin\left(\frac{2\pi k_1}{5}\right)\right]\right]$$

$$\frac{A}{B}\frac{C}{2D}\hat{X}_I(0, k_2) = \frac{1}{D}\sum_{n_2=1}^{\frac{N_2-1}{2}}\left[-\frac{A}{B}\hat{y}_R(0, n_2)\right]\left[C\sin\left(\frac{2\pi k_2 n_2}{N_2}\right)\right] \qquad [\text{Equation 57}]$$

$$f(k_1, k_2) = \frac{1}{D}\sum_{n_2=1}^{\frac{N_2-1}{2}}\tilde{y}_I(k_1, n_2)\left[C\cos\left(\frac{2\pi k_2 n_2}{N_2}\right)\right], \qquad [\text{Equation 58}]$$

$$g(k_1, k_2) = \frac{1}{D}\sum_{n_2=1}^{\frac{N_2-1}{2}}\left[-\frac{A}{B}\hat{y}_R(k_1, n_2)\right]\left[C\sin\left(\frac{2\pi k_2 n_2}{N_2}\right)\right]$$

$$\frac{A}{B}\frac{C}{2D}\hat{X}_I(k_1, k_2) =$$

$$\begin{cases} f(k_1, k_2), k_2 = 0 \\ f(k_1, k_2) + g(k_1, k_2), 1 \le k_2 \le \frac{N_2-1}{2} \\ f(k_1, N_2 - k_2) - g(k_1, N_2 - k_2), \frac{N_2+1}{2} \le k_2 \le N_2 - 1 \end{cases},$$

$$\text{where } \tilde{y}_I(k_1, n_2) = \begin{cases} \frac{A}{2B}\hat{y}_I(k_1, 0), & \text{if } n_2 = 0 \\ \frac{A}{B}\hat{y}_I(k_1, n_2), & \text{otherwise} \end{cases}$$

Here, $f(k_1, k_2)$ and $g(k_1, k_2)$ can be calculated only in partial ranges $$\left(\left[0, \frac{N_2-1}{2}\right] \text{ and } \left[1, \frac{N_2-1}{2}\right]\right)$$

due to symmetry, and thus complexity can be substantially reduced.

In addition, approximation with respect to multiplication by A and approximation with respect to multiplication by 1/B may be applied to Equations 47 to 51.

An example of implementation of approximation with respect to scaling factor multiplication in DST7 with lengths of 8, 16 and 32 is shown in Table 24. A, B, C and D in Table 24 are the same as A, B, C and D in Equations 46 to 51, and shift is a value introduced to a DST7 function as a factor and may be a value determined according to a quantization (or dequantization) method performed after transform (or before inverse transform)

TABLE 24

| Config. | | Original | Approximation |
|---|---|---|---|
| 8 × 8 DST7 | 17-pt DFT | $A\sin\left(\frac{2\pi k}{17}\right), k = 1, 2, \ldots, 8$ | $\text{round}\left\{\frac{1}{\sqrt{17}} \cdot 2^{\frac{1}{2}} \cdot \sin\left(\frac{2\pi k}{17}\right) \cdot 2^{10}\right\}, k = 1, 2, \ldots, 8$ |
| | | $1/B = 2^{-shift}$ | (x + (1 << (shift-1))) >> shift |
| 16 × 16 DST7 | 3-pt DFT | $A\sin\left(\frac{2\pi k}{3}\right), k = 1$ | $\text{round}\left\{\sin\left(\frac{2\pi k}{3}\right) \cdot 2^9\right\}, k = 1$ |
| | | $1/B = 2^{-10}$ | (x + (1 << 9)) >> 10 |
| | 11-pt DFT | $C\sin\left(\frac{2\pi k}{11}\right), k = 1, 2, \ldots, 5$ | $\text{round}\left\{\frac{1}{\sqrt{33}} \cdot \sin\left(\frac{2\pi k}{11}\right) \cdot 2^{11}\right\}, k = 1, 2, \ldots, 5$ |
| | | $C\cos\left(\frac{2\pi k}{11}\right), k = 0, 1, \ldots, 5$ | $\text{round}\left\{\frac{1}{\sqrt{33}} \cdot \cos\left(\frac{2\pi k}{11}\right) \cdot 2^{11}\right\}, k = 0, 1, \ldots, 5$ |
| | | $1/D = 2^{-(shift-1)}$ | (x + (1 << (shift-2))) >> (shift-1) |
| 32 × 32 DST7 | 5-pt DFT | $A\sin\left(\frac{2\pi k}{5}\right), k = 1, 2$ | $\text{round}\left\{\sin\left(\frac{2\pi k}{5}\right) \cdot 2^9\right\}, k = 1, 2$ |
| | | $A\cos\left(\frac{2\pi k}{5}\right), k = 1, 2$ | $\text{round}\left\{\cos\left(\frac{2\pi k}{5}\right) \cdot 2^9\right\}, k = 1, 2$ |
| | | $1/B = 2^{-10}$ | (x + (1 << 9)) >> 10 |
| | 13-pt DFT | $C\sin\left(\frac{2\pi k}{13}\right), k = 1, 2, \ldots, 6$ | $\text{round}\left\{\frac{1}{\sqrt{65}} \cdot 2^{\frac{1}{2}} \cdot \sin\left(\frac{2\pi k}{13}\right) \cdot 2^{11}\right\}, k = 1, 2, \ldots, 6$ |
| | | $C\cos\left(\frac{2\pi k}{13}\right), k = 0, 1, \ldots, 6$ | $\text{round}\left\{\frac{1}{\sqrt{65}} \cdot 2^{\frac{1}{2}} \cdot \cos\left(\frac{2\pi k}{13}\right) \cdot 2^{11}\right\}, k = 0, 1, \ldots, 6$ |
| | | $1/D = 2^{-(shift-1)}$ | (x + (1 << (shift-2))) >> (shift-1) |

Table 25 is an example in which scaling values different from those of Table 24 are applied. That is, scaling values obtained by multiplying scaling by ¼ are used.

TABLE 25

| Config. | | Original | Approximation |
|---|---|---|---|
| 8 × 8 DST7 | 17-pt DFT | $A\sin\left(\frac{2\pi k}{17}\right), k = 1, 2, \ldots, 8$ | $\text{round}\left\{\frac{1}{\sqrt{17}} \cdot 2^{\frac{1}{2}} \cdot \sin\left(\frac{2\pi k}{17}\right) \cdot 2^8\right\}, k = 0, 1, \ldots, 8$ |
| | | $1/B = 2^{-shift}$ | (x + (1 << (shift-1))) >> shift |
| 16 × 16 DST7 | 3-pt DFT | $A\sin\left(\frac{2\pi k}{3}\right), k = 1$ | $\text{round}\left\{\sin\left(\frac{2\pi k}{3}\right) \cdot 2^7\right\}, k = 1$ |
| | | $1/B = 2^{-10}$ | (x + (1 << 7)) >> 8 |
| | 11-pt DFT | $C\sin\left(\frac{2\pi k}{11}\right), k = 1, 2, \ldots, 5$ | $\text{round}\left\{\frac{1}{\sqrt{33}} \cdot \sin\left(\frac{2\pi k}{11}\right) \cdot 2^9\right\}, k = 1, 2, \ldots, 5$ |
| | | $C\cos\left(\frac{2\pi k}{11}\right), k = 0, 1, \ldots, 5$ | $\text{round}\left\{\frac{1}{\sqrt{33}} \cdot \sin\left(\frac{2\pi k}{11}\right) \cdot 2^9\right\}, k = 0, 1, \ldots, 5$ |
| | | $1/D = 2^{-(shift-1)}$ | (x + (1 << (shift-2))) >> (shift-1) |
| 32 × 32 DST7 | 5-pt DFT | $A\sin\left(\frac{2\pi k}{5}\right), k = 1, 2$ | $\text{round}\left\{\sin\left(\frac{2\pi k}{5}\right) \cdot 2^7\right\}, k = 1, 2$ |
| | | $A\cos\left(\frac{2\pi k}{5}\right), k = 1, 2$ | $\text{round}\left\{\cos\left(\frac{2\pi k}{5}\right) \cdot 2^7\right\}, k = 1, 2$ |

TABLE 25-continued

| Config. | Original | Approximation |
|---|---|---|
| | $1/B = 2^{-10}$ | $(x + (1 << 7)) >> 8$ |
| 13-pt DFT | $C \sin\left(\frac{2\pi k}{13}\right), k = 1, 2, \ldots, 6$ | $\text{round}\left\{\frac{1}{\sqrt{65}} \cdot 2^{\frac{1}{2}} \cdot \sin\left(\frac{2\pi k}{13}\right) \cdot 2^9\right\}, k = 1, 2, \ldots, 6$ |
| | $C \cos\left(\frac{2\pi k}{13}\right), k = 0, 1, \ldots, 6$ | $\text{round}\left\{\frac{1}{\sqrt{65}} \cdot 2^{\frac{1}{2}} \cdot \sin\left(\frac{2\pi k}{13}\right) \cdot 2^9\right\}, k = 0, 1, \ldots, 6$ |
| | $1/D = 2^{-(shift-1)}$ | $(x + (1 << (shift-2))) >> (shift-1)$ |

FIG. 29 is an encoding flowchart through which forward Discrete Sine Transform-7 (DST7) and forward Discrete Cosine Transform-8 (DCT8) are performed using Discrete Fourier Transform (DFT) as an embodiment to which the present disclosure is applied.

An encoder may determine (or select) a horizontal transform and/or a vertical transform on the basis of at least one of a prediction mode, a block shape and/or a block size of a current block (S2910). Here, candidates for the horizontal transform and/or the vertical transform may include at least one of the embodiments of FIG. 6.

The encoder may determine an optimal horizontal transform and/or an optimal vertical transform through rate distortion (RD) optimization. The optimal horizontal transform and/or the optimal vertical transform may correspond to one of a plurality of transform combinations, and the plurality of transform combinations may be defined by transform index.

The encoder may signal transform index corresponding to the optimal horizontal transform and/or the optimal vertical transform (S2920). Here, other embodiments described in this specification may be applied to the transform index. For example, the transform index may include at least one of the embodiments of FIG. 6.

As another example, the encoder may independently signal a horizontal transform index for the optical horizontal transform and a vertical transform index for the optimal vertical transform.

The encoder may perform forward transform for the horizontal direction for the current block using the optimal horizontal transform (S2930). Here, the current block may mean a transform block and the optimal horizontal transform may be forward DCT8.

In addition, the encoder may perform forward transform for the vertical direction for the current block using the optimal vertical transform (S2940). Here, the optimal vertical transform may be forward DST7 and the forward DST7 may be designed using DFT.

Although the vertical transform is executed after the horizontal transform is executed in the present embodiment, the present disclosure is not limited thereto. That is, the vertical transform may be executed first and then the horizontal transform may be executed.

As an embodiment, a combination of the horizontal transform and the vertical transform may include at least one of the embodiments of FIG. 6.

Further, the encoder may generate a transform coefficient block by performing quantization on the current block (S2950).

The encoder may generate a bitstream by performing entropy encoding on the transform coefficient block.

FIG. 30 is a decoding flowchart through which inverse Discrete Sine Transform-7 (DST7) and inverse Discrete Cosine Transform-8 (DCT8) are performed using Discrete Fourier Transform (DFT) as an embodiment to which the present disclosure is applied.

A decoder may obtain transform index from a bitstream (S3010). Here, other embodiments described in this specification may be applied to the transform index. For example, the transform index may include at least one of the embodiments of FIG. 6.

The decoder may derive a horizontal transform and a vertical transform corresponding to the transform index (S3020). Here, candidates for the horizontal transform and/or the vertical transform may include at least one of the embodiments of FIG. 6.

However, S3010 and S3020 are an embodiment and the present disclosure is not limited thereto. For example, the decoder may derive a horizontal transform and a vertical transform on the basis of a prediction mode, a block shape and/or a block size of a current block. As another example, the transform index may include a vertical transform index corresponding to the horizontal transform and a vertical transform index corresponding to the vertical transform.

The decoder may obtain a transform coefficient block by performing entropy decoding on the bitstream and perform dequantization on the transform coefficient block (S3030).

The decoder may perform inverse transform for the vertical direction on the dequantized transform coefficient block using the vertical transform (S3040). Here, the vertical transform may correspond to DST7. That is, the decoder may apply inverse DST7 to the dequantized transform coefficient block.

The present disclosure provides a method for designing forward DST7 and/or inverse DST7 using Discrete Fourier Transform (DFT).

The decoder may implement DST7 through one-dimensional DFT or two-dimensional DFT.

Further, the decoder may implement DST7 only through integer operation using various scaling methods.

In addition, the decoder may design DST7 with lengths of 8, 16 and 32 only through a DST7 implementation method using DFT and integer operation.

As an embodiment, the decoder may derive a transform combination corresponding to transform index and perform inverse transform on the current block for the vertical or horizontal direction using DST7 or DCT8. Here, the transform combination includes a horizontal transform and a vertical transform, and the horizontal transform and the vertical transform may correspond to any one of DST7 and DCT8.

As an embodiment, the method may include a step of dividing one row or one column of DST7 into two partial vector signals when 33-point Discrete Fourier Transform (DFT) is applied to the DST7; and a step of applying 11-point DFT type 1 or 11-point DFT type 2 to the two partial vector signals.

As an embodiment, when one row or one column of the DST7 is represented as src[0 . . . 15], the two partial vector signals may be represented as src[0 . . . 4] and src[5 . . . 15].

As an embodiment, the method may include a step of dividing one row or one column of DST7 into three partial vector signals when 65-point Discrete Fourier Transform (DFT) is applied to the DST7; and a step of applying 13-point DFT type 1 or 13-point DFT type 2 to the three partial vector signals.

As an embodiment, when one row or one column of the DST7 is represented as src[0 . . . 31], the three partial vector signals may be represented as src[0 . . . 5], src[6 . . . 18] and src[19 . . . 31].

As an embodiment, 13-point DFT type 1 may be applied to src[0 . . . 5] among the three partial vector signals, and 13-point DFT type 2 may be applied to src[6 . . . 18] and src[19 . . . 31].

As an embodiment, one-dimensional 33-point DFT necessary for 16×16 DST7 and one-dimensional 65-point DFT necessary for 32×32 DST7 may be divided into equivalent two-dimensional DFTs having shorter DFT. In this manner, redundant calculation can be eliminated and low-complexity DST7 can be designed by executing DST7 using DFT.

In addition, the decoder may perform inverse transform for the horizontal direction using the horizontal transform (S3050). Here, the horizontal transform may correspond to DCT8. That is, the decoder may apply inverse DCT8 to the dequantized transform coefficient block.

Although the horizontal transform is applied after the vertical transform is applied in the present embodiment, the present disclosure is not limited thereto. That is, the horizontal transform may be applied first and then the vertical transform may be applied.

As an embodiment, a combination of the horizontal transform and the vertical transform may include at least one of the embodiments of FIG. 6.

The decoder generates a residual block through step S3050 and generates a reconstructed block by adding the residual block to a predicted block.

FIG. 31 illustrates a content streaming system to which the disclosure is applied.

Referring to FIG. 31, the content streaming system to which the disclosure is applied may basically include an encoding server, a streaming server, a web server, a media storage, a user equipment and a multimedia input device.

The encoding server basically functions to generate a bitstream by compressing content input from multimedia input devices, such as a smartphone, a camera or a camcorder, into digital data, and to transmit the bitstream to the streaming server. For another example, if multimedia input devices, such as a smartphone, a camera or a camcorder, directly generate a bitstream, the encoding server may be omitted.

The bitstream may be generated by an encoding method or bitstream generation method to which the disclosure is applied. The streaming server may temporally store a bitstream in a process of transmitting or receiving the bitstream.

The streaming server transmits multimedia data to the user equipment based on a user request through the web server. The web server plays a role as a medium to notify a user that which service is provided. When a user requests a desired service from the web server, the web server transmits the request to the streaming server. The streaming server transmits multimedia data to the user. In this case, the content streaming system may include a separate control server. In this case, the control server functions to control an instruction/response between the apparatuses within the content streaming system.

The streaming server may receive content from the media storage and/or the encoding server. For example, if content is received from the encoding server, the streaming server may receive the content in real time. In this case, in order to provide smooth streaming service, the streaming server may store a bitstream for a given time.

Examples of the user equipment may include a mobile phone, a smart phone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD)), digital TV, a desktop computer, and a digital signage.

The servers within the content streaming system may operate as distributed servers. In this case, data received from the servers may be distributed and processed.

As described above, the embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blu-ray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include a Blu-ray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bitstream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method for reconstructing a video signal through a low-complexity Discrete Sine Transform-7 (DST7) design by a device, the method comprising:
obtaining a transform index of a current block from the video signal, wherein the transform index corresponds to any one of a plurality of transform combinations including combinations of DST7 and/or a Discrete Cosine Transform-8 (DCT8);
deriving a transform combination corresponding to the transform index, wherein the transform combination includes a horizontal transform and a vertical transform, and wherein the horizontal transform and the vertical transform correspond to any one of the DST7 and the DCT8;
performing an inverse transform on the current block in a vertical or horizontal direction using the DST7 or the DCT8; and
reconstructing the video signal using the inverse transformed current block,
wherein a 33-point Discrete Fourier Transform (DFT) is applied to the DST7 when the DST7 is 16×16 and a 65-point DFT is applied to the DST7 when the DST7 is 32×32,
wherein the step of performing the inverse transform comprises:
dividing one row or one column of the DST7 into two partial vector signals when the 33-point DFT is applied to the DST7; and
applying 11-point DFT type 1 or 11-point DFT type 2 to the two partial vector signals,
wherein when one row or one column of the DST7 is denoted by src[0 . . . 15], the two partial vector signals are denoted by src[0 . . . 4] and src[5 . . . 15].

2. The method of claim 1, wherein the step of performing the inverse transform comprises:
dividing one row or one column of the DST7 into three partial vector signals when the 65-point DFT is applied to the DST7; and
applying 13-point DFT type 1 or 13-point DFT type 2 to the three partial vector signals.

3. The method of claim 2, wherein, when one row or one column of the DST7 is denoted by src[0 . . . 31], the three partial vector signals are denoted by src[0 . . . 5], src[6 . . . 18] and src[19 . . . 31].

4. The method of claim 3, wherein the 13-point DFT type 1 is applied to src[0 . . . 5] among the three partial vector signals and the 13-point DFT type 2 is applied to src[6 . . . 18] and src[19 . . . 31].

5. The method of claim 1, wherein inverse transform of the DST7 is applied per column when the vertical transform is the DST7 and inverse transform of the DCT8 is applied per row when the horizontal transform is the DCT8.

6. A device for reconstructing a video signal through a low-complexity Discrete Sine Transform-7 (DST7) design, the device comprising:
a processor configured to
obtain a transform index of a current block from the video signal, wherein the transform index corresponds to any one of a plurality of transform combinations including combinations of DST7 and/or a Discrete Cosine Transform-8 (DCT8),
derive a transform combination corresponding to the transform index and perform an inverse transform on the current block in a vertical or horizontal direction using the DST7 or the DCT8, and
reconstruct the video signal using the inverse transformed current block,
wherein the transform combination includes a horizontal transform and a vertical transform,
wherein the vertical transform correspond to any one of the DST7 and the DCT8,
wherein a 33-point Discrete Fourier Transform (DFT) is applied to the DST7 when the DST7 is 16×16 and a 65-point DFT is applied to the DST7 when the DST7 is 32×32,
wherein the processor divides one row or one column of the DST7 into two partial vector signals when the 33-point DFT is applied to the DST7 and applies 11-point DFT type 1 or 11-point DFT type 2 to the two partial vector signals, and
wherein, when one row or one column of the DST7 is denoted by src[0 . . . 15], the two partial vector signals are denoted by src[0 . . . 4] and src[5 . . . 15].

7. The device of claim 6, wherein the processor divides one row or one column of the DST7 into three partial vector signals when the 65-point DFT is applied to the DST7 and applies 13-point DFT type 1 or 13-point DFT type 2 to the three partial vector signals.

8. The device of claim 7, wherein when one row or one column of the DST7 is denoted by src[0 . . . 31], the three partial vector signals are denoted by src[0 . . . 5], src[6 . . . 18] and src[19 . . . 31].

9. The device of claim 8, wherein the 13-point DFT type 1 is applied to src[0 . . . 5] among the three partial vector signals and the 13-point DFT type 2 is applied to src[6 . . . 18] and src[19 . . . 31].

10. The device of claim 6, wherein inverse transform of the DST7 is applied per column when the vertical transform is the DST7 and inverse transform of the DCT8 is applied per row when the horizontal transform is the DCT8.

11. A device for encoding a video signal through a low-complexity Discrete Sine Transform-7 (DST7) design, the device comprising:
a processor configured to
determine a transform combination for a current block, wherein the transform combination includes a horizontal transform and a vertical transform, and wherein the horizontal transform and the vertical transform correspond to any one of a DST7 and a Discrete Cosine Transform-8 (DCT8),
perform a transform on the current block in a vertical or horizontal direction using the DST7 or the DCT8,
generating a transform index of the current block, wherein the transform index corresponds to any one of a plurality of transform combinations including combinations of the DST7 and/or the DCT8, and
encoding the video signal based on the transformed current block, wherein a 33-point Discrete Fourier Transform (DFT) is applied to the DST7 when the DST7 is 16×16 and a 65-point DFT is applied to the DST7 when the DST7 is 32×32, wherein the processor divides one row or one column of the DST7 into two partial vector signals when the 33-point DFT is applied to the DST7 and applies 11-point DFT type 1 or 11-point DFT type 2 to the two partial vector signals, and wherein, when one row or one column of the DST7 is denoted by src[0 . . . 15], the two partial vector signals are denoted by src[0 . . . 4] and src[5 . . . 15].

12. The device of claim 11, wherein the processor divides one row or one column of the DST7 into three partial vector signals when the 65-point DFT is applied to the DST7 and applies 13-point DFT type 1 or 13-point DFT type 2 to the three partial vector signals.

13. The device of claim 12, wherein when one row or one column of the DST7 is denoted by src[0 . . . 31], the three partial vector signals are denoted by src[0 . . . 5], src[6 . . . 18] and src[19 . . . 31].

14. The device of claim 13, wherein the 13-point DFT type 1 is applied to src[0 . . . 5] among the three partial vector signals and the 13-point DFT type 2 is applied to src[6 . . . 18] and src[19 . . . 31].

15. The device of claim 11, wherein a transform of the DST7 is applied per column when the vertical transform is the DST7 and a transform of the DCT8 is applied per row when the horizontal transform is the DCT8.

* * * * *